United States Patent
Fung

(10) Patent No.: US 7,512,822 B2
(45) Date of Patent: *Mar. 31, 2009

(54) SYSTEM AND METHOD FOR ACTIVITY OR EVENT BASED DYNAMIC ENERGY CONSERVING SERVER RECONFIGURATION

(75) Inventor: Henry T. Fung, San Jose, CA (US)

(73) Assignee: Huron IP LLC, Grosse Pointe, MI (US)

( * ) Notice: Subject to any disclaimer, the term of this patent is extended or adjusted under 35 U.S.C. 154(b) by 226 days.

This patent is subject to a terminal disclaimer.

(21) Appl. No.: 11/364,870

(22) Filed: Feb. 28, 2006

(65) Prior Publication Data

US 2006/0253717 A1  Nov. 9, 2006

Related U.S. Application Data

(63) Continuation of application No. 09/860,373, filed on May 18, 2001, now Pat. No. 7,032,119.

(60) Provisional application No. 60/283,375, filed on Apr. 11, 2001, provisional application No. 60/236,043, filed on Sep. 27, 2000, provisional application No. 60/236,062, filed on Sep. 27, 2000.

(51) Int. Cl.
*G06F 1/32* (2006.01)
(52) U.S. Cl. ..................... 713/323; 713/322
(58) Field of Classification Search .......... 713/300–324
See application file for complete search history.

(56) References Cited

U.S. PATENT DOCUMENTS

| 3,275,868 A | 9/1966 | Malmer |
|---|---|---|
| 3,593,300 A | 7/1971 | Driscoll |
| 4,247,882 A | 1/1981 | Prager |
| 4,279,020 A | 7/1981 | Christian |
| 4,316,247 A | 2/1982 | Iwamoto |
| 4,317,180 A | 2/1982 | Lies |
| 4,365,290 A | 12/1982 | Nelms |
| 4,381,552 A | 4/1983 | Noclini |

(Continued)

OTHER PUBLICATIONS

Office Action filed in U.S. Appl. No. 11/789,150 dated Sep. 28, 2007.

(Continued)

*Primary Examiner*—Dennis M Butler
(74) *Attorney, Agent, or Firm*—Dykema Gossett PLLC

(57) ABSTRACT

Network architecture, computer system and/or server, circuit, device, apparatus, method, and computer program and control mechanism for managing power consumption and workload in computer system and data and information servers. Further provides power and energy consumption and workload management and control systems and architectures for high-density and modular multi-server computer systems that maintain performance while conserving energy and method for power management and workload management. Dynamic server power management and optional dynamic workload management for multi-server environments is provided by aspects of the invention. Modular network devices and integrated server system, including modular servers, management units, switches and switching fabrics, modular power supplies and modular fans and a special backplane architecture are provided as well as dynamically reconfigurable multi-purpose modules and servers. Backplane architecture, structure, and method that has no active components and separate power supply lines and protection to provide high reliability in server environment.

135 Claims, 19 Drawing Sheets

U.S. PATENT DOCUMENTS

| | | |
|---|---|---|
| 4,398,192 A | 8/1983 | Moore |
| 4,449,764 A | 5/1984 | Hastings |
| 4,459,672 A | 7/1984 | Buennagel |
| 4,463,440 A | 7/1984 | Nishiura |
| 4,479,191 A | 10/1984 | Nojima |
| 4,495,570 A | 1/1985 | Kitajima |
| 4,509,148 A | 4/1985 | Asano |
| 4,510,398 A | 4/1985 | Culp |
| 4,538,231 A | 8/1985 | Abe |
| 4,545,030 A | 10/1985 | Kitchin |
| 4,570,219 A | 2/1986 | Shibukawa |
| 4,611,289 A | 9/1986 | Coppola |
| 4,635,195 A | 1/1987 | Jeppesen |
| 4,663,539 A | 5/1987 | Sharp |
| 4,667,289 A | 5/1987 | Yoshida |
| 4,669,025 A | 5/1987 | Barker, III |
| 4,677,566 A | 6/1987 | Whittaker |
| 4,685,032 A | 8/1987 | Bloomstedt |
| 4,698,748 A | 10/1987 | Juzswik |
| 4,754,397 A | 6/1988 | Varaiya |
| 4,766,567 A | 8/1988 | Kato |
| 4,780,843 A | 10/1988 | Tietjen |
| 4,809,163 A | 2/1989 | Hirosawa |
| 4,823,292 A | 4/1989 | Hillion |
| 4,831,634 A | 5/1989 | McNally |
| 4,835,681 A | 5/1989 | Culley |
| 4,841,440 A | 6/1989 | Yonezu |
| 4,881,205 A | 11/1989 | Alhara |
| 4,893,271 A | 1/1990 | Davis |
| 4,907,183 A | 3/1990 | Tanaka |
| 4,922,450 A | 5/1990 | Rose |
| 4,925,311 A | 5/1990 | Neches |
| 4,949,254 A | 8/1990 | Shorter |
| 4,963,769 A | 10/1990 | Hiltpold |
| 4,968,900 A | 11/1990 | Harvey |
| 4,974,180 A | 11/1990 | Patton |
| 4,980,836 A | 12/1990 | Carter |
| 4,991,129 A | 2/1991 | Swartz |
| 4,996,706 A | 2/1991 | Cho |
| 5,021,679 A | 6/1991 | Fairbanks |
| 5,025,387 A | 6/1991 | Frane |
| 5,031,089 A | 7/1991 | Liu |
| 5,041,964 A | 8/1991 | Cole |
| 5,048,014 A | 9/1991 | Fischer |
| 5,083,266 A | 1/1992 | Watanbe |
| 5,119,377 A | 6/1992 | Cobb |
| 5,123,107 A | 6/1992 | Mensch |
| 5,129,091 A | 7/1992 | Yorimoto |
| 5,151,992 A | 9/1992 | Nagae |
| 5,167,024 A | 11/1992 | Smith |
| 5,175,845 A | 12/1992 | Little |
| 5,201,059 A | 4/1993 | Nguyen |
| 5,218,704 A | 6/1993 | Watts |
| 5,222,239 A | 6/1993 | Rosch |
| 5,239,652 A | 8/1993 | Seibert |
| 5,247,164 A | 9/1993 | Takahashi |
| 5,247,213 A | 9/1993 | Trinh |
| 5,247,655 A | 9/1993 | Khan |
| 5,249,298 A | 9/1993 | Bolan |
| 5,251,320 A | 10/1993 | Kuzawinski |
| 5,265,250 A | 11/1993 | Andrade |
| 5,339,446 A | 8/1994 | Yamasaki |
| 5,339,652 A | 8/1994 | Dreiman |
| 5,355,501 A | 10/1994 | Gross |
| 5,367,670 A | 11/1994 | Ward |
| 5,369,771 A | 11/1994 | Gettel |
| 5,379,184 A * | 1/1995 | Barraza et al. ............... 361/685 |
| 5,396,635 A * | 3/1995 | Fung ......................... 713/323 |
| 5,404,541 A | 4/1995 | Hirosawa |
| 5,451,892 A | 9/1995 | Bailey |
| 5,560,024 A | 9/1996 | Harper |
| 5,617,572 A | 4/1997 | Pearce |
| 5,666,538 A | 9/1997 | DeNicola |
| 5,710,929 A | 1/1998 | Fung |
| 5,719,800 A | 2/1998 | Mittal |
| 5,742,833 A | 4/1998 | Dea |
| 5,758,175 A | 5/1998 | Fung |
| 5,781,782 A | 7/1998 | Tachikawa |
| 5,797,022 A | 8/1998 | Shimotono |
| 5,799,198 A | 8/1998 | Fung |
| 5,892,959 A | 4/1999 | Fung |
| 5,898,232 A | 4/1999 | Reents |
| 5,900,026 A | 5/1999 | Ryu |
| 5,909,584 A | 6/1999 | Tavallaei |
| 5,913,067 A | 6/1999 | Klein |
| 5,925,133 A | 7/1999 | Buxton |
| 5,954,820 A | 9/1999 | Hetzler |
| 5,958,056 A | 9/1999 | Lehmann |
| 5,974,557 A | 10/1999 | Thomas |
| 5,987,614 A | 11/1999 | Mitchell |
| 5,996,035 A | 11/1999 | Allen |
| 6,003,088 A | 12/1999 | Houston |
| 6,006,298 A | 12/1999 | Satoh |
| 6,014,611 A | 1/2000 | Arai |
| 6,014,700 A | 1/2000 | Bainbridge |
| 6,065,132 A | 5/2000 | Takano |
| 6,076,142 A * | 6/2000 | Corrington et al. .......... 711/114 |
| 6,079,025 A | 6/2000 | Fung |
| 6,085,325 A | 7/2000 | Jackson |
| 6,088,806 A | 7/2000 | Chee |
| 6,092,139 A | 7/2000 | Crane |
| 6,115,823 A | 9/2000 | Velasco |
| 6,119,190 A | 9/2000 | Garney |
| 6,125,425 A | 9/2000 | Cole |
| 6,128,016 A | 10/2000 | Coelho |
| 6,134,666 A | 10/2000 | DeNicolo |
| 6,170,026 B1 | 1/2001 | Kimura |
| 6,175,502 B1 | 1/2001 | Schaerer |
| 6,185,514 B1 | 2/2001 | Skinner |
| 6,192,479 B1 | 2/2001 | Ko |
| 6,198,995 B1 | 3/2001 | Settles |
| 6,212,645 B1 | 4/2001 | Tjandrasuwita |
| 6,230,279 B1 | 5/2001 | Dewa |
| 6,233,691 B1 | 5/2001 | Atkinson |
| 6,237,103 B1 | 5/2001 | Lam |
| 6,269,288 B1 | 7/2001 | Smith |
| 6,288,456 B1 | 9/2001 | Cratty |
| 6,289,465 B1 | 9/2001 | Kuemerle |
| 6,304,824 B1 | 10/2001 | Bausch |
| 6,308,240 B1 | 10/2001 | De Nicolo |
| 6,349,354 B1 | 2/2002 | Garney |
| 6,349,385 B1 * | 2/2002 | Kaminski et al. ............ 713/300 |
| 6,397,340 B2 | 5/2002 | Watts, Jr. |
| 6,408,395 B1 | 6/2002 | Sugahara |
| 6,427,176 B1 | 7/2002 | Berglund |
| 6,433,444 B1 | 8/2002 | de Vries |
| 6,457,037 B1 | 9/2002 | Maytal |
| 6,457,132 B1 | 9/2002 | Borgendale |
| 6,490,153 B1 | 12/2002 | Casebolt |
| 6,499,102 B1 | 12/2002 | Ewertz |
| 6,502,203 B2 | 12/2002 | Barron |
| 6,535,798 B1 | 3/2003 | Bhatia |
| 6,557,049 B1 | 4/2003 | Maloy |
| 6,560,713 B1 | 5/2003 | Chary |
| 6,571,288 B1 | 5/2003 | Sarukkai |
| 6,574,726 B2 | 6/2003 | Crane |
| 6,574,740 B1 | 6/2003 | Odaohhara |
| 6,584,571 B1 | 6/2003 | Fung |
| 6,587,950 B1 | 7/2003 | Shah |
| 6,589,187 B1 | 7/2003 | Dirnberger |
| 6,597,689 B1 * | 7/2003 | Chiu et al. .................. 370/354 |
| 6,608,476 B1 | 8/2003 | Mirov |
| 6,625,650 B2 | 9/2003 | Stelliga |
| 6,681,251 B1 | 1/2004 | Leymann |

| | | |
|---|---|---|
| 6,684,338 B1 | 1/2004 | Koo |
| 6,687,837 B1 | 2/2004 | Beck |
| 6,691,197 B2 | 2/2004 | Olson |
| 6,711,691 B1 | 3/2004 | Howard |
| 6,714,977 B1 | 3/2004 | Fowler |
| 6,715,088 B1 | 3/2004 | Togawa |
| 6,718,472 B1 | 4/2004 | Garnett |
| 6,725,385 B1 | 4/2004 | Chu |
| 6,728,748 B1 | 4/2004 | Mangipudi |
| 6,812,437 B2 | 11/2004 | Levy |
| 6,813,674 B1 | 11/2004 | Velasco |
| 6,816,905 B1 | 11/2004 | Sheets |
| 6,829,610 B1 | 12/2004 | Hickman |
| 6,859,882 B2 | 2/2005 | Fung |
| 6,877,098 B1 | 4/2005 | Lavelle |
| 6,973,517 B1 * | 12/2005 | Golden et al. ............... 710/104 |
| 7,058,826 B2 | 6/2006 | Fung |
| 7,100,061 B2 | 8/2006 | Halepete |
| 7,134,011 B2 | 11/2006 | Fung |
| 7,228,441 B2 | 6/2007 | Fung |
| 7,272,735 B2 | 9/2007 | Fung |
| 2002/0004915 A1 | 1/2002 | Fung |
| 2002/0007463 A1 | 1/2002 | Fung |
| 2002/0007464 A1 | 1/2002 | Fung |
| 2003/0088798 A1 | 5/2003 | Ono |
| 2003/0196126 A1 | 10/2003 | Fung |
| 2003/0212474 A1 | 11/2003 | Pippin |
| 2006/0259796 A1 | 11/2006 | Fung |
| 2007/0101173 A1 | 5/2007 | Fung |
| 2007/0240006 A1 | 10/2007 | Fung |
| 2007/0245165 A1 | 10/2007 | Fung |

OTHER PUBLICATIONS

Office Action filed in U.S. Appl. No. 11/789,150 dated Apr. 8, 2008.
Office Action filed in U.S. Appl. No. 11/364,132 dated Mar. 24, 2008.
Office Action filed in U.S. Appl. No. 11/364,133 dated Mar. 17, 2008.
Office Action filed in U.S. Appl. No. 11/364,133 dated Sep. 5, 2008.
Office Action filed in U.S. Appl. No. 11/350,408 dated Mar. 6, 2008.
Office Action filed in U.S. Appl. No. 11/364,848 dated May 13, 2008.
Office Action filed in U.S. Appl. No. 11/789,254 dated Dec. 21, 2007.
Office Action filed in U.S. Appl. No. 11/789,254 dated Jun. 6, 2008.
Office Action filed in U.S. Appl. No. 11/364,820 dated Mar. 17, 2008.
Office Action filed in U.S. Appl. No. 11/364,821 dated Mar. 17, 2008.
Office Action filed in U.S. Appl. No. 11/364,822 dated Mar. 20, 2008.
Office Action filed in U.S. Appl. No. 11/364,846 dated Mar. 17, 2008.
Office Action filed in U.S. Appl. No. 11/364,897 dated Mar. 21, 2008.
Office Action filed in U.S. Appl. No. 09/860,237 dated May 3, 2007.
Office Action filed in U.S. Appl. No. 09/860,237 dated Oct. 9, 2007.
Office Action filed in U.S. Appl. No. 09/860,237 dated Apr. 2, 2008.

* cited by examiner

SYSTEM AND METHOD FOR ACTIVITY OR EVENT BASED DYNAMIC ENERGY CONSERVING SERVER RECONFIGURATION

RELATED APPLICATIONS

This application is a continuation of and claims the benefit of priority under 35 U.S.C. §120 to U.S. Utility patent application Ser. No. 09/860,373 filed 18 May 2001 and now U.S. Pat. No. 7,032,119; which claims the benefit of priority under 35 U.S.C. §119(e) to U.S. Provisional Application Ser. No. 60/283,375 entitled System, Method And Architecture For Dynamic Server Power Management And Dynamic Workload Management for Multi-Server Environment filed 11 Apr. 2001; U.S. Provisional Application Ser. No. 60/236,043 entitled System, Apparatus, and Method for Power-Conserving Multi-Node Server Architecture filed 27 Sep. 2000; and U.S. Provisional Application Ser. No. 60/236,062 entitled System, Apparatus, and Method for Power Conserving and Disc-Drive Life Prolonging RAID Configuration filed 27 Sep. 2000; each of which patent and patent application is hereby incorporated by reference.

FIELD OF THE INVENTION

This invention pertains generally to architecture, apparatus, systems, methods, and computer programs and control mechanisms for managing power consumption and workload in data and information servers; more particularly to power consumption and workload management and control systems for high-density multi-server computer system architectures that maintain performance while conserving energy and to the method for power management and workload management used therein, and most particularly to system, method, architectures, and computer programs for dynamic server power management and dynamic workload management for multi-server environments.

BACKGROUND

Heretofore, servers generally, and multi-node network servers in particular, have paid little if any attention to power or energy conservation. Such servers were designed and constructed to run at or near maximum levels so as to serve data or other content as fast as possible, or where service demands were less than capacity to remain ever vigilant to provide fast response to service requests. Increasing processor and memory speeds have typically been accompanied by higher processor core voltages to support the faster device switching times, and faster hard disk drives have typically lead to faster and more energy-hungry disk drive motors. Larger memories and caches have also lead to increased power consumption even for small single-node servers. Power conservation efforts have historically focused on the portable battery-powered notebook market where battery life is an important marketing and use characteristic. However, in the server area, little attention has been given to saving power, such servers usually not adopting or utilizing even the power conserving suspend, sleep, or hibernation states that are available with some Microsoft 95/98/2000, Linux, Unix, or other operating system based computers, personal computers, PDAs, or information appliances.

Multi-node servers present a particular energy consumption problem as they have conventionally be architected as a collection of large power hungry boxes interconnected by external interconnect cables. Little attention has been placed on the size or form factor of such network architectures, the expansibility of such networks, or on the problems associated with large network configurations. Such conventional networks have also by-and-large paid little attention to the large amounts of electrical power consumed by such configurations or in the savings possible. This has been due in part because of the rapid and unexpected expansion in the Internet and in servers connected with and serving to Internet clients. Internet service companies and entrepreneurs have been more interested in a short time to market and profit than on the effect on electrical power consumption and electrical power utilities; however, continuing design and operation without due regard to power consumption in this manner is problematic.

Networks servers have also by-and-large neglected to factor into the economics of running a network server system the physical plant cost associated with large rack mounted equipment carrying perhaps one network node per chassis. These physical plant and real estate costs also contribute to large operating costs.

In the past, more attention was given to the purchase price of equipment and little attention to the operating costs. It would be apparent to those making the calculation that operating costs may far exceed initial equipment purchase price, yet little attention has been paid to this fact. More recently, the power available in the California electrical market has been at crisis levels with available power reserves dropping below a few percent reserve and rolling blackouts occurring as electrical power requirements drop below available electrical power generation capacity. High technology companies in the heart of Silicon Valley cannot get enough electrical power to make or operate product, and server farms which consume vast quantities of electrical energy for the servers and for cooling equipment and facilities in which they are housed, have stated that they may relocated to areas with stable supplies of low-cost electricity.

Even were server manufactures motivated to adopt available power management techniques, such techniques represent only a partial solution. Conventional computer system power management tends to focus on power managing a single CPU, such as by monitoring certain restricted aspects of the single CPU operation and making a decision that the CPU should be run faster to provide greater performance or more slowly to reduce power consumption.

Heretofore, computer systems generally, and server systems having a plurality of servers where each server includes at least one processor or central processing unit (CPU) in particular have not been power managed to maintain performance and reduce power consumption. Even where a server system having more than one server component and CPU may possibly have utilized a conventional personal computer architecture that provided some measure of localized power management separately within each CPU, no global power management architecture or methods have conventionally been applied to power manage the set of servers and CPUs as a single entity.

The common practice of over-provisioning a server system so as to be able to meet peak demands has meant that during long periods of time, individual servers are consuming power and yet doing no useful work, or several servers are performing some tasks that could be performed by a single server at a fraction of the power consumption.

Operating a plurality of servers, including their CPU, hard disk drive, power supply, cooling fans, and any other circuits or peripherals that are associated with the server, at such minimal loading also unnecessarily shortens their service life. However, conventional server systems do not consider the longevity of their components. To the extent that certain of the CPUs, hard disk drives, power supplies, and cooling fans may be operated at lower power levels or for mechanical systems (hard disk drive and cooling fans in particular) their effective service life may be extended.

Therefore there remains a need for a network architecture and network operating method that provides large capacity and multiple network nodes or servers in a small physical footprint and that is power conservative relative to server performance and power consumed by the server, as well as power conservative from the standpoint of power for server facility air conditioning. These and other problems are solved by the inventive system, apparatus and method. There also remains a need for server farms that are power managed in an organized global manner so that performance is maintained while reducing power consumption. There also remains a need to extend the effective lifetime of computer system components and servers so that the total cost of ownership is reduced.

SUMMARY

Aspects of the invention provide network architecture, computer system and/or server, circuit, device, apparatus, method, and computer program and control mechanism for managing power consumption and workload in computer system and data and information servers. Further provides power and energy consumption and workload management and control systems and architectures for high-density and modular multi-server computer systems that maintain performance while conserving energy and method for power management and workload management. Dynamic server power management and optional dynamic workload management for multi-server environments is provided by aspects of the invention. Modular network devices and integrated server system, including modular servers, management units, switches and switching fabrics, modular power supplies and modular fans and a special backplane architecture are provided as well as dynamically reconfigurable multi-purpose modules and servers.

DETAILED DESCRIPTION OF EMBODIMENTS OF THE INVENTION

The present invention pertains to computer system architectures and structures and methods for operating such computer system architectures in a compact high-performance low-power consumption manner. Computers, information appliances, data processing systems, and all manner of electronic systems and devices may utilize and benefit from the innovations described herein. Aspects of the invention also contribute to reliability, ease of maintenance, and longevity of the system as a whole and operation components thereof. In an application that is of particular importance and which benefits greatly from the innovations described here, the computer system is or includes a server system having at least one and more typically a plurality of servers. Each server will include at least one processor or CPU but may include multiple CPUs. In multiple server configurations significant power consumption reduction is achieved by applying the inventive power management scheme. These and other aspects of the invention are described in the sections that follow.

The physical form factors of the server modules and management modules provide significant advantages, however, it will be appreciated that the invention need not be limited to such modular servers or modular management elements, and that the invention extends to discrete servers and management elements. It is also to be appreciated that although the exemplary embodiments focus attention toward servers, server systems, and power saving features for server systems, that aspects of the invention transcend such servers and server environments. For example, distributed computer systems of all types may benefit from the form of coordinated management and control to determine CPU loading and coordinate computational processing over a multiplicity of processors.

Section headers, where provided, are merely for the convenience of the reader and are not to be taken as limiting the scope of the invention in any way, as it will be understood that certain elements and features of the invention have more than one function and that aspects of the invention and particular elements are described throughout the specification.

Figure 1:
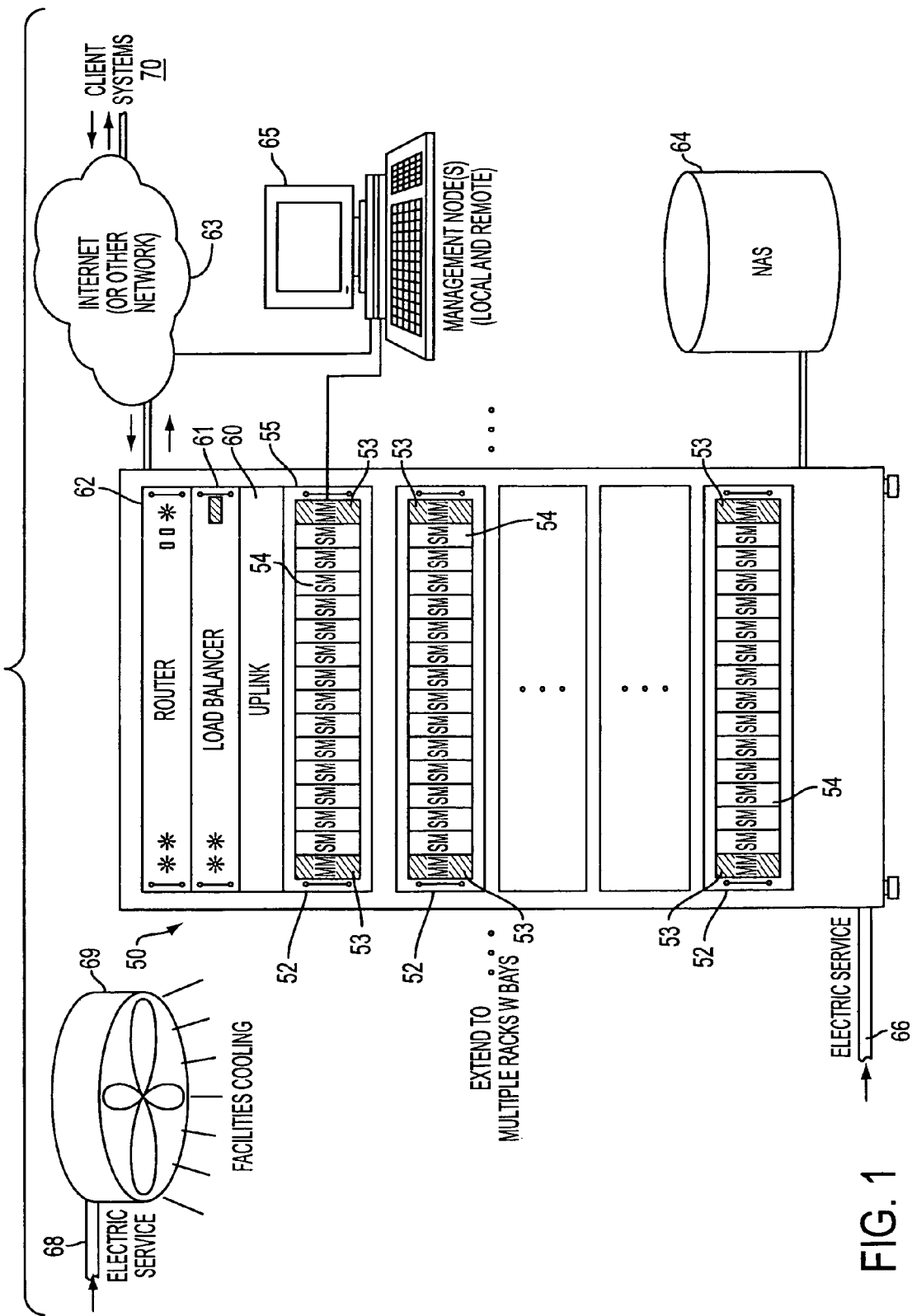
FIG. 1 is a diagrammatic illustration showing a exemplary embodiment of an inventive power conserving high-density server system.

With respect to FIG. 1 there is shown an exemplary rack mounted server system 50. The rack carries a plurality of 2U high integrated server system units 52 each having one or more management modules (MM) 53 and one or more server modules (SM) 54, each server module providing a fully independent server. Each server includes a processor or CPU and memory, mass storage device such as a hard disk drive, and input/output ports. In the embodiment illustrated each 2U high chassis 55 has 16 slots each of which may contain a PC-board mounted server module 54 or management module 53. The chassis 55 also provides one or more power supplies 56 and one or more cooling fan banks 57. These elements are coupled for communication by switches 59 and a backplane 58.

The different ISS chassis units 55 may be coupled together to form a larger system and these server units share a gigabit uplink 60, load balancer 61, a router 62 to connect to a network such as the Internet 63. Network Attached Storage (NAS) 64 may desirably be provided to increase storage capacity over that provided in individual server modules. Local and/or remote management nodes or workstations 65 may be provided to permit access to the system 50. As power management is an important feature of aspects of the invention, the provision of electric service 66 to the system 50 as well as electric service 68 to building or facilities air conditioning or cooling 69 is also illustrated. Content or data may readily be served to remote clients 70 over the Internet 63.

The illustration in FIG. 1 shows how the form factor of the server and management modules increases server density and reduces the footprint of the server system. Of course multiple racks may be added to increase system capacity. The inventive power management feature extends to individual server modules, to groups of server modules, and to the entire set of server modules in the system 50 as desired. Power management may also be applied to the management modules, power supply modules, switches, cooling fan modules, and other components of the ISS.

Figure 2:
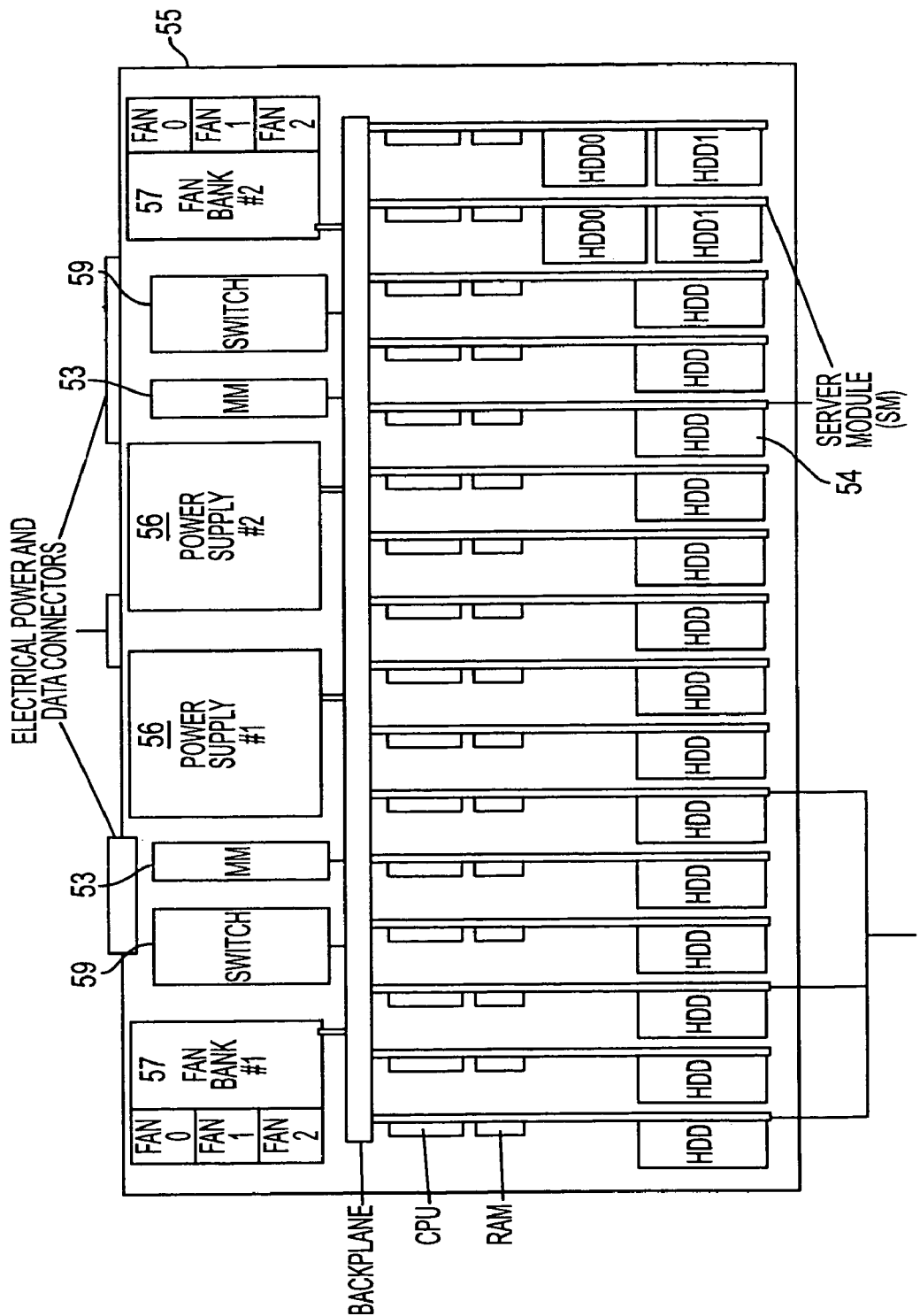
FIG. 2 is a diagrammatic illustration showing an exemplary embodiment of a single 2U high rack mountable Integrated Server System Unit having a plurality of modular server units.

An exemplary embodiment of an ISS unit is illustrated in FIG. 2, which shows the manner in which PC board based server modules and management modules plug into a back plane along with power supplies, cooling fan units, switches, and other components to provide the high-density system. These and other features are described in greater detail in the remainder of this specification.

Figure 3:
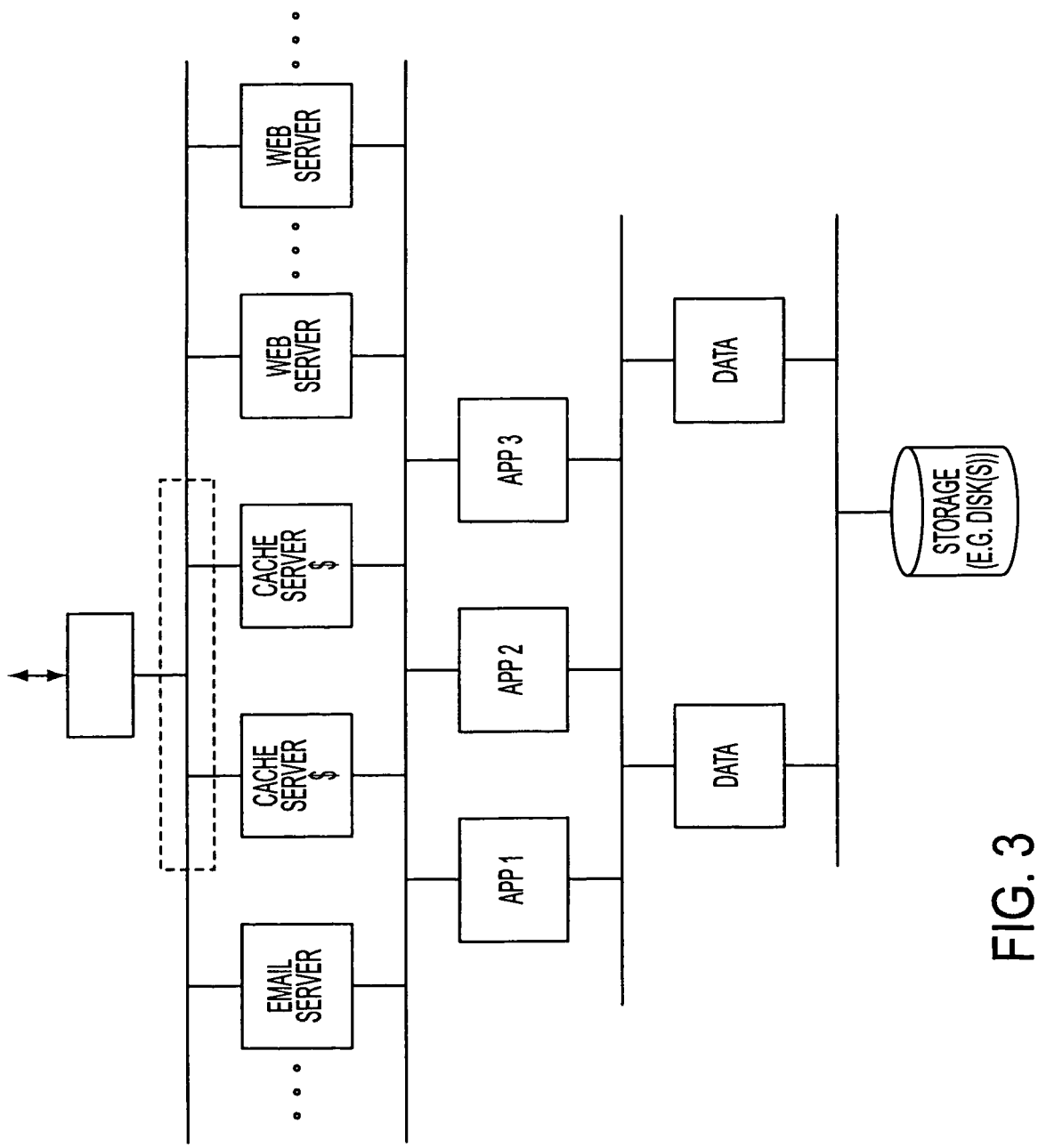
FIG. 3 is a diagrammatic illustration showing a standard server farm architecture in which multiple nodes are individually connected by cables to each other to form the desired network.

With respect to FIG. 3, there is shown in diagrammatic form, an illustration showing a standard server farm architecture in which multiple nodes are individually connected by cables to each other to form the desired network. Server farms such as this are typically power hungry, operate continuously with little or no regard for actual usage, have a large footprint, and generate large amounts of heat that require considerable air conditioning to dissipate or remove.

Figure 4:
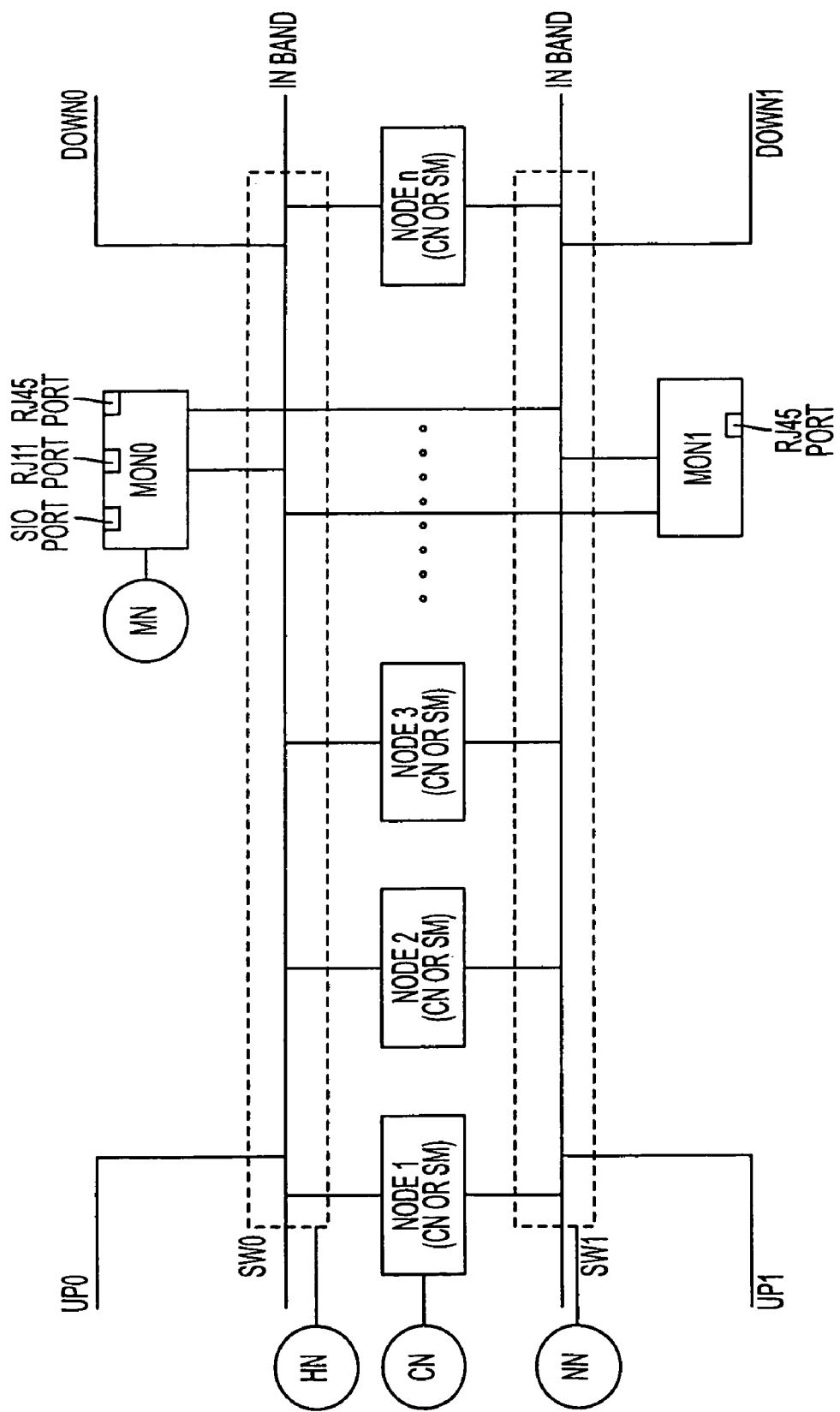
FIG. 4 is a diagrammatic illustration showing an embodiment of the inventive Integrated Appliance Server (IAS) standard architecture also or alternatively referred to as an Integrated Server System (ISS) architecture in which multiple nodes selected from at least a computer node (CN) such as a server module (SM), network node (NN) also referred to as a switch module, and monitor or management node (MN) also referred to as a Management Module (MM) are provided within a common enclosure and coupled together via an internal backplane bus.

FIG. 4 is a diagrammatic illustration showing an embodiment of the inventive Integrated Server System (ISS) standard architecture in which multiple nodes selected from at least a computer node (CN) or Server Module (SM), network node (NN) or Switch Module (SWM), and monitor node (MN) or Management Module (MM) are provided within a common enclosure and coupled together via an internal backplane bus and internal switch. Two separate switching fabrics sw1 and sw0 are provided and described hereinafter. Up-link (up0 and up1) and down-link (down0 and down1) are provided to permit cascading multiple ISS cluster units. Monitor nodes (MN or MonX) such as Mon0 and Mon1 are coupled or connected via any one or more of serial I/O interfaces, RJ-45 interfaces, and RJ-11 modem interfaces to each switching node or other switching means, network node (NN), or to a network node via a switching node or other means.

Figure 5:
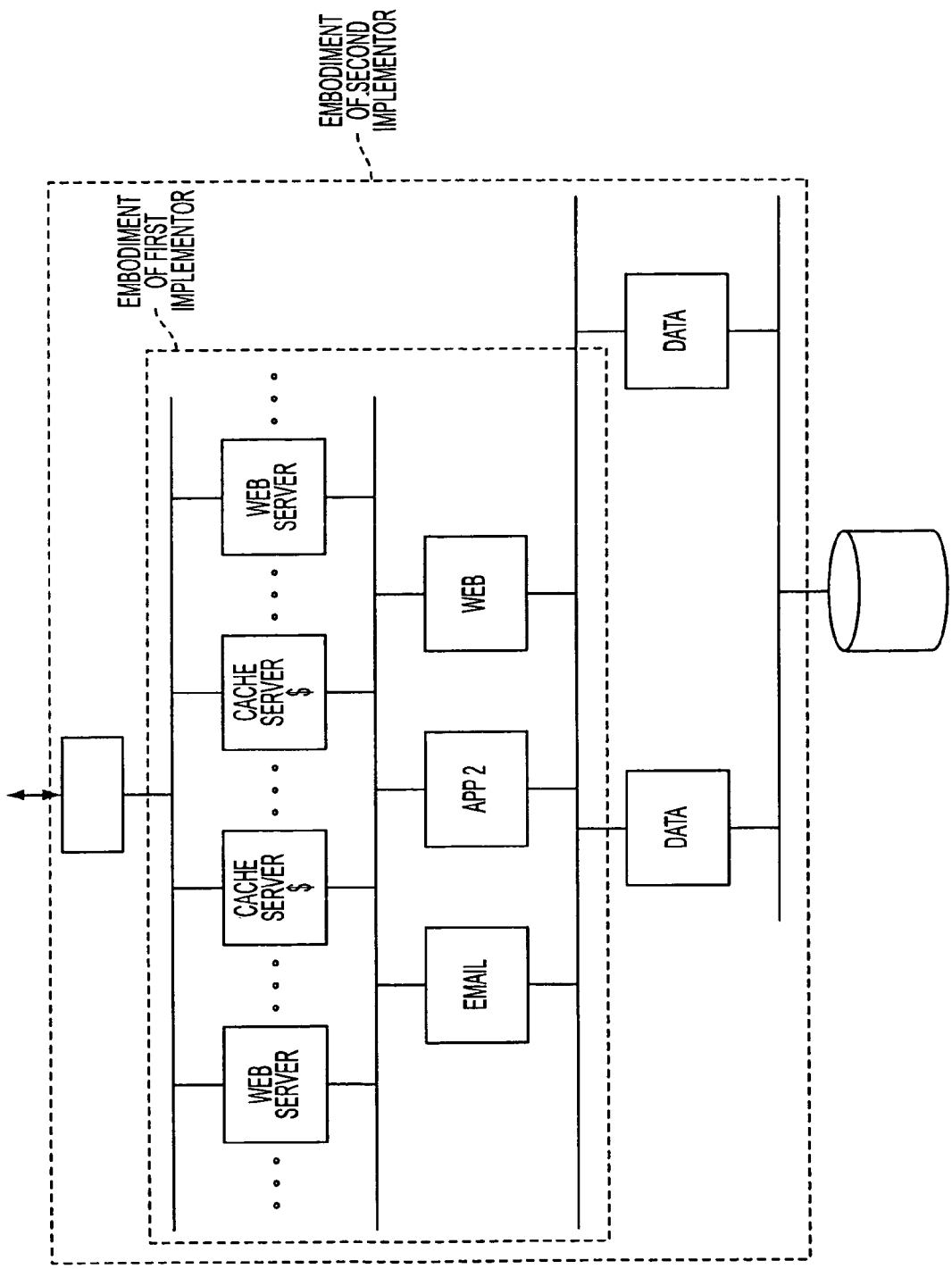
FIG. 5 is a diagrammatic illustration showing another embodiment of the invention in which multiple modular IAS (or ISS) clusters each containing multiple nodes are cascaded to define a specialized system.

FIG. 5 is a diagrammatic illustration showing another embodiment of the invention in which multiple modular ISS clusters each containing multiple nodes are cascaded to define a specialized system. This is an example of the manner in which multiple nodes within an ISS unit and multiple cascaded ISS units may be transformed or morphed to suit network configuration requirements.

It is noted that each Integrated Appliance Server (IAS) or Integrated Server System (ISS) cluster desirably includes some intelligence. In order to configure there is some master that is selected during initialization of the system, such as when it is booted or reset. The system can be designed such that any one of the nodes can be the master node. For example, one node may be designated as the master or the first node that becomes available after initialization, boot, or reset may assume the role of master node. There is no need for a separate processor or control within the box or enclosure. The master can control the rest of the system. Factors used in such control include the load, the quality of service desired or required. The system can reconfigure itself at any time in real-time in response to conditions encountered and predetermined or adaptive rules or procedures. For example, in during a period of time the number of email requests increases and the number of web page requests decreases or is static, then nodes may converted to serve email so that the email service capacity and performance are increased to handle the additional load. A node can also serve more than one function, for example it can function to serve email and web pages and can be self balancing.

The architecture or topology may be morphed or transformed into many alternative structures. All nodes are connected by an internal backplane thereby eliminate the need for external and fragile connectors and cables. Each node can be adapted to perform any one of numerous functions, or a plurality of the functions concurrently. Any node can be a cache node, an email node, a web page server node, or the like. Selection of the function or functions of the nodes are selected (manually or automatically) based on such factors as the load for each type of function and the desired level or quality of service (QOS) for that function. For example, if rapid web page service is desired as compared to email service, more node resources may be allocated to serving web pages.

All nodes are reconfigurable at any time based on circumstances, such as load and QOS. For example, if only need to serve so many pages per second then may choose not to allocate additional node resources to web page serving. In some instances, the tasks performed by one node (such as node serving web pages) may be shifted to one or more other nodes that have additional capacity, and that former web server node powered down or put into another power or energy saving mode. This adaptive reconfiguration and distribution of node functions maintains QOS while minimizing power consumption, heat dissipation, and other negative or detrimental effects. Placing the equipment or portions of the equipment in to power saving modes or standby modes also has the potential benefit of prolonging effective service life.

The power consumption of each node is therefore also adjustable based on the load and/or QOS requirement. On one level this adjustment is enabled by using or not using one or more nodes, and at a second level, the performance characteristics of the node may be adapted or configured to suit operational requirements. For example, a processor clock speed may be increased when demands are high and decreased or turned off when demands are modest or there is no demand. Again, these adjustments may be made automatically based on sensed load and feedback as to whether quality of service requirements have been met.

The invention also provides a functional and architectural topology in which each node represents a cell in a network of interconnected cells. These nodes or cells are linked and interoperate with each other such that when the operating characteristics of one node change in response to a command or sensed conditions (e.g. current loading and/or QOS) the other nodes become aware of this change and may also optionally but desirably be reflected in reconfiguration of other of the nodes. Advantageously, the number or frequency of such changes may be controlled so that the system remains stable. For example, reconfiguration may be limited in frequency or predetermined delays may be built into the system so that a settling time is provided after each node is reconfigured.

Other intelligence can be put into the node clusters if desired. Recall that a cluster includes a set of interconnected nodes, in a preferred embodiment each cluster includes 16 nodes in a single physical enclosure.

Each ISS consists of multiple nodes. Nodes may be configured as computer nodes, monitor nodes, network nodes, and any other type of node known in the art. Normally, the nodes are physically housed in a single box or enclosure and connected by an enclosure backplane. The architecture may be morphed or transformed into many different alternative organizations. For example, the ISS standard architecture may be configures into a server farm. This can be done for either the entire ISS, a part of a single ISS, or among multiple ISS units.

The computer nodes (also known as server nodes or server modules) may be configured or mapped to email, FTP, or Web nodes. One or more of such computer nodes may then be coupled together with other nodes. This exemplary first implementation is illustrated as the inner box in FIG. 5. Each node may be configured in any way desired as in at least one embodiment of the invention, the structure and function of each node at the time of manufacture is identical, and any one of such nodes may be placed in service or later reconfigured to provide the desired functionality. In one embodiment, each computer node type is the same while in other embodiments they are of different types.

Furthermore, in one embodiment, every node in a cluster of nodes is identical as they come from the factory, and any node may be adapted, such as through software that is loaded into a node, to provide any one of a plurality of available functions. In another embodiment, somewhat to very different node structures are provided within a single cluster to provide more highly optimized network nodes, computer nodes, and monitor nodes. The existence and distribution of such nodes in a cluster may be selected by the customer or user so that each cluster provides the desired number of computer, monitor, network, or other nodes as may become available. Advantageously, the nodes are implemented as plug-in or removable modules, such as printed circuit boards, so that the configuration of any particular cluster or of a system having a plurality of clusters may be modified after manufacture. In this way additional nodes of any desired type may be added when the need arises. Not all locations within a cluster need be populated thereby providing initial cost savings as well as allowing later expansion. Nodes may be dynamic configured, either identical nodes or specialized nodes, are supported in response to changing loading and QOS.

Recall that in the standard Integrated Server System (ISS) architecture includes a single 2U (3.5-inch tall) box, has N nodes where in one embodiment N=16. Internally there is a switching fabric that makes connections between the nodes. The switching fabric may be a hub, a switch, or any other means for making connections between all the different the nodes. Internally, it is preferred to provide to such switching fabrics. This is advantageous (but not required) as it permits implementation and configuration to two separate and independent networks. For example, one network can connect multiple nodes of any type and a second network can connect to data in mass storage units such as may be used in a Storage Area Network (SAN). This is desirable in some circumstances as it reduces contention over the network and reduces the likelihood of collisions of traffic over the network.

A second reason for providing two (or more) switching fabrics relates to providing high availability or redundancy. High availability pertains to providing the 24 hour/day 7 day/week ("24/7") presence and availability over the internet. When only a single switching fabric and its set of interconnected nodes is used, a failure of that switching fabric or of a critical node not redundantly provided will fail to provide the high 24/7 availability expected. Provision of two independent switching fabrics and appropriately configured node sets provides either actual redundancy or the ability to either manually or automatically reconfigure either of the node/switch sets to maintain service availability.

Therefore, it will be appreciated that the two (or other plurality) switching fabrics and their couple nodes may be used either as two (or more) separate networks or maintained as a backup that assumes the responsibilities of the primary set in the event of failure. Again, this rollover from primary to backup may occur either manually or automatically.

Typically, the two switching fabric means SW1 and SW2 in the embodiment of FIG. 4 will be identical, though they are not required to be identical, and in at least one embodiment are implemented as separate printed circuit boards that plug into the backplane of the cluster.

The inventive architecture also provides means for cascading or interconnecting multiple clusters, and by implication, for cascading or interconnecting the nodes in one cluster to the nodes in any number of other clusters. Usually two such links are provided for coupling to other clusters, thereby allowing cascading of any number of clusters and nodes. For example, if each cluster box includes 16 nodes, connection to other clusters provides additional nodes. Cascading of any number between two and twenty or more units may be provided. When multiple clusters are interconnected in this way required functionality may optionally be provided in only one cluster and need not be duplicated in all clusters. For example, if a monitor type node is desired it need only be provided in one of the clusters to permit monitoring of all of the nodes of the connected clusters. Switching fabrics may also optionally be shared between interconnected or cascaded clusters.

In the embodiment of FIG. 4, the ISS standard architecture includes a Computer Node (CN) having a switching fabric that we call the Network Node (NN). The monitor node has a serial port that has a RJ-11 modem built in. In the event of a problem with the switch or any other component, a page or phone call can be placed to a local or remote administrator with diagnostic information and allow the administrator to interact with the cluster to take corrective action. For example, the administrator may access local software diagnostic tools to trouble shoot and correct the problem, perform a hardware reset, perform a power cycle (OFF/ON) type reset, or otherwise debug, diagnose or correct the problem.

Advantageously, but optionally, a separate monitor node (MN) is provided for each switching fabric means even though either of the monitors may be configured to monitor both switching fabrics any all of the nodes coupled to or through the switching fabric. This duplication is provided for purposes of redundancy so that in the event that one of the independent networks fails or the modem itself fails, the remaining operational network may be monitored so that intervention by the administration may be accomplished as desired. Also, in the event that a modem fails, modem redundancy allows the administrator to query either or both networks. It also facilitates a determination that a modem has failed versus the network having failed.

Physically, it is a rectangular rack-mountable box. In one embodiment, the 16-node ISS enclosure is provided as a standard 19-inch wide, 3.5-inch high (2U) rack mountable chassis. Hot swapping any and all of the boards with which the nodes are implemented is supported. The box need never be powered down and therefore so long as a minimum set of nodes remain in the box, the network remains available. There are 16 computer node boards (also referred to as server modules) that may be plugged or unplugged at any time. Each board (computer node or server module) is coupled to the other nodes and to the switching fabric via a backplane bus so that no external cables or wires are required for connecting the nodes within any cluster box. In preferred embodiments of the invention, the switch or switches are built into the box, though in other embodiments external switches, such as switches within a cascaded cluster, may be used. Where clusters are to be cascaded (see description above) the connections between cluster boxes may be made with external cables. It will be appreciated that for a 16-node per cluster box the reduction in cables is substantial (up to 31 cables between nodes are eliminated).

It will therefore be clear to workers having ordinary skill in the art in light of the description provided here that the inventive structure and method provides numerous features and advantages over conventional systems and methods. For example, the invention provides a Integrated Server System (ISS) comprising multiple nodes housed within a single enclosure or box. In one embodiment, 16 nodes within a single enclosure are supported, but any number that may physically be placed within a single enclosure may be used, including for example any number of nodes between 1 node and 32 nodes or more. Configurations having 4, 8, 10, 12, 16, 20, 24, and 32 nodes are specifically provided. Larger numbers of nodes may readily be accommodated if the size of the enclosure is increased and due attention is provided for cooling or other heat dissipation. Nodes available in any particular enclosure may be selected from network nodes (NN), computer nodes (CN), monitor nodes (MN), as well as variations and combinations of these node types.

In another aspect, the inventive structure and method may be transformed, morphed, or otherwise configured to provide (either alone or in combination with other cluster units) a great variety of organizations and architectural topologies, and therefore provide an almost unlimited number of functional configurations.

In another aspect, all nodes within an enclosure are connected to each other and to a switching means by a backplane bus internal to the enclosure, thereby eliminating the need for external node-to-node and node-to-switch connection cables. Such conventional cables are prone to failure and inadvertent disconnection during service operations that may result in network downtime. In yet another aspect, the inventive structure and method facilitates and permits any node to perform any supported function or operation. In one embodiment, all nodes are identical and can be adapted, such as by programming or loading appropriate software, to provide any function or operation. In another embodiment, different classes or types of nodes are provided that are somewhat specialized and/or optimized to perform selected classes of functions or operations very well. In yet another embodiment, highly specialized nodes are available to perform specific functions. In each of these embodiments, the nodes are desirably provided as removable hot-pluggable modular units, such as PC boards or cards, that may be added or removed from the enclosure without powering off or otherwise making the network unavailable. This facilitates the interchange of hot spares which may remain ready and available within the enclosure for immediate use in the event of a node failure. In still another aspect, each Integrated Server System (or cluster) unit is cascadable so that multiple sets of nodes may be interconnected to provide the desired number and type of operation. In yet another aspect, any and all nodes are reconfigurable at any time based on such factors as load or quality of service (QOS) requirements. Furthermore, the change or reconfiguration may be communicated to other nodes and the effect of such reconfiguration ripple through to the other nodes and to the network as a whole. This permits the entire system to be self balancing to the extent desired. In another aspect, each cluster is provided with sufficient intelligence so that at least some network administration operations that conventionally required some degree of supervision or intervention may be performed autonomously and dynamically in response to sensed conditions experienced on the network or within one or more nodes of the network.

In still another aspect the inventive structure and method provide for significant power consumption reduction and energy savings as compared to conventional network and server architectures as only those power consuming resources that are actually needed to provide the quality of service required are in an active mode. Those node resources that are not needed may be powered off or placed in some power conserving standby mode until needed. In addition, operations performed by one or more nodes may be shifted to another node so that only the remaining active nodes consume power and the remaining nodes are in standby mode or powered off until needed. The intelligence within one of the nodes acting as a master node for the cluster or ISS may then wake up the inactive node and configure it for operation. A system may be woken up and placed in any of the available operating modes by any one of a plurality of events. Nodes may also be placed into an inactive or power conserving mode when no demands are made on their resources independent of whether responsibility for their functionality has been shifted to another node or nodes. In one embodiment of the invention the power consumed is reduced by a factor of about 10-times as compared to a standard 19-inch wide by 1.75-inch high (1U) rack mountable network node device. This power savings is accomplished at least in part by one or more of the following measures: the reduction in the number of power supplied, use of the mounting plate as a heat sink to assist in removing heat from the enclosure, providing power saving controls to circuits and devices within the ISS enclosure, and the above described ability to reconfigure and take off line unneeded capacity.

The architecture is referred to as the Integrated Server System (ISS) or the integrated server architecture, and each unit is referred to as an Integrated Server System Unit. One embodiment of the ISS Unit is being developed by Amphus under the proprietary name Virgo™.

Having now described a first embodiment of the Integrated Server System (ISS) (also referred to as the Integrated Server Architecture), attention is now directed to several further embodiments which are described in somewhat greater detail so that the advanced power consumption reduction features may be more readily understood.

Figure 6:
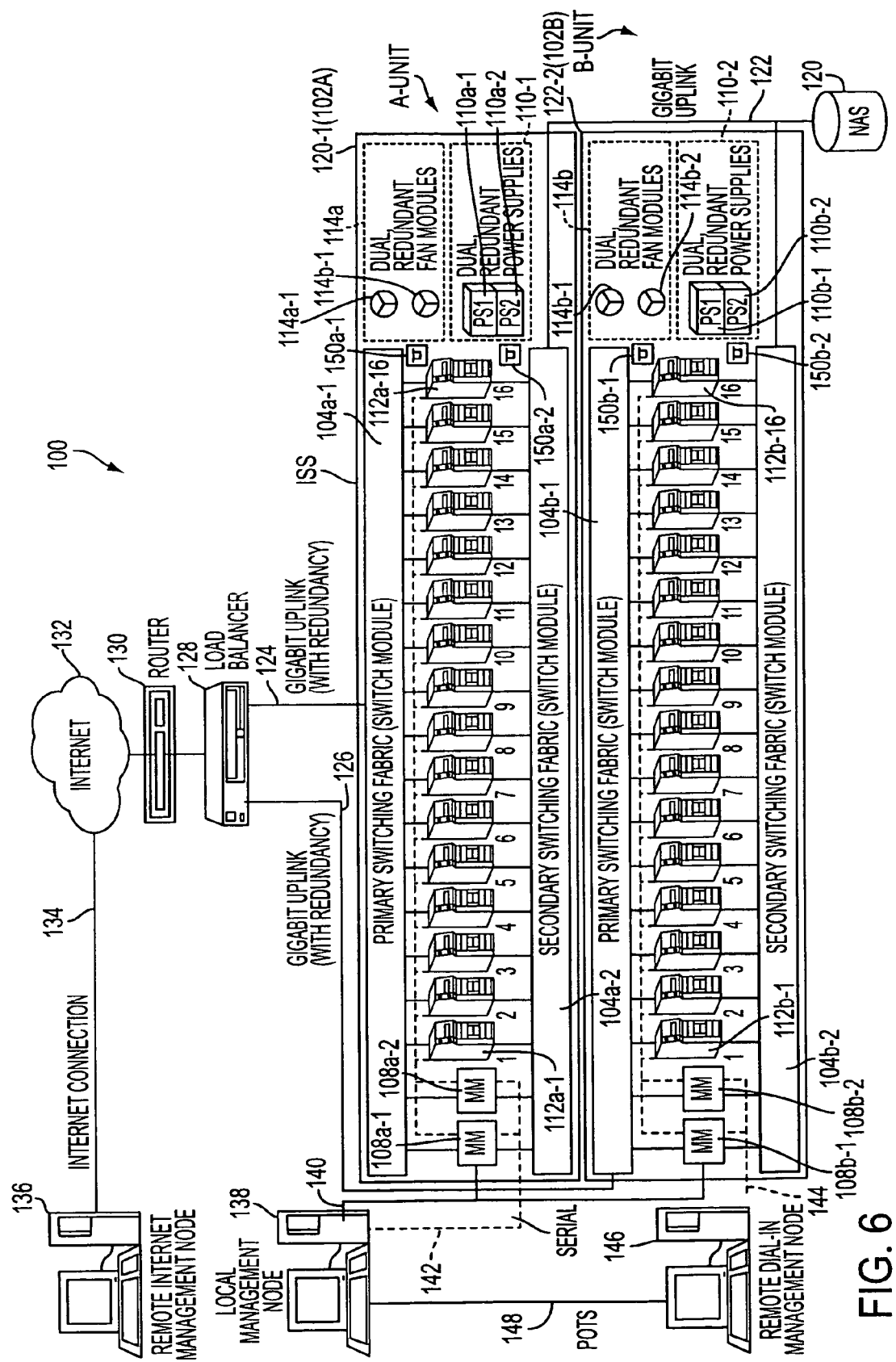
FIG. 6 is a diagrammatic illustration showing an embodiment of an Integrated Server System Architecture having two interconnected integrated server system units (ISSUs) and their connectivity with the external world.

An exemplary embodiment of an ISS based system is illustrated in FIG. 6. Each Integrated Server System (ISS) architecture comprises a number of functional components. A particular exemplary embodiment is now described although it will be clear from the description provided that various changes to the configuration may be accomplished without departing from the spirit and scope of the invention. In this embodiment a chassis and/or enclosure houses a backplane mounting a plurality of connectors adapted to receive a plurality of printed circuit boards. The nature, type, characteristics, and number of these printed circuit boards 107 may vary from installation to installation as will be described subsequently. It will also be appreciated, that the physical form and/or connectivity of these components may be through other means.

In one embodiment of the invention, multiple ISS units may be coupled together or interconnected. In the embodiment illustrated in FIG. 6 two such ISS units 102 are shown. A first of these is referred to as the "A-unit" and the second unit is referred to as the "B-unit". Additional units, may also be provided. It is noted that although the configurations of the A-unit and B-unit are the same here, in any practical implementation, they may be the same or different, depending upon a functional purpose all of the overall system, and/or all of individual modules within the system. The manner in which configurations are chosen, physically altered such as through the addition or removal modules, and/or through dynamic allocation of modules are made in accordance with principals described hereinafter. With this in mind, components resident within the a-unit are typically designated with an "a" suffix to the reference numeral and be components resident within the bee-unit are typically designated with an "b" suffix to the reference numeral. However, where a general reference to a component of a particular type is made without specific reference to diagram, the "a" and the "b" suffix may be dropped for convenience.

Each ISS units also comprises at least one, and generally a plurality, of server modules 112*a*-1, . . . , 112*a*-N, where in a particular embodiment of the ISS the maximum number of server modules 112 is fixed at 16 due to current physical size constraints of the chassis. Each ISS may also included one or a plurality of management modules 108*a*-1, . . . , 108*a*-M, where in a particular embodiment of the ISS maximum number of management modules is two. It should be understood about that although each ISS unit may include one or more management modules 108, management functionality may alternatively be delegated to management modules physically residing within other ISS units so that the management module functionality of any particular ISS unit may reside elsewhere.

In one implementation, the integrated server system includes at least one primary switching fabric 104*a*-1 also referred to as a primary switch module, and advantageously includes a secondary switching fabric or secondary switch module 104*a*-2. The first (sometimes referred to as the primary) switch module 104*a*-1 operates to connect for communication each (any and all) the modules that are present in the ISS Unit, such as each of the Server Modules, Management Modules, Power supplies, cooling units, and any other module or unit that might be present. Having the second (or secondary) switch module 104*a*-2 operates to provide the same function as the first module as well as providing a redundant communication path between and among the modules or other units that are present in the ISS. Therefore while a second (or secondary) switch module is not required for any particular ISS, the presence provides significant benefits in high-end applications.

Each switch module provides a multi-connection switching fabric to link the modules with one another. In one embodiment, each switch has the equivalent of a switching matrix inside that establishes connections between different modules. For example, one or more of server modules, management modules, power supplies, fan modules, may be coupled together for communication. More particularly, the switch module may connect management module 1 with any of the server modules (for example with server module 5) or with the other management module, power supply module, fan modules, or the like. In general, the switch module makes one or a plurality of direct connection and is not typically implemented as a bus architecture that would allow only dedicated use by a single device or module (or a pair of communicating devices or modules) at any particular time. Switch module permits multiple simultaneous communication without collision.

One or a plurality of server modules (SM) 112 are also provided. Server modules are operative to serve data or other content in a manner that is well known in the art and not described in greater detail here. For example, a server module may be configured so as to enhance, improve, or optimize serving web pages, cached data or content, streaming video, or other data or content types as is known in the art. Server module hard disk drive configuration parameters that may be adjusted or modified according to the type and quantity of data or other content to be served. Such configuration and configuration utilities are known in the art, and include but are not limited to the data organization on the server hard disk drive (such as a modified RAID data organization and the RAID level).

Each SM 112 is advantageously implemented as a printed circuit (PC) board or card having an edge connector (or electrical contacts) adapted for plug-in connection to a mating receiving connector associated with a chassis backplane board. An SM also includes a PC card mounted processor, such as a microprocessor, microcontroller, or CPU, and associated memory. At least one mass storage device, such as a rotatable magnetic hard disc drive, optical drive, solid state storage device, or the like is mounted to the PC card and coupled to the processor. The mass storage device provides storage of the data or content to be served, or information concerning a location or link at which the data or content may be found if it is not served directly from the particular SM 112. While physical, functional, and operational aspects of the server modules are novel, especially in the areas of power consumption and power management, data or content throughput control (QoS throttling), heat dissipation and cooling, mass storage device characteristics, form factor and the like, the manner in which data or content is stored and served is generally conventional in nature, and not described in greater detail here.

A management module (MM) 108 is operable to provide overall ISSU monitoring and control. These management and control functions are described in greater detail in the context of the power management function. In general, each ISS unit will contain at least one MM 108 and in high-performance implementations and where redundancy is desired, each ISSU will include multiple MMs. In one embodiment of the ISS, two MM are provided. In such implementations, the two MMs may share responsibilities or more typically the second MM 108a-2 will provide redundant backup for the first MM 108a-1. Management Modules 108 are described in greater detail in a elsewhere in this description.

At least one, and advantageously a plurality of temperature sensors are disposed within the ISS enclosure. Each of these temperature sensors are desirably located at diverse locations within the enclosure so that the temperature of heat sensitive components may be adequately monitored and corrective action taken as needed. These diverse locations may be selected from locations on the internal surface of the enclosure, locations on the chassis, locations on one, more than one, or all of the server modules, management modules, switch modules, power supply modules, fan modules, or back plane, and may be integrated within solid state devices such as within the CPU.

In one embodiment of the invention, a fully populated ISS Unit having sixteen server modules, two management modules, two switching modules, two power supplies, two fan modules, and the backplane that supports these components, includes about 30 temperature sensors. Here each server module includes one temperature sensor integrated in the CPU and one on the edge connect board that supports the CPU and other circuitry as well as the hard disk drive. There is also at least one temperature sensor on each management module. While some embodiments may provide temperature sensing of the chassis, enclosure, or backplane, in the preferred embodiment no such temperature sensors are provided in these locations for reasons of reliability. As described in detail elsewhere in this specification, the preferred embodiment of the ISS Unit backplane does not include any active components. It merely provides printed circuit traces that provide electrical operating power (voltages and current) and communication, as well as providing physical support and connectors that receive the edge connector (or other) plug in modules.

In one embodiment, the temperature sensors have a preset temperature at which an output signal changes state so that they effectively generate an over temperature signal, in another embodiment the temperature sensors 150 generate a signal that indicates a temperature or temperature range. Sensors on different devices and/or at different locations may be of different types and/or the circuitry (for hardware based sensing and control) and/or algorithm (for sensing and control involving software or a computation element as well as hardware) may provide for different response to a particular temperature. Temperature awareness and control for an ISS Unit (ISSU) may even involve control based on multiple sensors, temperature differences, and/or a time rate of change of temperature.

Different physical device types may be used as well. For example, temperature sensors 150 may include a temperature sensor (such as for example a thermistor, thermal-couple, or other devices known in the art that have an electrical characteristic that changes with temperature.) Mechanical or electromechanical sensors such as sensors that use bimetallic switches to oven and close a connection may be used. In one embodiment, temperature sensing circuitry is integrated into a PC board mounted component or as a surface mounted component on the PC board of the server modules, management modules, switch modules, or other components of the ISS.

Independent of the form or the temperature sensor, the signals generated by the sensor or circuitry associated with the temperature sensors provide signals (analog or digital) to a management module (or a server module adapted to provide some management function) so that the intelligence built into the management module may control the operational parameters for one or more head generating elements (for example, the server, management, or switch modules) and the heat dissipating elements (for example, the fan modules or the individual fans within the or each fan module.)

Each ISS also advantageously includes dual redundant fan modules 114a, each of the modules including a plurality (typically two) of fans or other heat absorption or heat dissipation devices. Such cooling may be accomplished by conduction, convention, or radiation generally. Air or other fluid flow may be used. In one embodiment each fan module includes first 114a-1 and second 114a-2 electric motor driven fans.

Dual redundant fan modules 114, each having one or a plurality of fans, are advantageously provided so as to accomplish the required cooling function, at a reduced or minimized power consumption level, to provide cooling system redundancy, and to support hot-plug maintenance and/or replacement of the fans and fan modules. The manner in which ISS power consumption is reduced using this fan and fan module configuration are described elsewhere in this description.

Each ISS 102 includes at least one power supply, advantageously implemented as a hot-pluggable replaceable power supply module. Desirably, an ISS includes two such or dual-redundant power supply modules so as to provide sufficient power or energy for operating the switch module(s) 104, management modules 108, server module(s), and fan modules 114 within the ISS 102 as well as connected components that may draw power from the ISS. Power consumption and control aspects of the power supplies are described in greater detail elsewhere in this description.

A backplane providing operating power (for example, one or more of ±3 Volt, ±5 Volt, ±12 Volt depending upon the voltage and current requirements of the modules, and ground), communication (such as in-band and out-of-band communication via Ethernet, serial interface, and/or other interface) is mounted in chassis. The backplane also provides circuit protection in the form of circuit breakers or other over current or over voltage protection devices to protect the backplane traces and the modules that are or may be connected at the time of an undesired electrical component failure or other hazardous or damaging event. Protection may also be provided either in conjunction with the backplane or the modules themselves for under current or under voltage conditions.

A plurality of appropriately sized and shaped electrical connectors (for receiving PC board based edge connectors are disposed on the backplane PC board to connect to the management modules, server modules, and switch modules. The fan modules, power supply modules may couple directly to the backplane or communicate with backplane coupled modules (such as the management module) via separate couplings. In conventional manner, the chassis includes guides or slots that assist in physically locating and guiding the different modules or other components physically in place to make secure electrical contact with the mating connectors.

In a preferred embodiment of the invention, each ISSU includes a backplane in the form of a multi-layer printed circuit board that is devoid of active electrical circuit components. This increases the reliability of each ISSU and the system as a whole. It is noted that a preferred configuration of an ISSU provides multiple redundant hot-swappable server modules, management modules, power supplies, switch modules, and fan (cooling) modules. In such a configuration, there is no single point of failure as redundancy is provided everywhere. As only one backplane can reasonably be provided within an ISSU, only electrical traces (or wires) are provided on the backplane. In a preferred embodiment, no electrical circuit components are present and only electrical traces (and connectors) are present. While an ISSU having conventional backplane technology may be used to achieve the power saving benefits described throughout this specification, the inherent redundancy and reliability of the ISSU would be compromised by conventional backplane technology that incorporates active failure-prone circuit elements. For example, if a backplane failed in such conventional implementation, the unit would need to be powered down and all modules removed so that the backplane could be replaced. There are no other daughter boards other than the ones described. There are only connectors and traces, because active components could not be replaced without downtime.

All components are hot swappable to the backplane. For a sixteen server module configuration, it is desirable that a failure of any one not negatively impact the operation or performance of any other. (Of course control is provided for surviving server modules, management modules, switch modules, fan modules, and power supply modules to recognize a failure of another module or component and provide backup operation until the failure is corrected. Even with respect to power delivery, there is a separate set of traces and circuit breaker, fuse, or other circuit protection for every plug-in module (server, management, switch, and fan or cooling). For example, without such separate power plane for each module, if one server or other module were to short-circuit it would take down all of the other modules in the ISS Unit or box. It is noted, that even the failure of a capacitor within a circuit of a server module may act as a short circuit and that such capacitor failures may commonly occur. Each power plane for the servers are separate and isolated from one another. The inventive backplane and module connectivity protects the integrity and operation of the system from even direct short circuits. Also, since there are no active components in the backplane, the failed module is merely replaced and operation continues without need to repair or replace the backplane.

A serial interface 142 is preferably but optionally provided to support an alternative communication channel to the back plane bus between and among each of the server modules 112, management modules 108, switch modules, or other modules or units, as well as to certain external elements or components such as to a local management node 138 when present.

The provision of the serial communication channel is advantageous as it provides out-of-band communication should the in-band link (for example the ethernet link) fail. It also permits multiple alternative redundant communication. Diagnostics, console operations, and other conventional communication may also be provided. Communication via the local management mode or via a dial-in session are supported. The switch module(s) 104 may also be coupled to the management modules and the server modules as well as the external elements or components via the same serial bus or connection.

In one embodiment the serial bus provides an alternate communication channel. While this alternate communication channel is provided as a serial communication channel provided in one embodiment, it is understood that this represents a low cost and efficient implementation. Those workers having ordinary skill in the art will appreciate that various types of alternate communications channels or links may alternatively be provided, such as for example a Universal Serial Bus (USB), and IEEE 1394 (FireWire), or the like as are known in the art.

In a preferred embodiment, the serial interface architecture provides two serial ports for each of the sixteen server modules. Each management module picks off all two pairs from the sixteen and multiplexes them into a single physical outlet or connector, this is referred to as the AMPC architecture that includes the AMPC bus.

Figure 7:
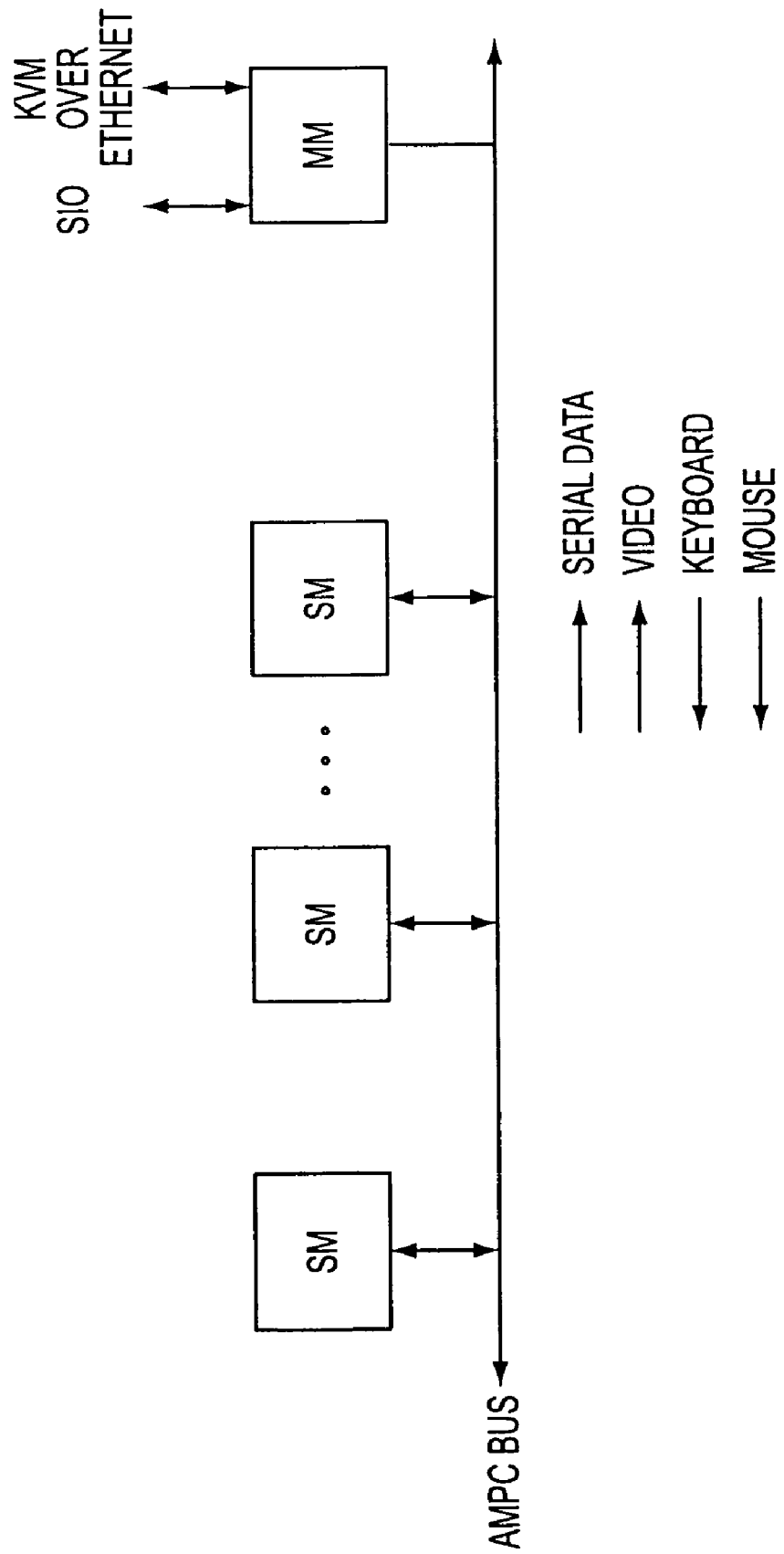
FIG. 7 is a diagrammatic illustration showing an exemplary embodiment of an AMPC bus and the connectivity of Server Modules and Management Modules to the bus to support serial data, video, keyboard, mouse, and other communication among and between the modules.

In one embodiment, now described relative to FIG. 7, the AMPC Bus provides a communications channel for communicating serial data, and video, as well as keyboard and mouse inputs. Typically, the serial data and any video data flows from one of the plurality of Server Modules to the Management Module(s) and the keyboard and mouse input or commands flow from the Management Module(s) to the Server Modules. Ethernet and serial I/O (SIO) connections are also provided to and from the Management Module for redundancy and alternative access.

This time-domain or time-sliced multiplexing and selection eliminates the need for so many physical connectors. Each Management Module has a selector for one of the 32 (2×16) serial lines, and places the selected serial pair on the single Management Module connector. Of course, multiple connectors either with or without some level of multiplexing may be provided, but such configuration is not preferred as it would likely increase the physical size of a Management Module unit and decrease the effective density of the ISSU. Besides the serial interface, keyboard, video, and mouse (KVM) data or signals can be transferred to and/or from the Management Module using the same or a similar scheme.

A load balancer 128 couples each ISS unit 102 via an uplink, such as a via a gigabit uplink, to a router 130. The load balancer 128 is of conventional and includes intelligence to sense the load on each of the operating servers and task the servers according to some predetermined rules or policy to serve data or content. When used in connection with the inventive power conserving features, the intelligent load balancer and router are operative to sense which of the server modules are in an active mode and to route server tasking to those active server modules according to some policy. Policies concerning how many server modules should be maintained in an active mode, what CPU core voltage and clock frequency such active server modules operate at, and other server module operating characteristics are described elsewhere herein. Router 130 is interposed between the load balancer 128 and a network of interconnected computers or information appliances, such as for example the Internet 132. Though advantageously provided, where appropriate, load balancers and/or routers may be eliminated. For example, they would not be required when only a single server module is provided. The structure and operation of load balancers 128 and routers 130 as well as the Internet 132 are well known and not described in further detail here.

Figure 8:
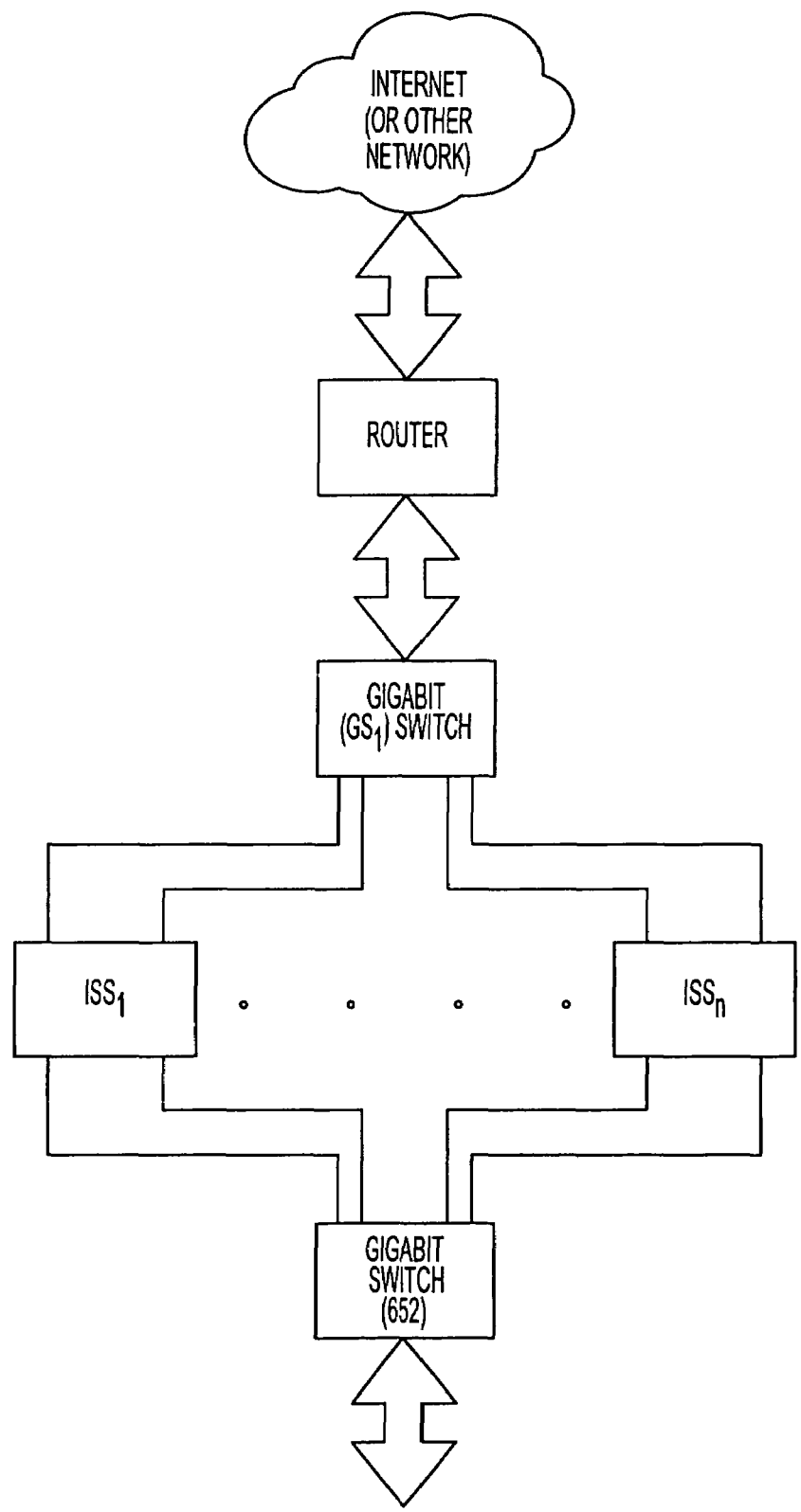
FIG. 8 is a diagrammatic illustration showing an exemplary embodiment of ISSU connectivity to gigabit switches, routers, load balances, and a network.

The bi-directional uplinks (and downlinks) 122, 124, 126 are communication links that provide high-capacity, high-throughput data communication between the ISS 102 (actually the switch module 104 of the ISS) and the external world, including the load balancer 128 and the Network Attached Storage (NAS) 120. Gigabit uplinks for uploading (and downloading) data or content provide high data rate communications and are known in the art and therefore not described in greater detail here. Alternatively, an up and down link can be aggregated to provide two uplinks as illustrated in FIG. 8, which shows a plurality of ISSU ($ISS_1, ISS_2, \ldots, ISS_n$) coupled to first and second Gigabyte switches GS1, GS2. Gigabyte switch $GS_1$ is coupled to a router which is in turn coupled to a network, such as the Internet. Gigabyte switch $GS_2$ may be similarly coupled.

Network Attached Storage NAS is optionally but desirably provided for several reasons. While the storage provided for each server module provides rapid access and response to requests, the size of the server module may necessarily limit the amount of data available on any particular server module. For example, 2.5-inch and 3.5-inch form factor hard disk drives may typically have capacities in the range of 32-Gigabyte to 100-Gigabyte of storage, though such capacity may be expected to increase as new recording media and head technology are developed. In any event, NAS in the form of one or more hard disk drives, RAID arrays, disk farms, or the like mass storage devices, arrays, or systems provide substantially greater storage.

Content that has been requested or that will be requested and served with high probability may be uploaded from NAS to one or more server modules and cached for later serving. Another benefit of the attached NAS is that a single copy of data is provided that is accessible to all the server modules and can be accessed either directly when only one is present, or through a switch when more than one is present. It is noted that the switch module coupling the ISSU to the load balancer is different than the switch module from the ISSU to the NAS.

Alternative access nodes and connectivity are provided for monitoring and managing operation and configuration of a particular ISS, component or module of an ISS, or ISS and/or components coupled to an ISS for which monitoring or management are desired. In one embodiment, this access is provided by a remote internet management node 136 coupled via an internet connection 134 to the internet 132 and hence via router 130, optional load balancer 128, and uplink/downlink 124, 126 to the ISS 102. Within each ISS 102, monitoring and/or management operations will typically be carried out by a defined communication path (typically over the backplane) to one or more of the management modules 108. It is noted that the backplane provides multiple sets of traces for multiple communication channels, including ethernet and serial channels, and that the backplane is not limited to a single bus. Monitoring and management access from remote Internet management node 136 over an Internet connection 134 is desirable as it provides additional redundancy and convenient monitoring and control using readily available protocols from virtually any remote location.

An alternate path is desirably provided to a local management node 138 over the serial communications channel 142, and a second alternate path may desirably be provided from the local management node 138 to one or more of (and preferably to all of) the management modules over a second ethernet communication channel or link 140 that is different from the ethernet control channel. Monitoring and management access from local management node 138 over ethernet communication link 140 is desirable as it provides another alternative connection, communication, and possible control when desired, and advantageously permits connection using standard TCP/IP software and protocols. A further alternate communication path may desirably be provided via a remote dial-in management node 146 over a Plain Old Telephone Service (POTS), typically trough the local management node 138, and then either over the ethernet 140 or the serial connection 142. While communication with the ISS over any of these communication channels may itself suffice, the provision of alternate links and communication schemes provides for considerable flexibility in access, management, and control. The alternate paths also provide considerable redundancy from single channel failure in order to diagnose and service the ISS or ISS-based system in the event of a failure. For example, should a problem occur that disables the switch modules 104 and access via the gigabit uplink/downlink paths 124, 126, communication with the management modules 108 and with the rest of the ISS will still be possible on site either over serial bus 142 or ethernet link 140. When access from a remote location is desired, either dial-up (such as via a phone modem) or Internet based access is generally; however, each serves as a redundant alternate path for the other in the event of failure.

It is particularly noted that the integrated structure of these ISS units provides a small form factor (2U high chassis/enclosure); high server module density (sixteen server modules per ISS in one embodiment); switch module, cooling/fan module, power supply module, management module, and server module hot plug-and-play and high availability via redundancy; lower energy or power consumption than conventional servers; and many other advantageous features as described in greater detail herein.

Many different types of servers architectures are known in the art. Typically, such servers have at least one processor with associated fast random access memory (RAM), a mass storage device that stores the data or content to be served by the server, a power supply that receives electrical power (current and voltage) from either a battery or line voltage from an electrical utility, a network communication card or circuit for communicating the data to the outside world, and various other circuits that support the operation of the CPU, such as a memory (typically non-volatile ROM) storing a Basic Input-Output System (BIOS), a Real-Time Clock (RTC) circuit, voltage regulators to generate and maintain the required voltages in conjunction with the power supply, and core logic as well as optional micro-controller(s) that communicate with the CPU and with the external world to participate in the control and operation of the server. This core logic is sometimes referred to as the Northbridge and Southbridge circuits or chipsets.

From a somewhat different perspective, variations in server architecture, reflect the variations in personal computers, mainframes, and computing systems generally. The vast structural, architectural, methodological, and procedural variations inherent in computer systems having chips, chipsets, and motherboards adapted for use by Intel Processors (such as the Intel x86, Intel Pentium™, Intel Pentium™ II, Intel Pentium™ III, Intel Pentium™ IV), Transmeta Crusoe™ with LongRun™, AMD, Motorola, and others, precludes a detailed description of the manner in which the inventive structure and method will be applied in each situation. Therefore in the sections that follow, aspects of the inventive power management and ISS system architecture are described first in a general case to the extent possible, and second relative to a particular processor/system configuration (the Transmeta Crusoe Processor). Those having ordinary skill will appreciate in light of the description that the inventive structure and method apply to a broad set of different processor and computer/server architecture types and that minor variations within the ordinary skill of a practitioner in the field may be made to adapt the invention to other processor/system environments.

Figure 9:
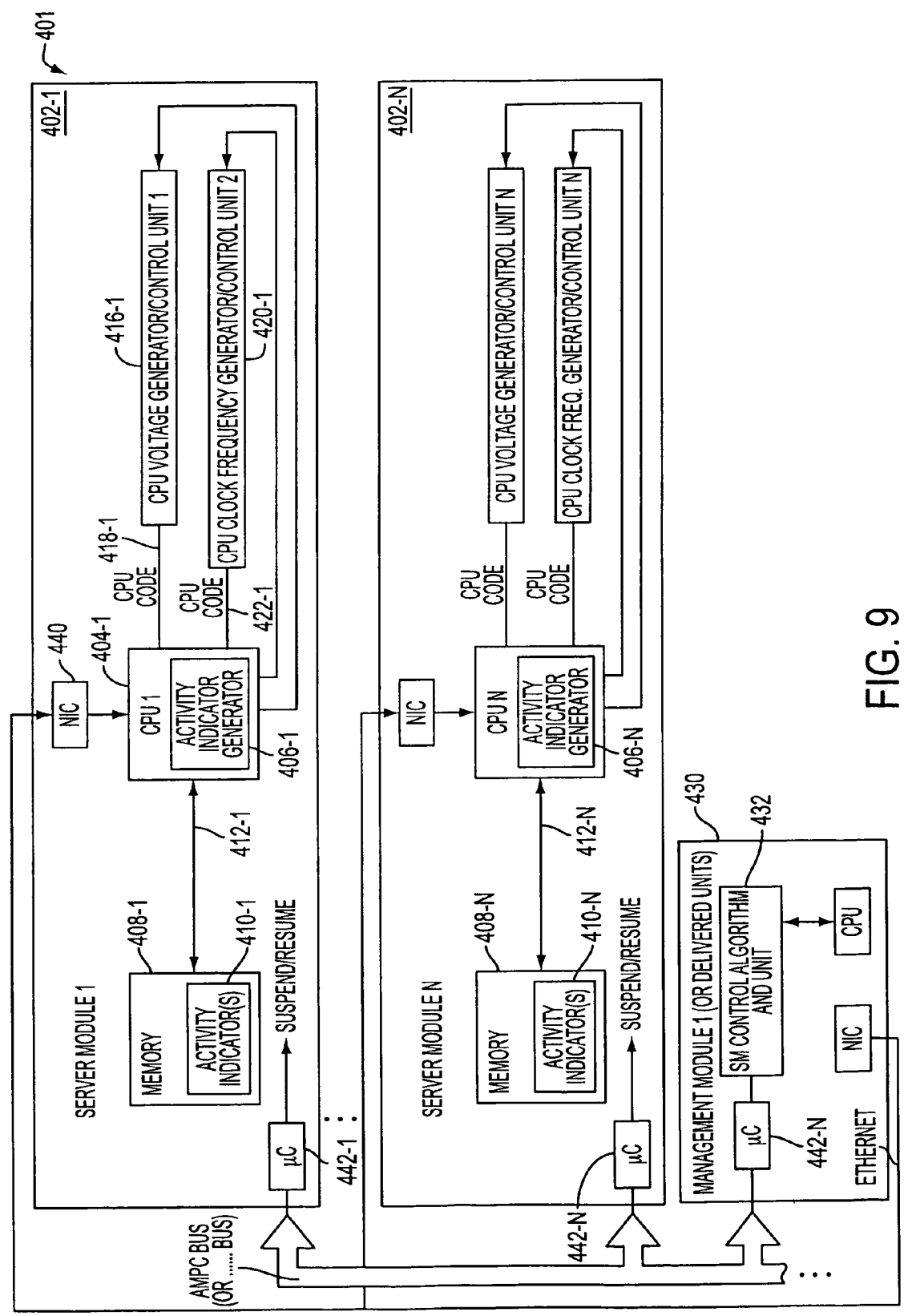
FIG. 9 is a diagrammatic illustration showing an embodiment of the inventive power conserving power management between two servers and a manager.

Before describing particular implementations that relate to more or less specific CPU designs and interfaces, attention first directed to a simplified embodiment of the inventive system and method with respect to FIG. 9. In this embodiment, at least two (and up to n) server modules 402-1, ..., 402-N are provided, each including a CPU 404 and a memory 408. CPU 404 includes an activity indicator generator 406 which generates activity indicators, and either (i) communicates the activity indicators to memory 408 for storage in an activity indicator(s) data structure 410, or not shown, (ii) communicates them directly to a server module control unit and algorithm 432 within management module 430. Different types of activity indicators such as are described elsewhere in the specification, such as for example an idle thread based activity indicator may be used. Whether stored in memory or communicated directly, the activity indicator(s) are used by the management module to determine the loading on each of the server modules individually and as a group. In one embodiment, activity information or indicators created on any one computer or device (such as a server module) is accessible to a manager or supervisor via standard networking protocol.

Although not illustrated in FIG. 9, analogous structure and signals generated and received may be used to control the operation of core logic circuits to thereby control core logic voltage and core logic clock signals in a manner to reduce power consumption where such core logic power management is provided.

Voltage and frequency are regulated locally by the CPU using an activity monitoring scheme, such as for example one of the activity monitoring scheme illustrated in Table I.

TABLE I

Exemplary Activity Monitoring Schemes carried out in CPU or PMU

|  | Carried out by CPU | Carried out by PMU |
| --- | --- | --- |
| Application Layer | Port Address | NA |
| Network Layer | TCP/IP | NA |
| Physical Layer | Idle Threads, Activity Counter | I/O Activities |

This power management scheme may be interpreted in one aspect as providing a Mode1-to-Mode2 and Mode2-to-Mode1 power management scheme, where both Mode 1 and Mode2 are active modes and the state of the CPU in either Mode 1 or Mode 2 is controlled locally by the CPU, and in another aspect as providing a Mode3 (inactive mode or maintenance of memory contents only). Mode3 control may also be performed locally by the CPU, but in one of the preferred embodiments of the invention, entry into a Mode 3 stage is desirably controlled globally in a multi-CPU system. Where the multi-CPU's are operative with a plurality of servers for multi-server power management, the Management Module (or a Server Module acting as a manager on behalf of a plurality of server modules) determines which Server Module should enter a Mode 3 state using the Server Module control algorithm and unit 432. Activity monitoring of individual Server Modules 402 is desirably based on the standard network protocol, such as for example SNMP. Therefore the activity indicators may be retrieved from the CPU 406 or memory 408 via NIC 440 as is known in the art. A communication link coupling microcontrollers (μC) 442 together, and in particular the microcontroller of the Management Module with the microcontrollers of the several Server Modules. This permits the management module to communicate commands or signals to the server modules which are received by the microcontrollers even when the CPUs are in a suspended state (Mode 3). In so providing for monitoring over the first link (the Ethernet) and control over the second link (the AMPC bus), the server modules may be monitored for activity and controlled globally to reduce power consumption while providing sufficient on-line capacity. It is noted that the power management may be effected by altering either or both of the CPU clock frequency 420 or the CPU voltage 416.

Although a separate management module 430 is illustrated in FIG. 9, it should be understood that the management functionality generally, and the server module control algorithm in particular may be implemented by one of the operating server modules. For example, the control algorithm would be implemented as a software or firmware procedure executing in the CPU and processor of a server module designated according to predetermined rules, policies, or procedures to be the master.

It is noted that although several of the modes described conserve power, they do not compromise performance, as the cumulative combination of server modules is always maintained at or above minimum targeted performance.

Figure 10:
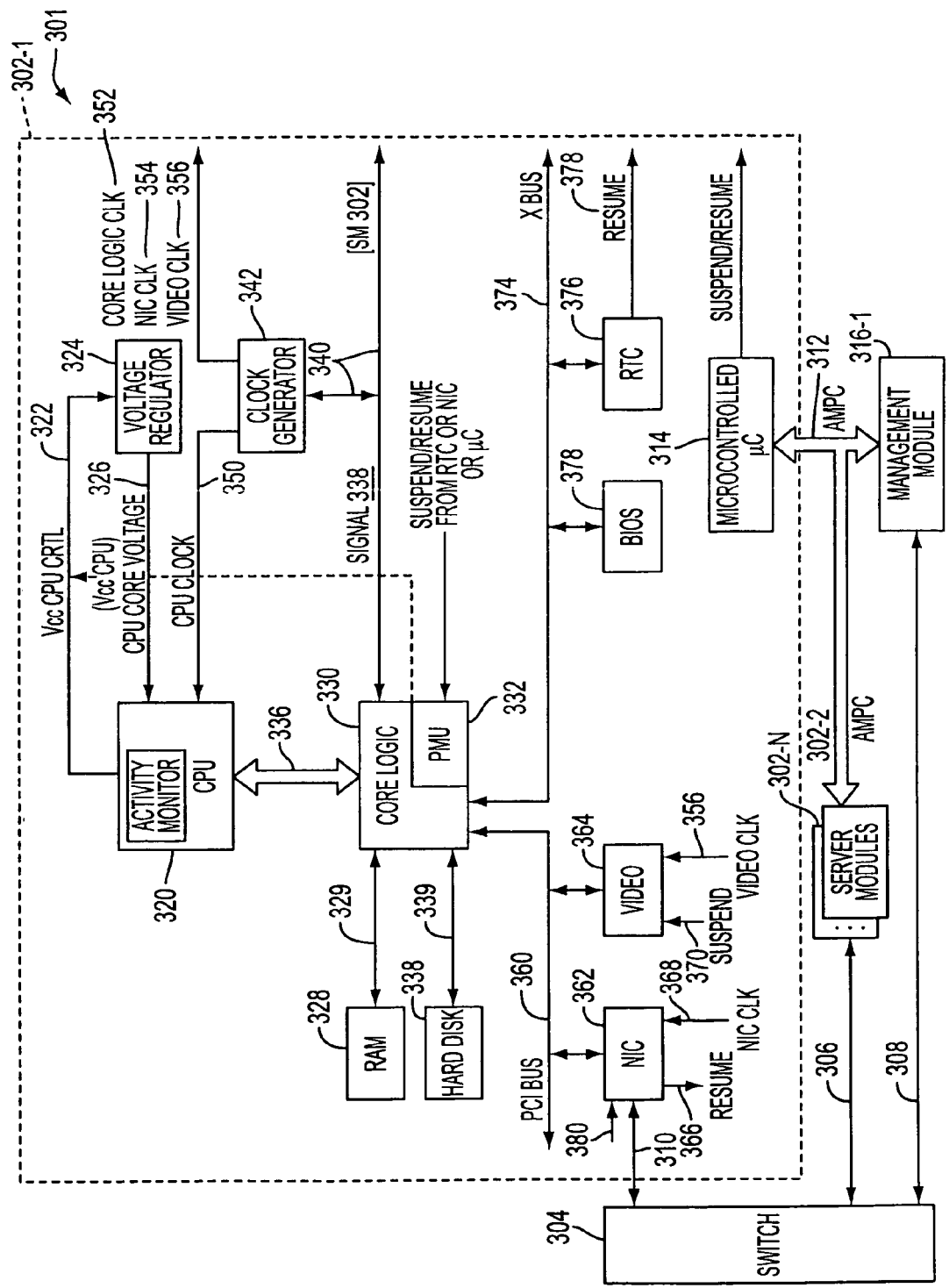
FIG. 10 is a diagrammatic illustration showing an alternative embodiment of a server system showing detail as to how activity may be detected and operating mode and power consumption controlled in response.

In FIG. 10 there is illustrated an exemplary system 301 including a server (such as for example, an ISSU server module) 302-1, coupled to a switch (such as for example, an ISSU switch module) 304, and through the switch 304 and optionally via a micro-controller (pC) 314 within server 302 over a separate (optional) direct bus connection 312 (such as for example, the AMPC bus made by Amphus of San Jose, Calif.) to a power management supervisor (such as for example, ISSU management module) 316. As described elsewhere herein, switch 304 is responsible for connecting the various server module(s) 302, management module(s) 316, and other components that are or may be controlled to achieve the power conservation features of the invention. Recall that such subsystems as the power supply (not shown) and cooling or fan modules may also be coupled through the switch 304. The connectivity and signals shown in the diagram are intended to show significant control paths pertinent to the operation of the invention, and therefore some signals that are conventional or do not illustrate the operation of the invention are not shown to avoid obscuration of the invention.

Attention is now focused on the internal structure and operation of the server module 302. During operation CPU 320 executes commands or instructions, or when no instructions are present to be executed, executes idle threads. The activity level of the CPU is monitored and a control signal Vcc_CPU_control 322 is generated based on that sensed activity or lack of activity. The manner in which this activity is sensed or the manner and characteristics of the Vcc_CPU_control signal will typically vary depending on the processor type, operating system, and other factors specific to the system architecture. By way of illustrative example, an indication as to the CPU activity or lack of activity may be generated by monitoring by executing an application layer function call that returns a value indicating the idle thread execution based activity. This is possible in the Microsoft Windows 98, 2000, and NT operating environments, for example.

As the name implies, the Vcc_CPU_control signal 322 which is an input signal to voltage regulator 324 controls or influences the CPU core voltage Vcc_CPU 326. As described elsewhere in this description, the CPU core voltage 326 may be raised and lowered in conjunction with the CPU clock frequency to provide adequate switching response of CPU circuits without excessive voltage. Although this embodiment illustrates that the VCC_CPU_control signal 322 is generated within the CPU, in an alternative embodiment, it may be generated within the core logic block 330. In one embodiment, the CPU clock is adjusted based on a signal from the core logic and the CPU voltage is adjusted on the basis of the CPU itself. This is due to the fact that the voltage change is desirably synchronized in time with the frequency change. In some sense, this control may be viewed as including an effective link from the core logic to control the voltage regulator output.

Core logic 330 includes a Power Management Unit 332 of which many types are now known; however, one early example of a Power Management Unit is described in co-pending U.S. patent application Ser. No. 09/558,473 as well as in U.S. Pat. Nos. 5,396,635, 5,892,959 and 6,079,025 (each of which is herein incorporated by reference) by the inventor of the present application as well as in the other applications related thereto. In operation, PMU 332 receives a signal over bus 336 and generates an output signal 338 that is communicated over bus 340 to clock generator 342. Clock generator block 342 includes circuitry that generates a CPU clock 50, a core logic clock signal 352, a Network Interconnect Card (NIC) clock signal 354, and a video clock signal 356.

RAM 328 is coupled to core logic 330 via DRAM control line and hence to the CPU via bus 336. Hard disk drive 338 is similarly coupled to core logic 330 to CPU via bus 336. In one implementation, Redundant Array of Independent Disc (RAID) data storage is provided for the server modules. As is known, this RAID storage provides considerable data redundancy. In order to implement this RAID in a power management efficient manner, two IDE controllers (or enhanced IDE controllers) are used to interface to two separate disk drives. Provision of two hard disk drives supports RAID Level 0, RAID Level 1, and RAID Level 0+1 implementations. Aspect of the RAID power management disk drive longevity are described in co-pending U.S. Provisional Application Ser. No. 60/236,062 entitled System, Apparatus, and Method for Power Conserving and Disc-Drive Life Prolonging RAID configuration filed 27 Sep. 2000, hereby incorporated by reference. It is noted that providing RAID storage or multiple disk drives on the servers is advantages though not required.

Clock generator 342 includes clock signal generating and logic circuitry or other means for generating a CPU clock signal at the desired frequency or for selecting a CPU clock signal from an available plurality of clock signal having different frequencies. Under the inventive power management scheme, the clock frequency is adjusted downward within a permissible CPU clock frequency range to provide a CPU processing power that matches the present need, and to the extent that the present need is below the maximum capability of the processor when operating at full permissible clock frequency, to reduce the power consumption of the CPU. As the CPU core voltage may be reduced below a maximum voltage when the clock frequency is below its maximum frequency, the CPU core voltage may be lowered with the clock frequency or speed.

A PCI bus 360 coupling NIC 362 and Video processor 364 is provided and interfaces with CPU 320 via Core logic 330. NIC 362 generates and provides a resume output 366 and NIC Clock input signal 368, and Video processor 364 is provided with a video clock signal 356 from the clock generator 342 and a suspend input signal 370. It is noted that the suspend and resume signals may come from multiple sources to affect the desired control and management.

In this illustrative embodiment, an X-bus 374 is provided to couple the Real-Time Clock (RTC) 376 and BIOS 378 to the core logic 330 and via bus 336 to the CPU as required. RTC 376 may generate a resume output signal 39. This RTC generated resume signal 379 is therefore operative to activate PMU 332, core logic 330, and CPU 330 under a predetermined time or alarm condition. For example, the RTC may be set to generate a resume signal 379 at 8:00 am local time every day to bring the server module 302 back online.

The NIC resume signal may be generated when a specific packet is received. When generated in one of these manners and communicated to the PMU 332 it is operative to place the core logic 336 back into an active state and hence CPU 320 into any selected state of mode. One situation in which the NIC resume signal may be generated is when the server module is in a powered-on but inactive state, such that the CPU clock is stopped (or operating at an extremely low clock frequency). Under such condition, a simple way of waking the server module 302 is to communicate a signal 380 from management module 316 via switch 304. As the NIC will typically be kept active, it will receive the signal 380 and generate the resume signal 366.

It is noted that each of the elements, such as the hard disk drive, Video processor and other power consuming elements may include means for receiving a control signal that places them into a power conserving state or that brings then out of on or more power conserving states into a full power and performance mode.

It is noted that the embodiment illustrated in FIG. 10 represents a system that might utilize any of a number of conventional processors or CPU, and might for example utilize a CPU of the Intel Pentium, Pentium II, Pentium III, or Pentium IV types made by Intel Corporation of Santa Clara, Calif., various Advanced Micro Device CPUs, CPUs made by Transmeta, as well as other processors and CPUs as are known in the art.

Figure 11:
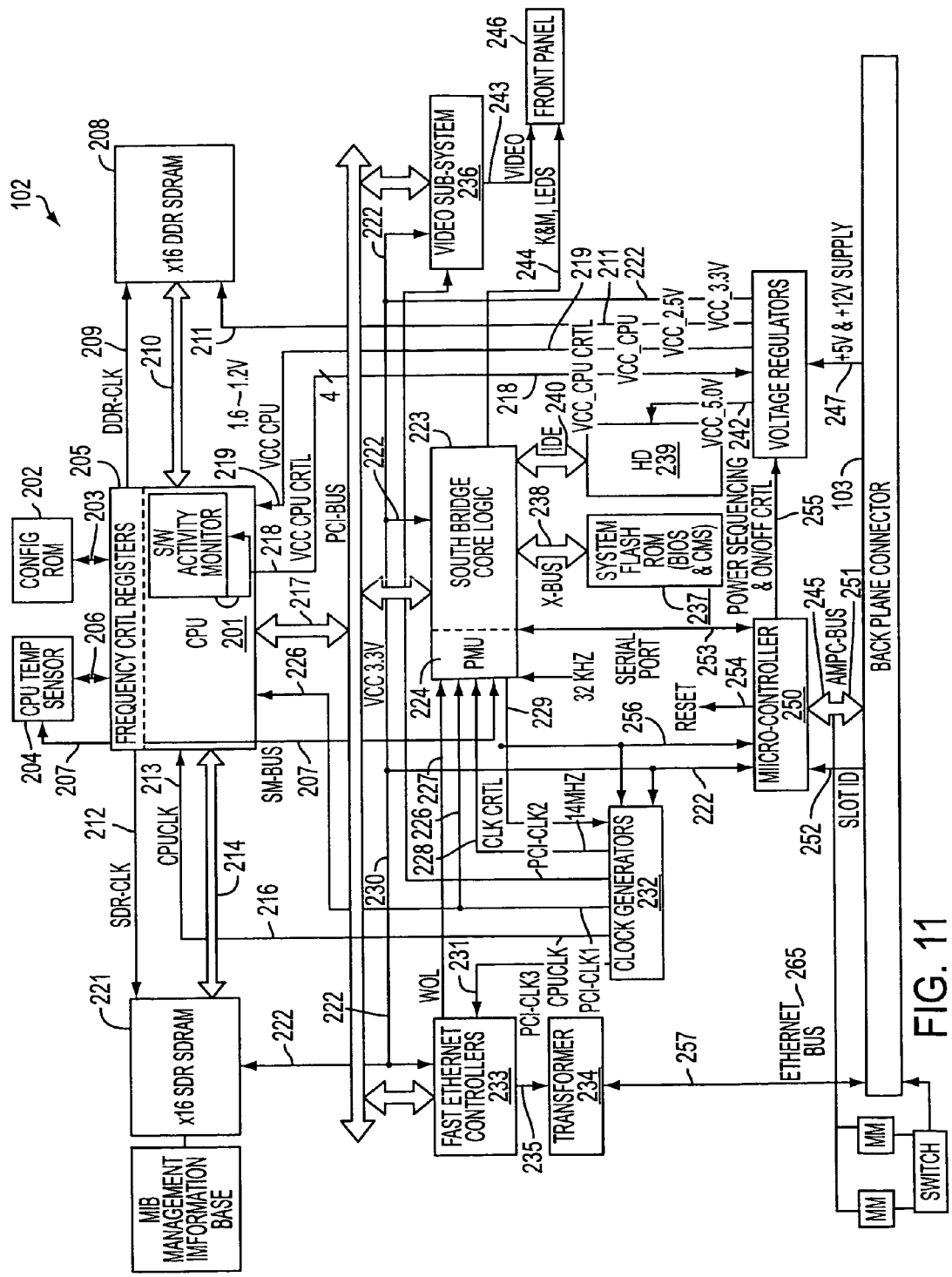
FIG. 11 is a diagrammatic illustration showing another alternative embodiment of a server system particular adapted for a Transmeta Crusoe™ type processor having LongRun™ features showing detail as to how activity may be detected and operating mode and power consumption controlled in response.

Having now described two generic systems and methods for power managing a server having at least one CPU, attention is now directed to FIG. 11, where is illustrated a functional block diagram of an embodiment of an server module 102 adapted for use with the Transmeta Crusoe processor having the LongRun internal power management feature. The Transmeta CPU chip design is identified separately only because it provides for the choice of several (actually 15) different Mode 2 operating levels having different CPU clock frequency and CPU core voltage combinations.

For one of the inventive server modules, each server module includes at least one processor such as a CPU 201. Other embodiments provide for multiple CPUs however for the sake of simplicity, the description focuses on single CPU configurations. CPU 201 includes a plurality of frequency control registers 205. The frequency control registers are loaded with values used to control the clock frequency at which to CPU core runs. A configuration ROM 202 coupled to the CPU is operative to provide a basic input output system during a CPU boot process. A CPU temperature sensor 204 is also coupled to CPU 201 and is operative to modify the values stored in the frequency control registers in response to a sense to CPU temperature so that CPU temperature is maintained within acceptable operating limits. The CPU temperature sensor 204 also communicates with power management unit (PMU) 224 which is itself part of the South Bridge unit 223. PMU 224 also receives a 32 KHz signal which is used for the real-time clock within the PMU. The PMU 224 is identified as a component or sub-system of the South Bridge Unit 223, though in fact each may be implemented as a separate unit. Structure in function of PMU 224 and South Bridge 223 are described in greater detail hereinafter.

CPU 201 is coupled to a memory 208, such as a 16-bit synchronous dynamic random access memory (×16 DDR SDRAM), via bus 210. Memory 208 also receives a clock signal (DDR-CLK) 209 generated as an output calls frequency control registers 205. This clock signal 209 is generated from values in the frequency control registers. In one embodiment be primarily SDRAM is soldered on board. Additional or expansion RAM 221 may optionally be provided and is coupled to the CPU via bus 214. Optional expansion RAM 221 receives a clock signal (SDR-CLK) 212 also generated by circuitry from frequency control registers 205. The DDR RAM is a higher performance memory than the SDR RAM and must be adjacent to the CPU as the result of bus path length issues associated with the DDR memory. It is for this reason that DDR memory cannot be used in an expansion slot and the main and expansion memory are treated somewhat differently.

CPU 201 also receives a CPU clock signal (CPUCLK) 213 from a clock generating unit 232. Clock generator unit 232 receives a clock control signal 229 from the PMU 224 component of the South Bridge Unit 223. This clock control signal 229 is generated within the PMU. Clock generator unit 232 also generates a plurality of additional clock signals. These include a first PCI clock signal (PCI-CLK1) 216 operating at a first frequency or rate which is output and communicated to an input port or pin of CPU 201 to control the clock rate or switching rate, a second PCI clock signal (PCI-CLK2) 230 operating at a second frequency or rate which is output or communicated to Video Subsystem 236, and a third PCI clock signal (PCI-CLK3) 231 which is output by the clock generator unit 232 and communicated to the Ethernet Controllers Unit 233. Ethernet controllers 233 are desirably fast ethernet controllers capable of operating at a high data rate. Ethernet controllers 233 generate an output signal 235 that is communicated to a Transformer unit 234. Transformer unit 234 receives this input and generates an output in the form of a signal 257 and places this signal 257 on an ethernet bus 265 via backplane connector 103. Ethernet controller Unit or Network Interface Card (NIC) 233, may contain one or a plurality of ethernet controllers, receives a Wake-On-LAN (WOL) signal 227. This WOL signal causes the NIC 362 to generate a resume signal which is sent or otherwise communicated to the PMU. In addition to the PCI-CLK3 signal 231, the ethernet controllers unit 233 is coupled to the PCI-bus 217 and thereby to other units within the system that also attach to PCI-bus 217, such as for example the CPU 201, South Bridge 223, and Video Subsystem 236.

A clock signal 228 is also generated and communicated to the input of PMU 224. These different outputs of clock generator unit 232 are nominally at a frequency suitable for switching circuits within their respective destination units. Clock generator 232 and micro-controller 250 also each receive a signal 256 which is operative in the clock generator unit and in the micro-controller 250.

Video subsystem 236 is coupled to PCI-Bus 217 and receives PCI-CLK2 signal 230 from clock generators 232 and operating voltage VCC (nominally at 3.3 volts) as already described. Video Sub-system 236 is responsible for generating a video signal 243 and outputting or making the video signal available for communication elsewhere or to a display (not shown), such as the display on the front panel 246 of rack or bay mounting one or more ISSU. Front panel 246 may also optionally include video or LCD displays, indicator lights or LEDs, and the like for displaying status or other information or data. Keyboard (K) and mouse (M) (or other pointing device or selection mechanism) may also be provided and brought out to the front panel (or other location) for access.

Voltage regulator Unit 241 receives nominal +5 volt and +12 volt direct current voltages from power supply module or modules 110 over a backplane connector 103. Each of the expansion or secondary RAM 221, Fast Ethernet Controllers 233, clock generators unit 232, South Bridge 223, Microcontroller 250, and video sub-system 236 receive an operating voltage VCC 222 nominally at 3.3 volts in this particular embodiment (and a corresponding operating current). While the same VCC is used in this particular embodiment, it will be understood that the supply or VCC voltage is selected to match the operating characteristics of the device or circuits and that each circuit or device need not operate at the same voltage. It will also be appreciated that the voltage for one or more of these units may be reduced, sequenced (ON/OFF), and/or turned OFF entirely using appropriate power control and in some cases protection circuitry. The supply voltage or VCC provided to the CPU 201 in the inventive ISS is controlled or modulated in a particular manner to achieve significant power consumption reduction. These circuits and methods which utilize one or both of CPU clock frequency control and CPU core voltage control are described in greater detail elsewhere in this description.

In one embodiment of the inventive server module, onboard voltage regulators 241 generate a nominal regulated 5.0 volt output voltage signal (VCC_5.0V) 242 for hard disc drive 239, a nominal regulated 3.3 volt output voltage signal (VCC_3.3V) 222 which is communicated to primary RAM 208, expansion or secondary RAM 221 (when present), Fast Ethernet Controllers 233, clock generators unit 232, South Bridge 223, Micro-controller 250, and video sub-system 236. Primary RAM 208 is selected as DDR SDRAM to advantageously operate at a lower voltage of 2.5 volts and receive a separate supply input signal (VCC_2.5V) from voltage regulators 241. In an alternative embodiment, the primary RAM may operate at a somewhat higher voltage (such as 3.3 volt), but in such situation the power conservation achieved by the ISS will not be as great. Secondary or expansion RAM may also alternatively be selected to operate at a lower voltage (such as 2.5 volts) to achieve somewhat greater power consumption savings when present. It is noted that while certain voltage ranges, such as 2.5 volt, 3.3 volt, and 5.0 volt are recited for particular circuits, these voltages are merely exemplary and should not limit the scope of the invention. It will also be appreciated by those workers having ordinary skill in the art in light of the description provided herein, that certain voltage relationships and the sequencing, modulating, or other control of voltages and/or current provides significant power conservation as compared to conventional systems, devices, and techniques.

In alternative embodiments of the invention, the operating voltage (VCC) to each unit or to selected groups of units may be supplied via different wires, traces, or busses, so that the on/off condition and/or voltage level to each device or group of devices may be controlled separately. Control logic may also be provided within each unit so that even where a common wire, trace, or bus couples an operating voltage to the unit, control signals communicated to the logic may exert further control to remove voltage from the unit or to sequence the voltage on and off according to some predetermined or programmable rules, and/or to reduce the voltage level.

Hard disc (HD) drive 239 is coupled to the Southbridge unit 223 via conventional means, in this particular embodiment, via an IDE connection 240. In the chipset community, Northbridge refers to the major bus controller circuitry, like the memory, cache, and PCI controllers. The north bridge may have more than one discrete chip. In analogous manner, Southbridge refers to the peripheral and non-essential controllers, like EIDE and serial port controllers. As used here the Southbridge Unit refers to the unit that has these type of functionality as it couples the PCI-Bus 217 with the X-Bus 238 to the System Flash ROM, and to the IDE (or EIDE) bus 240 that couples the Hard Disc drive 239. The structure and functions of Southbridge units, typically implemented as a single chip, are known in the art.

System Flash ROM 237 (such as may be used for storage of a Basic Input/Output System (BIOS) and CMS is coupled to South Bridge Unit 223 via a bus 238, such as for example by an X-bus 238.

In this light, one notes from the server module design of FIG. 11, that CPU 201 receives a processor supply voltage (VCC_CPU) signal 219 as an input supplied by voltage regulators 241, and that voltage regulators 241 receive a processor supply voltage control signal (VCC_CPU_ctrl) 218 from the CPU.

Micro-controller is coupled to and receives a slot-ID signal 252 and a signal 245 over Amphus Magic Peripheral Control (AMPC) bus 251. The Slot-ID signal 252 identifies the slot and is used by the micro-controller 250. Micro-controller 250 is also adapted to receive a signal 253 over a serial connection from the South Bridge unit 223. Micro-controller 250 may also generate a reset signal 254.

Advantageously, the CPU supply voltage (or CPU core voltage) is not fixed or constant, but is adjustable either continuously or in a finite number of defined increments so as to maintain CPU device (e.g. transistor) switching speed at a particular clock frequency while minimizing power consumption by the CPU. In a particular embodiment using one of the available Transmeta Corporation processors (for example, the Model TM3200, Model TM5400, or Model TM5600 Crusoe processors made by Transmeta of Sunnyvale, Calif.), this voltage is controllable from a maximum voltage and maximum CPU/processor clock frequency to a minimum voltage and minimum frequency. In one embodiment, the maximum voltage is about 1.6 volts at a clock frequency of about 530 MHz to a minimum voltage of 1.2 volts at a frequency of 300 MHz. Operation at somewhat higher and lower voltages and/or at somewhat faster clock rates is likely possible for at least some group of devices, but are not within the published operating range of this processor chip.

Operating power and clock switching frequency to the CPU 201, primary RAM, expansion RAM (when present), Video Subsystem 236, Fast Ethernet Controller 233, South Bridge Unit 223, and Hard Disc drive (HD) 239 in one embodiment are controlled as indicated in Table 1. In this power management and control scheme, the first mode (first state) is entered when the CPU is running at maximum frequency. Maximum frequency typically requires maximum voltage.

The second mode (second state) is implemented by using Transmeta LongRun power management scheme. This LongRun™ power management scheme is summarized elsewhere in this description as well as in the publication *LongRun™ Power Management—Dynamic Power Management for Crusoe Processors*, Marc Fleischmann, Transmeta Corporation, 17 Jan. 2001; herein incorporated by reference.

The third mode (third state) is entered when activity level drops below a certain threshold. This activity can be either monitored by an external supervisor, or monitored by the Server Module (SM) itself and then reports the result to the external supervisor. The server module (also referred to as a computer node) will either suspend itself after receiving instruction from the external supervisor or after the PMU inside the SouthBridge or other core logic receives a suspend signal from the microcontroller.

Aspects of an embodiment of the manager or management module are now described. As its name implies, the Management Module is responsible for performing a variety of management or supervisory functions. Some of these functions are highlighted immediately below, others are described relative to other aspects of the invention throughout the specification.

The Management Module can connect either serial port on any of the Server Modules or the serial port on the Management Module to the back panel DB9 connector. In one embodiment, this is a full eight-signal switch (not only TxD and RxD). The Terminal Server portion of the Management Module provides Ethernet connection services for all of the Server Modules' serial ports.

Figure 12:
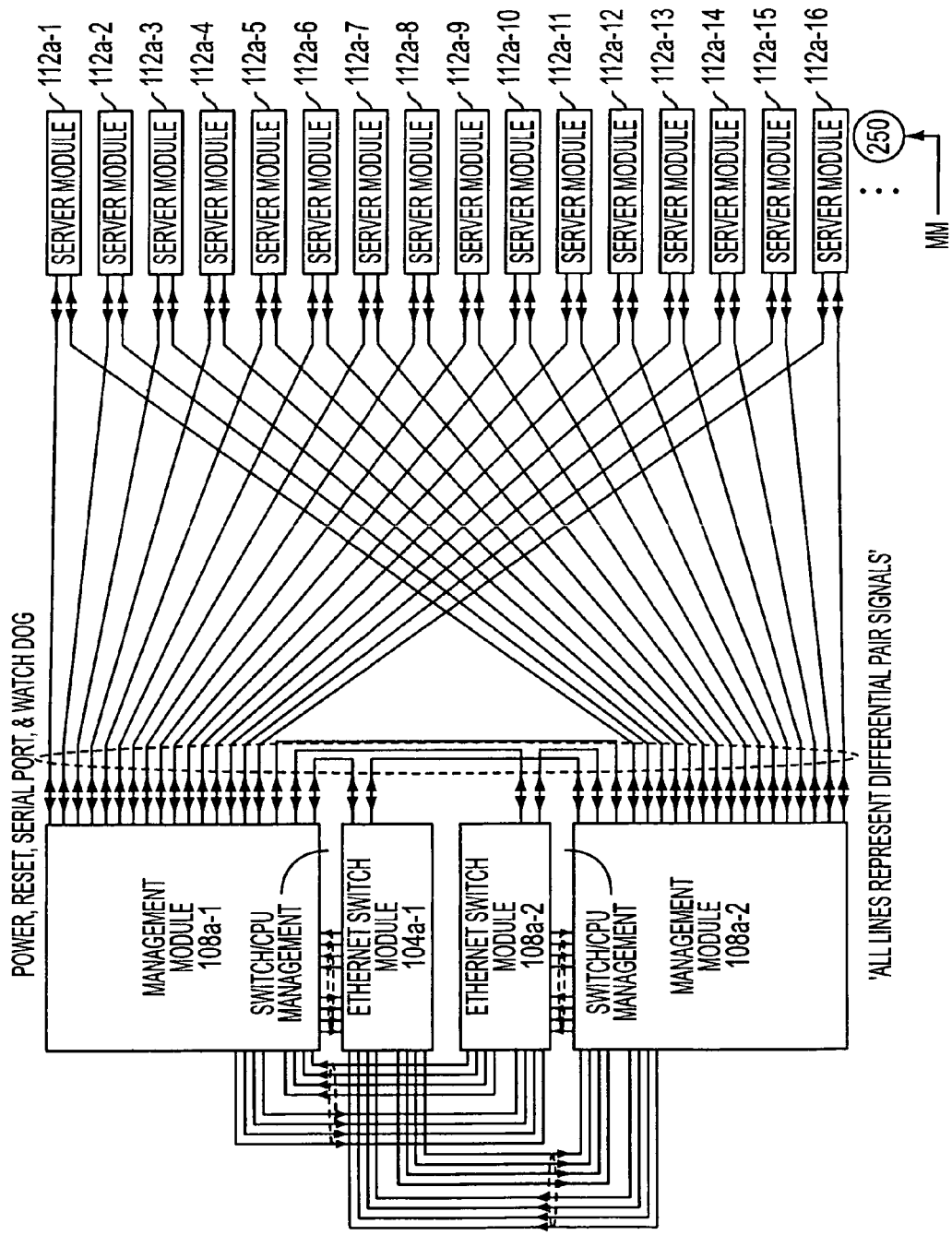
FIG. 12 is a diagrammatic illustration showing aspects of the connectivity of two management modules to a plurality of server modules and two Ethernet switch modules.

FIG. 12 is a diagrammatic illustration showing the relationship and connectivity between a plurality of server modules 112, two management modules 108, and two Ethernet switch modules 104. In this particular embodiment, the lines represent the differential pair signals that are used for signaling. The Management Module is also responsible for Ethernet switch management.

Management, control, and status reporting of any present Switch Modules are performed via the Management Module. Industry standard SNMP MIBs (Management Information Bus) are advantageously implemented providing support for existing data center management tools and is under security protection. Other protocols may alternatively be used.

Embodiments of the Virgo ISSU contains dual redundant Fan Modules consisting of three fans each. The Management Module is responsible for Fan Control and Monitoring. Each fan's speed is desirably controlled to reduce system noise and extend fan life, while maintaining internal temperatures at appropriate levels. When an excessive temperature reading or fan failure is detected, alerts are sent via email or SNMP, depending on system configuration.

The Management Module is also responsible for Power Supply Control and Monitoring. The power supplies of the Server and Switch Modules are controlled by the Management Module, with the ability to cycle power or shut down a module upon receipt of an appropriate network control center message and is under security protection. All power supplies, either chassis or module based, are monitored. When an alarm or failure condition is detected, an alert is sent via email or SNMP depending on system configuration.

The Management Module provides out of band reset capability (reset control) for Server and Switch Modules. The mechanism used for reset depends on system configuration and is advantageously under security protection.

Embodiments of the Management Module provide multiple, for example three, 10/100 Full Duplex Ethernet Ports that provide redundant communications to internal and external networks. There is an Ethernet Port on the Rear Panel. There is also an Ethernet Port internal to the Virgo ISSU System Chassis to each of the Switch Modules. The Management Module can be configured and Terminal Service provided via all of these paths.

When a Virgo ISSU System contains two Management Modules the modules will cooperate in a load-sharing configuration. This is referred to as Redundant and Shared ISSU System Control. Both Management Modules will continuously monitor and report the status of the system and all sub-systems. Should one Management Module fail, or not be installed, the remaining Management Module is capable of controlling the entire Virgo System.

Furthermore, the Management Module(s) are responsible for general system health monitoring and it (they) constantly monitor the health of the Virgo ISSU-based system. The system's health is monitored by continuously checking temperatures throughout the chassis. All chassis power supplies and all power supplies on Server, Switch, or Management Modules are checked via the Management Module. Each of the six fans in the system is monitored for low speed and failure to operate. When an alert or warning condition is observed, notification is sent to a designated recipient via either email or SNMP. It is possible to set warning levels as well as the notification method via system configuration.

Embodiments of the Management Module 108 is designed to be "plugged-in" and operate within 2U rack mountable Chassis OR Enclosure 101. The combination of a Management Module 108 along with one or more Server Modules 112 and Switch Modules 104, constitutes a complete ISS system. One module of each type is sufficient to form a complete system.

The Integrated Server Systems (ISS) architecture and ISSU system units are designed to offer the lowest power consumption, the highest density (number of servers per rack) and highest MASS (Manageability, Availability, Scalability, and Serviceability). It offers data center operators a breakthrough platform that reduces TCO (total cost of ownership) and increases revenue per square foot through dramatically improved performance efficiency (e.g. transactions per second per watt) as compared to conventional architectures and system configurations.

As data centers grow in size and complexity, it becomes increasingly difficult to manage server and networking resources. The Management Module 108 is designed to consolidate the monitoring and management of Server Modules 112 (up to 16), Switch Modules 104 (up to 2) and other hardware subsystems enclosed in a single system 102. This reduces management complexity, and provides a more cost-effective solution than existing management servers.

In at least one embodiment, a management module provides numerous features and capabilities, including: Local Serial Port Switching and /Remote Terminal Server, Ethernet Switch Management, Fan Control and Monitoring, Power Supply Control and Monitoring, In-band and Out-of-Band Capability, Remote Warm Boot and Cold Boot Control, Dual Management Modules for High Availability Management, and Browser-based access for Configuration and Management Controls, as well as KVM over the ethernet.

Local Serial Port Switching and /Remote Terminal Server features are provided in that the Management Module can switch any of the serial ports on the Server Modules 112, or the serial port on the Management Module 108 itself, to a DB9 or other connector at the rear of the system. This provides serial console output capability for software installation, out-of-band communication, configuration and management. Additionally, the Management Module can redirect the serial input and output of any selected port over Ethernet for Remote Terminal Server capability.

Ethernet Switch Management is provided in that the Management Module 108 performs management, control, and status reporting of Switch Modules 104. In one embodiment, industry standard SNMP MIBs are implemented on the Management Module 108 providing support for existing SNMP management tools such as OpenView and Unicenter. This capability may advantageously be via secure access.

Fan Control and Monitoring is provided in that each ISSU contains dual Fan Modules 114 consisting of three fans each 114*a*-1, 114*a*-2, 114*a*-3. Each fan's speed is controlled to reduce system noise and extend fan life, while maintaining internal temperatures at targeted and advantageously at optimum temperature levels. When an excessive temperature reading or fan failure is detected an alert is sent via email or SNMP, depending on system configuration so that corrective action may be taken automatically or with the intervention of a human operator.

Power Supply Control and Monitoring features are implemented in that the power supplies 110*a*-1, 110*a*-2 of the Server Modules 112 and Switch Modules 104 are controlled by the Management Module 108, with the ability to cycle power (or voltage) or shut down a module upon receipt of an appropriate message from the Information Technology (IT) administrator's network control station. This feature may be via secure access. All power supplies, whether a part of the system chassis 101, Server Module 112, or Switch Modules 104, are monitored for proper power supply operation. When an alarm or failure condition is detected for any power supply module 110 an alert or other information bearing message is sent via email or SNMP, depending on system configuration.

In-band and Out-of-Band Capability is provided in that the Management Module has three 10/100 Full Duplex Ethernet Ports that provide redundant communications to internal and external networks. There is an Ethernet Port on the rear panel of the system 102 that can be used for out-of-band Ethernet communication. The other two ports connect to the two internal Switch Modules (if both are present) 104*a*-1, 104*a*-2 for in-band communication. The Management Module 108 can be configured and Terminal Service.

The Remote Warm Boot and Cold Boot Control feature of the Management Module 108 provides remote reset and power cycling capabilities for Server Modules 112 and Switch Modules 104. Such remote warm boot and cold boot control can be performed in-band, through the Switch Modules 104, or out-of-band via the Management Module 108 external Ethernet port. The mechanism used depends on the system configuration and may be via secure access.

The (optional) presence of two or dual Management Modules support High Availability Management. A system can accommodate up to two Management Modules 108 for high availability. For alternative physical configurations, additional management modules may be provided for even greater availability, though such redundancy would seldom if ever be needed. When both management modules are present in a system, they assume an "active-active" load-sharing configuration. Both Management Modules 108*a*-1, 108*a*-2 continuously monitor and report the status of the system and all sub-systems. Should one Management Module fail, or not be installed, the remaining Management Module is capable of controlling the entire system.

The system also supports browser-based access for Configuration and Management Controls. Standard SNMP management software is used in one embodiment to not only monitor and manage the rest of the system 102 through the Management Module 108, but also to control (self-control) the Management Module itself. Similar capabilities are also advantageously provided via a browser-based interface.

Figure 13:
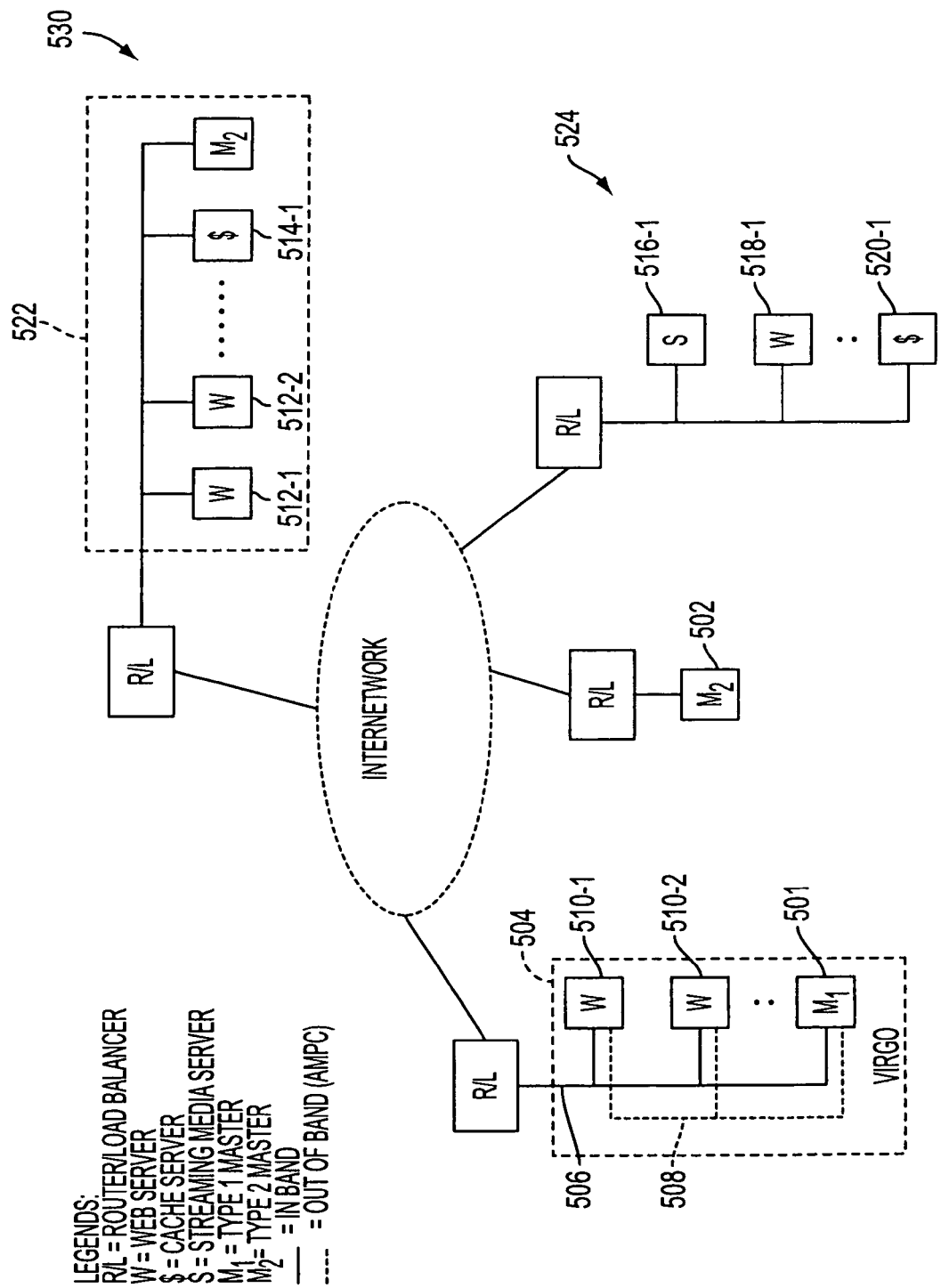
FIG. 13 is a diagrammatic illustration showing an exemplary internetwork and the manner in which two different types of master may be deployed to power manage such system.

Attention is now directed to a description of a network and management of elements of the network by two different types of master relative to FIG. 13. Two different types of master module, M1 501 and M2 502, are depicted in FIG. 13. Note that the two different types may be configured within a single hardware/software management module and that their type characteristics may be defined by a software or program switch. The type 1 master M1 501 has the capability to power manage the servers 510 within the same subnet 504 using either in-band 506 or out-of-band 508 signals. Furthermore, the type 1 master 501 can also power manage the servers (e.g. Web Servers 512, 518, Cache Server 514, 520, and Streaming Media Server 516) outside of its own subnet 504, for example in outside or external subnet 522, 524. Either type 1 or type 2 master (M1 501 or M2 502) can be designated as the global master used to manage the rest of the servers throughout the entire internetwork 530. Any server has the option to power manage itself as well as being managed by the global master. The global master communicates with all servers via standard network management protocol. Each server has its own network agent and will report (immediately or within some predetermined time interval) to the global master on any policy violation.

An exemplary operational scenario for the internetwork is now described. Assume for example, that while a particular server is operating in the 2nd power mode and the network agent detects the CPU utilization for that server rises above an upper threshold (for example, a threshold of about 95%) for some fixed period of time, this is considered as a policy violation and a message will be sent to the global master. Consequently, the global master will command the server to return to the 1st mode, that is a higher power consuming and higher performance mode since it may be anticipated that with only a 5% excess capacity margin remaining unused, quality of service may suffer if there is an additional loading. This task may alternatively be performed by the local CPU.

On the other hand, while operating in the 1st mode, if the agent detects the CPU utilization for that server module drops below a lower threshold (for example a threshold of about 50%) for a fixed period of time, it will send a policy violation signal to the global master. The global master will command the server to enter the 2nd mode wherein power consumption is reduced relative to the 1st mode, such as by reducing the CPU clock frequency, lowering the CPU operating voltage, and preferably both lowering the CPU clock frequency and the CPU core voltage to match the switching speed requirements imposed by the clock frequency. This task may also alternatively be performed by the local CPU.

If the global master observes that the CPU utilization of multiple servers continue to stay at very low level, it will command some of the servers to enter the 3rd mode in order to save the maximum power. The 3rd mode is a power consumption mode that is even lower than the 2nd mode. In one embodiment, the CPU clock is stopped, while in another embodiment, the CPU is reduced to a very low rate. Advantageously, the CPU core voltage is also reduced but this is not required. Preferably, the CPU core voltage is not reduced below a voltage level that will result in the loss of state within the CPU. That is the CPU is desirably not powered off.

In a typical server farm, it is anticipated that the nominal load is about 30% of the peak load. Using this approach, the inventive structure and method can provide at least a 70% power saving comparing with server farm that does not implement the inventive power management. Some of the figures show these transitions in diagrammatic form.

Figure 14:
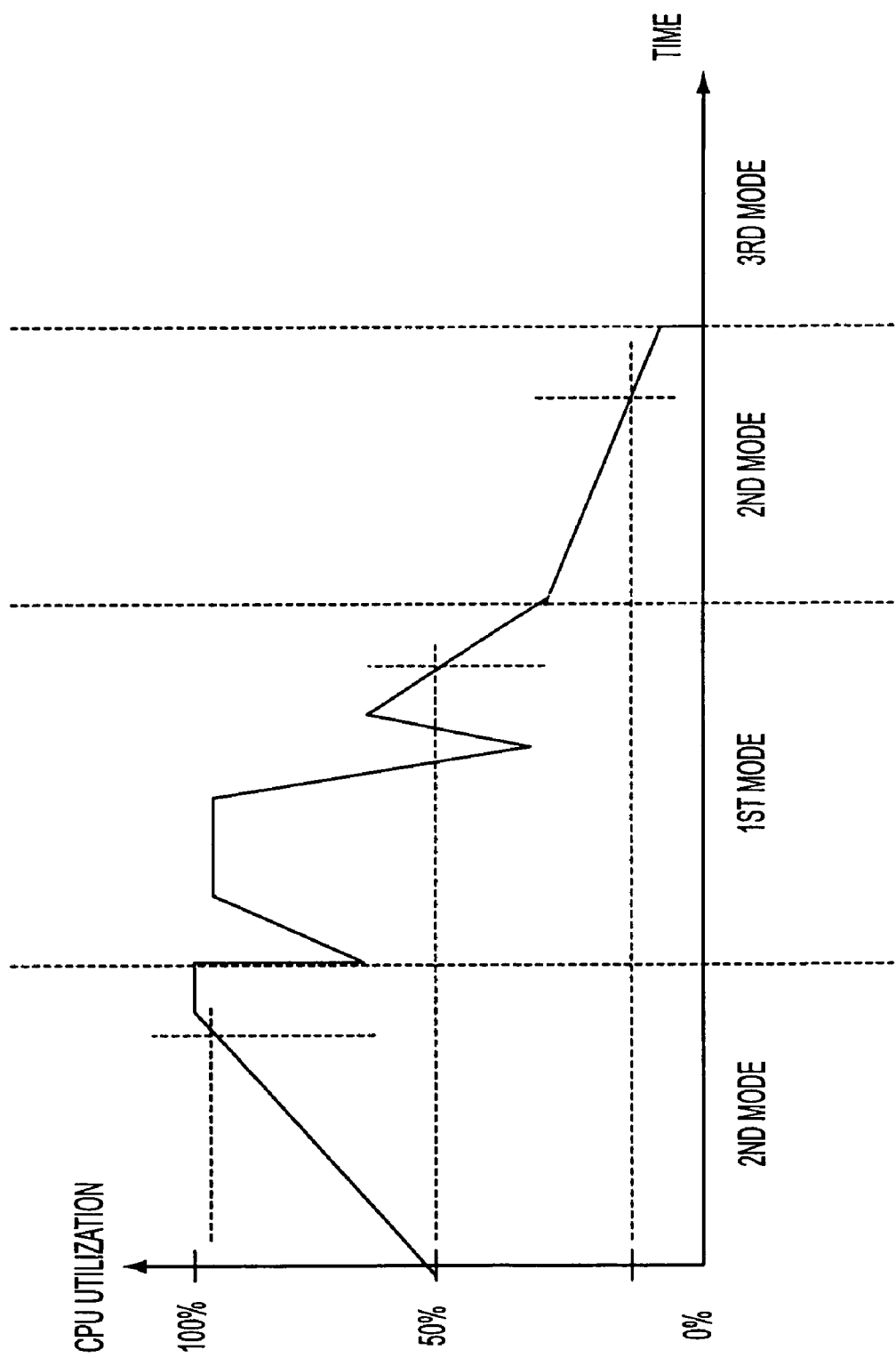
FIG. 14 is a diagrammatic illustration showing a graph of the CPU utilization (processor activity) as a function of time, wherein the CPU utilization is altered by entering different operating modes.

A graphical plot of CPU Utilization (in percent) versus Time is illustrated in FIG. 14. It is assumed that at time zero CPU utilization for the particular server module operating in 2nd mode is 50% and that this rises toward 100%. When the utilization reaches about 95% and stays over that level for some predetermined time, control signals are generated and received by the server module in order to transition the server module from the 2nd mode to a higher load capacity 1st mode. CPU loading as a percentage of available capacity immediately drops due to the higher capacity while operating in 1st mode. While operating in this 1st mode, utilization drops below 50% but then immediately arises above 50%. Because the utilization did not remain below 50% for the prescribed period of time, no transition to 2nd mode occurred. However, at a somewhat later time, CPU utilization dropped below 50% for the required time and resulted in a transition to the 2nd mode. As utilization continued to decrease and remain at that reduced level, a further transition to the 3rd mode occurred. In this exemplary embodiment, the 3rd mode is an inactive mode where the CPU is inoperative therefore there is zero utilization.

Though not shown in the diagram, the particular CPU and server containing it may remain in this 3rd mode until its capacity is required for the system as a whole. At such time, control signals are provided to the particular server, as described elsewhere in this description, to activate the CPU into an appropriate performance state. This state may be either a 1st mode or a 2nd mode, depending on the loading and policies in place.

It is noted that although the 95% and 50% CPU utilization thresholds, and certain relative periods of time may be inferred from the description or drawings, the CPU utilization control and power transition policies may be freely defined to satisfy the dynamics of the system and the conservative or liberal achievement of power conservation within the system. For example, the threshold for transitioning from a 2nd mode to a 1st mode may be selected to be any CPU utilization between 60% and 100%, though more typically it will be selected to be between about 80% and 95%, and more frequently between about 90% and 95%. In analogous manner, the threshold for transitioning between the first mode and the second mode may typically be selected to be a utilization between any predetermined limits, such as for example between about 25% and 55%. The system may also be structured to that the threshold or thresholds are set or adjusted dynamically. Dynamic thresholding may for example be based at least in part on present, past, and/or predicted future loading, Quality of Service indicators or factors, or other measures or parameters.

Furthermore, while a simple utilization threshold has been described, more elaborate control may be implemented. For example, in addition to the threshold, a velocity measure of the time rate of change of utilization may be utilized as well. This may then result in a dynamically determined threshold that depends upon how fast the utilization is changing and its direction. Ultimately, the goal of the policy should be to anticipate the need for additional CPU capacity before capacity is exceeded in one direction, and to ramp down power consumption without reducing CPU capacity below a level that can satisfy short term demand in the other direction.

Another function of the global master is to reconfigure the server type (such as between a web server type, a cache server type, a streaming media server type, or other type server) based on activity monitoring at the application level. Alternatively speaking, if 70% of the servers are being held in a suspend state, the global master should have the option to turn those servers into whatever types that are in demand at the time. The global master may even decide that a particular server may serve for more than one type of content simultaneously, that is operate as both a web server and a cache server. This may be particularly appropriate when the loading on all servers is relatively low so that a single server is capable of satisfying quality of service requirements within its CPU (and hard disk drive) capacity.

Having now described the physical architecture and connectivity of an exemplary Integrated Server System, the structure and operation of an exemplary server module, management module, and switch module, aspects of how these modules work independently and in synergistic manner to accomplish significant power or energy conservation without sacrificing performance (or with only an undetectable insignificant performance impact at most) are now described.

Conventional servers do not take power consumption or power savings into consideration in their normal operation. The primary philosophy of data center and internet service providers (ISPs) is over provision. If one considers the relationship between traffic (or load) and the power consumption, conventional servers operate at a relatively constant and high power level that is independent of load. The processors and associated memory typically run at maximum clock rate or frequency, full supply voltage to the processor core, hard disc drives on and rotating constantly, and video and other subsystems and ports on and operable all the time independent of whether they are being used at that time.

Power conservation features such as may be provided in consumer personal computers (PCs) such as the suspend, sleep, hibernation, and the like types of reduced power operation. Several different power management interface specifications have been developed in recent years, including for example, the Advanced Configuration and Power Interface Version 1.0 (herein incorporated by reference) co-developed by Intel, Microsoft and Toshiba, which specifies how software and hardware components like the operating system, motherboard and peripheral devices (such as hard disk drive) talk to each other about power usage.

One embodiment of the inventive structure is directed as so called "front end server" applications. While the power consumption of conventional servers may vary depending upon the processor type and operating characteristics, number of processors, amount of memory (RAM), disc drive or other storage device type and number, and the like, most conventional servers such as those made by Cobalt, Compaq, Dell, and others consume some where in the range of between about 50 Watts to 150 Watts or more. Some servers have as many as four processors and will consume considerably power.

Conventional servers typically have similar architecture to personal computers made for home and business use, albeit with greater I/O capabilities and horsepower for their intended tasks. Interestingly, most of these servers retain the video capabilities in spite of the fact that the servers will not be used by anyone for viewing the video. It is unfortunate that the video circuitry (either within the processor or as a separate chip) is consuming power yet produces no beneficial effect or result.

The structures and methods of the invention provides a very low power design so that even when the inventive server is operating at its maximum performance level and consuming its maximum power, that maximum power consumption is still a fraction of the maximum (and steady-state) power consumption of conventional non-power managed processors and servers. This maximum power level is typically between about 10 to 15 Watts though it may fall within other ranges or be reduced further. This reduction is possible for several reasons, including the provision of a very low power consumption processor or CPU, turning off devices or components within the system that are not being used at the time. Another significant power savings is provided by power managing the CPU according to the network traffic or server load conditions. Therefore the power consumption is less than the maximum power consumption unless the load is at a peak and all of the devices and components are powered on to handle the load. With this throttling back as a function of load, the power consumption may be at any intermediate value between zero (when and if the unit is powered off completely) or at a very low power consumption level when placed in some power conserving mode (such as a sleep, suspend, or other specialized power conserving mode as described elsewhere herein). Thus, capabilities of the server are matched to the demands being placed on the server. This power control or management is referred to as power on demand (Power on Demand™) and permits power conservation without any loss of server capability. Power management may also be controlled dynamically.

The over-provisioning of servers by ISPs and Data Centers is adapted at least in part because e-commerce can be highly seasonal and subject to considerable event driven demand surges. For example, the traffic or load requirements placed on servers during Christmas Holiday season may be many time or even one or more orders of magnitude as compared to other times of the year. News, stock market, and other organizations may have analogous traffic fluctuations during a single day. Unless such e-commerce entities are able to satisfy the inquiries of their customers with tolerable quality of service (QOS), such customers may never come back to the site. Therefore, day-to-day, week-to-week, and month-to-month traffic loading can vary over a wide range. For one typical ISP, the average load is about twenty-percent (20%) of the maximum load.

In the inventive system and method, by varying the power consumption according to load, considerable additional savings are realized. For an exemplary system in which the base maximum power consumption is 10 watts rather than 50 watts, and the power consumed during the service cycle is on average 20% of the maximum, the net result is a realization of the product of these two savings for a savings of about 25 times. That is the power consumed over a day is ⅟25 of the power consumed for a conventional server operation.

Typically, the amount of power savings and then relationship between traffic and power consumed will depend upon the nature of the server. For example, a web server may exhibit a different load versus power consumption characteristic curve than a streaming video server, which will be different that a content caching server. These relationships may be linear or non-linear. The nature of the content may also impact this relationship.

The inventive scheme interactively reacts to the load and scales the number of components and/or devices as well as the operational parameters and operating characteristics of the devices and/or components to match the load or a predetermined quality of service, or some other identified performance target for the server system.

The inventive ISS may incorporate multiple servers adapted to serve different type of content. Thus it may be expected that each different server will exhibit somewhat different power consumption and power consumption reduction characteristics. These characteristics need not be known a priori to realize their benefits.

Attention is now directed toward a description of exemplary different operating modes. In one aspect the inventive structure and method provide for a transition in a single processor or CPU between a first mode (Mode 1) and a second mode (Mode 2) wherein the second mode consumes less power or energy than the first mode. Power or energy consumption in the processor or CPU (and optionally in other circuit components or peripherals connected to or associated with the processor or CPU) may be reduced in a variety or ways, including for example, lowering a processor or CPU core voltage, reducing a processor or CPU clock frequency, or lowering the core voltage and the clock frequency at the same time.

In some systems and methods, the core voltage and clock frequency are changed continuously or in stages in some synchronized manner, as a higher core voltage may typically be required to support a faster processor or CPU clock frequency. It is noted that the first and second mode are each active operating modes in which the processor or CPU is executing instructions and carrying out normal processor functions. While the core voltage may be reduced, the processor clock is still cycling at some nominal rate. The lower limit for processor clock frequency reduction may generally be selected based on the types of processing that may be accomplished at that rate. For example, first mode operation would typically be provided at substantially 100% of the nominal rated clock frequency for the processor, while second mode operation provide a clock frequency less than 100%. Such reduced processor clock frequency may generally be in the range of between about 5% to 95% of the maximum, more usually between about 20% and about 80%, more usually between about 20% and 60%. In some systems, the processor clock may be reduced by factors of two using clock signal division circuitry. In other systems, the processor clock frequency may be reduced in fixed increments or according to a clock frequency rate reduction look up table or algorithm in a clock generator circuit. As the second mode may be considered to be any active operating mode less than the first mode, it will be understood that there may be multiple levels of this second mode. That is, Mode 2 may be multilevel.

In addition to these first and second modes, the processor or CPU may be placed into an inactive third mode (Mode 3) characterized by consuming less power or energy (conserving more power or energy) than in the first mode or the second mode. This third mode is referred to as an inactive mode as the processor clock will be stopped or operate at such a low frequency that the processor effectively processes no instructions and performs substantially no useful work relative to the amount of work provided in the first or second modes. Usually, the processor clock will be stopped and where core voltage control is available, the processor core voltage will be reduced to a level just sufficient to maintain processor state. This third mode is distinguished from a fourth mode (Mode 4) where the processor is powered off and does not maintain processor state, revitalization of the processor from the fourth mode requiring a reboot or other initialization procedure. Such reboot or initialization procedures typically requiring a few to tens of seconds to accomplish and compared to fractions of a second to transition the processor from the third mode to the second mode or to the first mode.

The present invention provides and supports several different structures, mechanisms, and procedures for controlling the operational modes of the server modules and hence the processor or processors that may form or contribute to the operation of a server. Organizationally, the control may reside in a separate Management Module, one or two of which Management Modules may be integrated into one of the inventive ISSU; or, may reside in one of the Server Modules which has been designated as a manager, supervisor, or master server module. Designation of a Server Module in this way involves providing the server module with the computer program software for receiving activity information from the server modules, for analyzing the activity information to determine from a power consumption perspective (or other predetermined perspective) which server modules should be operated in the several available modes (for example, Mode 1, Mode 2, Mode 3; and Mode 4 in some circumstances), and where the operation of more than one type of server is to be combined into a single server module (such as a multi-media server and a web page server) for gathering the content from the type types of servers onto the hard disk drive of a single server or group of servers. Note that when a particular server module is to serve as the master, that server may collect information on its own activity and be considered in the overall server and power management scheme. Of course, the server module acting as its own master will not typically place itself in either Mode 3 or Mode 4 as its continued operation is necessary to control other server modules. Where appropriate logic is provided to place the master in a power conserved state (such as Mode 3) and bring it out of that state, even the master may be placed into one of the Mode 3 operating states.

At a top level, the server modules each detect and report their activity to the manager (either the management module or the designated master server module). In some embodiments, the server modules are permitted to locally control their own operating mode, for example whether their own CPU (or CPUs if a multiple CPU server) is or should be operating in a Mode 1 or Mode 2. They will then also report not only their activity level but also the operating mode under which the reported activity was measured or detected.

At another level, the manner in which activity is detected is an issue. At yet still another level, the power management control policy or procedure, that is the control plan that regulates which server modules should be place in which of the available modes to provide both the required (or desired) performance according to some measure and the required (or desired) power conservation. Those workers having ordinary skill in the art will appreciate, in light of the description provided here, that there are virtually limitless different policies for power management. Specific policies that optimize or near-optimize the combination of server performance and power conservation may be determined empirically during initial installation and operational phases as they will likely depend upon the content served, the variation of server loading as a function of time of day, advertising or promotions, average server loading, amount of over-provisioning, minimum quality of service requirements, power consumption of server modules versus content served, and other factors associated with server operation. The policies may also be modified according to the particular physical and/or electronic or logical structure of the servers. Even different CPU technologies may suggest different policies.

It may also be observed that such policies may be biased in favor of any one or combination of server operational factors. For example, operation and therefore the policy for control may favor power conservation even though there may be some impact on performance. Alternatively, the policy may favor absolutely maintaining a quality of service even if power conservation is somewhat sacrificed.

As general multi-power management policy it is observed based on analytical and empirical data, that there is a certain power consumption overhead associated with each server device and that it is therefore generally preferred to operate a minimum number of server modules at near their maximum output (Mode 1). When a single device approaches its capacity, other server devices are brought up from a Mode 3 to Mode 2 or Mode 1 operation. Frequently, the two servers then on line would each operate in Mode 2 until further performance is needed, at which time one would be brought to Mode 1 operation. This is merely an example scenario and many other alternative control strategies may be applied.

Clearly, there is a bodies of knowledge for both open-loop and feed-back based control that may be used by those skilled in the art to optimize or near-optimize some weighted combination of performance and power conservation.

A server system configuration tool may be provided that allows a human operator to monitor system operation and power consumption and interact with the system and policy definition within the system to tune system performance. In the event that local government or regulatory agencies restrict power consumption or mandate power reduction, the policy may be altered to implement these requirements. In each of these situation, the system permits real-time dynamic uploading of the policies without taking an servers offline. In one embodiment, systems having two management modules are used effectively by off loading one management module to the other management module, updating the policies in the off loaded management module, and then placing the updated management module. In another embodiment, alternative policy schemes are preloaded in the management module (or designated master) so that it may switch automatically or under operator control as required.

In one embodiment of the invention, the computer system comprises a server for serving data or other content in response to a request. A hypothetical scenario in which a computer system, which may typically be but not necessarily be a portion of a larger network system having multiple server computers, transitions from a full power maximum performance operating mode to an off state in which the computer system neither performs operations no maintains state. The particular progression between states or modes may possibly but is unlikely to occur in a real computer system as it is more likely that certain modes will be skipped either to reduce power consumption when performance requirements are low or skipped when performance demand increases so as to elicit a higher performance operating mode than the next progression would provide. In general, the inventive system and method may provide for transitioning between an one state and any other different state. In some embodiments of the inventive system and method, not all of the modes described here will be present. Furthermore, other embodiments of the invention may provide for additional and different control. Furthermore, the description immediately below addresses control of the processor unit (e.g. processor or CPU) and logic circuits (frequently referred to as core logic or SouthBridge) associated with the processor unit. It should be understood that control of other components within the system, including for example hard disk drives, input/output ports, network interconnect circuits or cards, BIOS, video circuits, clock generators, voltage regulators, micro-controllers, memory, as well as other individualized logic circuit components may be independently or dependently controlled or controlled as groups. (See for example, Table III and the accompanying description for the manner in which some elements are controlled.)

It is initially assumed that the system is operating in Mode 1 having the highest processor unit (e.g. CPU) performance level and greatest power consumption of the available operating modes. The system is configured with operating system software (e.g. Microsoft Windows, Linux, Unix, Sun, or the like) and/or applications program software that include instructions for monitoring the occurrence or non-occurrence of an event.

It is noted that the Linux Operating system, such as the RedHat Linux operating system, may be more power conserving than other currently available operating systems. One reason for its power conservative features are the fewer number of instructions that need to be executed to accomplish tasks. Therefore while embodiments of the invention support all of the available operating systems, and may be adopted to support future operating systems, one embodiment utilizes the Linux operating system to achieve a higher degree of power conservation.

One such event that can be monitored and detected is the occurrence of execution of an idle thread. Another such event is the occurrence of some specified level of CPU processing capability availability that is derived from some enumeration or statistical evaluation of the idle thread or idle threads that are being or have been executed during some time period. Other events that may trigger a transition are described elsewhere in this specification. For purposes of continuing the description here, it is assumed that execution of idle threads is monitored and reported by a combination of an application program and the operating system, and that the number of idle threads being executed suggests that more performance is available than is needed and that power consumption may be reduced without sacrificing performance.

Control signals are then generated (either locally by the CPU or core logic, or globally by a separate power manager) that transition the system from Mode 1 to one of the Mode 2 operating modes. Mode 2 is generally characterized by having a CPU clock frequency that is less than the maximum rated CPU clock frequency, a CPU core voltage less than or equal to the rated maximum CPU core voltage, and core logic that operates at or substantially at the rated core logic clock frequency and core logic operating voltage. (This condition is also referred to as the Mode 2' operating mode.) By maximum rated CPU clock frequency is alternatively meant: (i) the clock frequency the CPU manufacturer has identified with this CPU model, (ii) the actual maximum frequency at which the CPU may be clocked, (iii) the maximum clock frequency that the CPU is operated within the system independent of what the CPU is capable of being operated at, (iv) or some similar or analogous measure. For example, if the CPU is marketed or sold as a 800 MHz Intel Pentium III, then the maximum rated CPU clock frequency is 800 MHz. If the maximum clock frequency at which the 800 MHz Intel Pentium III is operated in the system is 850 MHz, then the maximum rated frequency is 850 MHz.

It is also understood that there are gradations of performance (and power consumption) within the rubric of Mode 2 operation. A Mode 2" operating mode is characterized by operation at both less than the maximum rated clock frequency and at less than the maximum rated core voltage. Mode 2 may be a single operating mode, or include a plurality of operating modes, having the general Mode 2 characteristic but providing for several different CPU clock frequencies and core voltage that at least support electrical device switching (transistor switching) or be selected to provide just adequate core voltage substantially matched to the clock frequency to provide reliable operation. For example, at the Mode 2"" operating mode, the CPU clock frequency and CPU core voltage are the minimum clock frequency and core voltage that are operable and supported by the CPU (where such minimum exists). Embodiments of the inventive system typically provide that core logic continue to operate at nominal rated levels where both the core logic clock frequency and core logic operating voltage are at or substantially at rated levels. In other embodiments, of the invention core logic circuit elements may also be power managed during Mode 2 operation by reducing clock frequency, operating voltage, or both.

The CPU clock frequency may be adjusted over a range of frequencies to match the amount of processing capacity to the tasks to be performed. Therefore, as the number of idle threads being executed in the CPU continue to increase indicating that productive tasks (such as retrieving data from a storage device, and sending such retrieved data to an I/O port or NIC for serving to a requester) are being performed within specified limits or some quality of service parameters, the clock frequency may be continually reduced.

At some time, however, the requirements placed on the system may become some low that at times there are no tasks to be performed. For example, on a computer network having a multiplicity of servers for serving stock market quotes and having sufficient capacity to handle worst case traffic in an active stock market, there is likely to be lots of over capacity of a national holiday where the stock markets are closed and there is little interest among investors. Under such conditions (actually likely under less strenuous conditions than these) the CPU within a computer system may complete all pending applications or user tasks and begin executing a system idle loop. Such an idle loop may initially or after some period of time cause execution of a CPU Halt instruction (or the equivalent) that causes the CPU clock to stop. This CPU halt instruction may be generated by the CPU itself or through some other internal or external agent or program. For example, a Microsoft Windows operating system or a Linux operating system are capable of generating an instruction to halt the CPU or processor. A halted or stopped CPU is one example of a Mode 3 operating mode, and more particularly a Mode 3' operating mode that is nominally characterized by a stopped or substantially stopped CPU clock, and a CPU core voltage that is less than or equal to the nominal maximum CPU core voltage and more usually at the minimum CPU core voltage that is necessary to maintain CPU register state and/or other CPU state. A CPU suspend state is another example of a different type of Mode 3 operation. Mode 3" may represent further power conservation by lowering the CPU core voltage to that just required to maintain state. This is treated as a separate sub mode because CPU core voltage need not be reduced as a result of the CPU halt command, and as stopping the CPU clock for a short period of time between execution of application tasks itself provides significant power savings without the design changes that may be required to also transition core voltage. Reduction of core voltage when the clock is stopped also generally has a smaller impact on power conservation than when the CPU is clocking. Some embodiments will also operate the CPU at the minimum clock frequency and minimum CPU core voltage as provided under a Mode 2 operation, and when executing the CPU halt instruction turn off the clock from that minimum value and maintain the core voltage at the voltage that supports the minimum clock. In this manner, the CPU may halted and resumed from halt by restarting the clock and leaving the voltage alone. This scenario may be particularly effective when making rapid transitions between Mode 2 and Mode 3.

When it is determined that the CPU and computer system in which the processor is installed are not needed for some longer period of time, it is possible to provide additional power savings by reducing the power consumed by the core logic circuits or chips associated with the CPU. Where this additional level of power reduction is desired, the core logic clock frequency may be reduced to something less than the nominal or maximum frequency and in addition but optionally, the core logic voltage may be reduced so as to support that frequency. CPU and core logic state are maintained in each of the Mode 3 operating modes.

When the computer system is not needed for some longer period of time, the processor or CPU and at least a substantial portion of the core logic may be turned off. This is represented by Mode 4 operation which in one embodiment is characterized by having the CPU core voltage at zero, the CPU clock frequency at zero, most of the core logic circuits receiving no operating clocks or operating voltage. In some embodiments, the real-time clock may continue to operate and/or one or more circuits may remain active so that they may receive an external signal (such as a Wake-on-LAN) derived signal and be turned back on to resume operation in one of Modes 1, 2 or 3.

Note that in some embodiments, wherein if a portion or the entire system is operating in a reduced power consumption mode, such as one of the mode 3 operating modes, the manager or supervisor (such as a management module determines that server modules are dropping packets and that few or no idle threads are executing (indicating that the system has insufficient performance capability) then the supervisor or manager can send a packet to the fast Ethernet controller (or other circuit) associated with the server module to wake it up. This packet may be any packet identified to the ethernet controller (or other controller) to wake up the server. In one embodiment, the line or bus is monitored for special "ON" packet. In another embodiment, any packet received will turn it on. This wake up feature is advantageous as when the processor or CPU is not being clocked (such as in a Mode 3 operating mode) additional means are needed to wake it up to place it in a active mode that can process instructions and perform useful tasks, and in a server environment, the server according to embodiments of the invention will be connected to the ethernet and active. Other types of wake up or attention signals may alternatively be used.

When performance requirements increase, the computer system may generally transition from lower performance (and lower power consumption) modes to higher performance (and typically higher power consuming modes) according to rules, policies, algorithms, and/or control mechanisms provided in the system. Transitions may also occur dynamically. The events which trigger change or transition from one operating mode to another operating mode may typically be set and changed under programmatic software or firmware control. Various exemplary situations or events that trigger transitions are described elsewhere in this specification.

While a number of modes (Mode 1, Mode 2, Mode 3, and Mode 4) have been described in this example, it is noted that the inventive system, method, and computer programs do not require each of these modes or each of the submodes (e.g. Mode 3") within a mode. Furthermore, depending upon the configuration of the system, the set of rules or policies in place during operation, and/or the dynamics of operation at the time an operating mode decision is to be made, for any single computer system, or group of computer systems, and their included processor, processing unit, or CPU, operation may transition between any two of the modes described. The examples provided here and the modes or states identified in the state diagrams are therefore illustrative rather than limiting.

By way of highlighting selected ones of the computer system (for example, server module computer system) operating modes, embodiments of several of these modes and submodes are now briefly described.

One embodiment of a first mode (Mode 1) comprises a mode in which the processing unit is operated at substantially maximum rated processing unit clock frequency and at substantially maximum rated processing unit core voltage, and the logic circuit is operated at substantially maximum rated logic circuit clock frequency and at a substantially maximum rated logic circuit operating voltage.

One embodiment of a second mode (Mode 2) comprises a mode in which the processing unit is operated at less than maximum rated processing unit clock frequency and at less than or equal to a maximum rated processing unit core voltage, and the logic circuit is operated at substantially maximum rated logic circuit clock frequency and at a substantially maximum rated logic circuit operating voltage.

One embodiment of a second submode (Mode 2') further comprises a mode in which the processing unit is operated at less than maximum rated processing unit clock frequency and at less than a maximum rated processing unit core voltage, and the logic circuit is operated at substantially maximum rated logic circuit clock frequency and at a substantially maximum rated logic circuit operating voltage.

Another embodiment of the second submode (Mode 2") further comprises a mode in which the processing unit is operated at less than maximum rated processing unit clock frequency and at less than a maximum rated processing unit core voltage, and the logic circuit is operated at substantially maximum rated logic circuit clock frequency and at a substantially maximum rated logic circuit operating voltage.

Another embodiment of a second submode (Mode 2''') further comprises a mode in which the processing unit is operated at less than maximum rated processing unit clock frequency and at less than a maximum rated processing unit core voltage just sufficient to maintain switching circuits in the processor unit at the processing unit clock frequency, and the logic circuit is operated at substantially maximum rated logic circuit clock frequency and at a substantially maximum rated logic circuit operating voltage.

One embodiment of a third mode (Mode 3) comprises a mode in which the processing unit is operated at a slow but non-zero frequency processing unit clock frequency and at less than or equal to a maximum rated processing unit core voltage sufficient to maintain processor unit state, and the logic circuit is operated at substantially maximum rated logic circuit clock frequency and at a substantially maximum rated logic circuit operating voltage;

One embodiment of a third submode (Mode 3') further comprises a mode in which the processing unit is operated at a substantially zero frequency processing unit clock frequency (clock stopped) and at less than or equal to a maximum rated processing unit core voltage, and the logic circuit is operated at substantially maximum rated logic circuit clock frequency and at a substantially maximum rated logic circuit operating voltage;

Another embodiment of a third submode (Mode 3") further comprises a mode in which the processing unit is operated at a substantially zero frequency processing unit clock frequency (processing unit clock stopped) and at a processing unit core voltage just sufficient to maintain processor unit state, and the logic circuit is operated at substantially maximum rated logic circuit clock frequency and at a substantially maximum rated logic circuit operating voltage.

Another embodiment of the third submode (Mode 3''') further comprises a mode in which the processing unit is operated at a substantially zero frequency processing unit clock frequency (processing unit clock stopped) and at a processing unit core voltage just sufficient to maintain processor unit state, and the logic circuit is operated at a logic circuit clock frequency less than a maximum rated logic circuit clock frequency and at a logic circuit operating voltage that is less than or equal to a maximum rated logic circuit operating voltage.

Another embodiment of a third submode (Mode 3'''') further comprises a mode in which the processing unit is operated at a substantially zero frequency processing unit clock frequency (processing unit clock stopped) and at a processing unit core voltage just sufficient to maintain processor unit state, and the logic circuit is operated at a logic circuit clock frequency less than a maximum rated logic circuit clock frequency and at a logic circuit operating voltage that is less than a maximum rated logic circuit operating voltage.

Another embodiment of a third submode (Mode 3''''') further comprises a mode in which the processing unit is operated at a substantially zero frequency processing unit clock frequency (processing unit clock stopped) and at a processing unit core voltage just sufficient to maintain processor unit state, and the logic circuit is operated at a substantially zero logic circuit clock frequency and at a logic circuit operating voltage that is just sufficient to maintain logic circuit operating state.

One embodiment of a fourth mode (Mode 4) comprises a mode in which the processing unit is powered off by removing a processing unit clock frequency (processing unit clock stopped) and a processing unit core voltage.

An embodiment of a fourth submode (Mode 4') further comprises a mode in which the processing unit is powered off by removing a processing unit clock frequency (processing unit clock stopped) and a processing unit core voltage; and the logic circuit is powered off by removing the logic circuit clock and by removing the logic circuit operating voltage or by setting the logic circuit operating voltage below a level that will maintain state, except that a real-time clock and circuit for waking the logic circuit and the processing unit are maintained in operation.

Another embodiment of a fourth submode (Mode 4") further comprises a mode in which the processing unit is powered off by removing a processing unit clock frequency (processing unit clock stopped) and a processing unit core voltage; and the logic circuit is powered off by removing the logic circuit clock and by removing the logic circuit operating voltage or by setting the logic circuit operating voltage below a level that will maintain state, except that a circuit for waking the logic circuit and the processing unit are maintained in operation.

Figure 15:
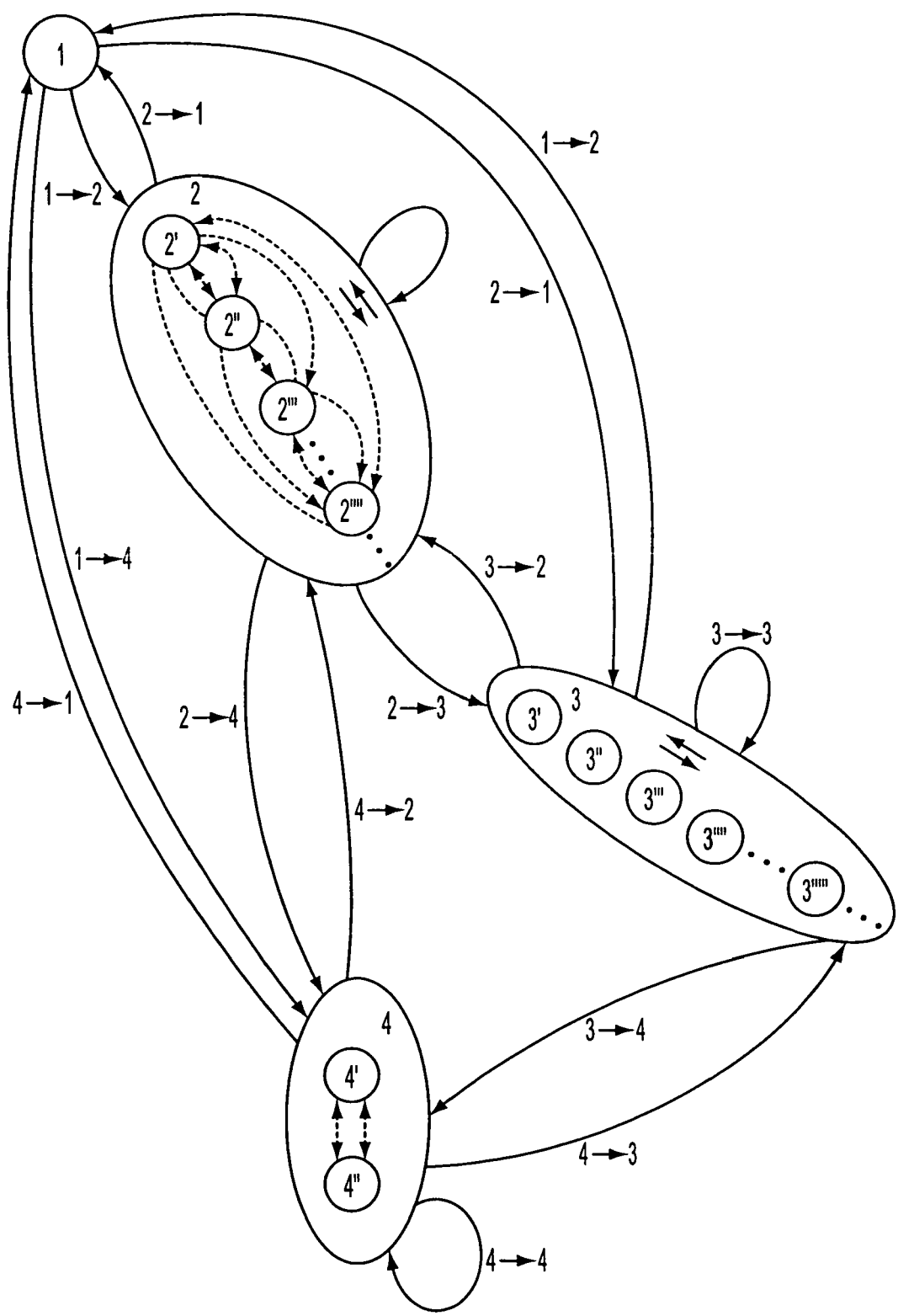
FIG. 15 is a diagrammatic illustration showing an exemplary state engine state diagram graphically illustrating the relationships amongst the modes and identifying some of the transitions between states or modes for operation of an embodiment of the inventive system and method.

Some of the characteristics of these modes and submodes are listed in Table II. FIG. 15 provides an exemplary state engine state diagram graphically illustrating the relationships amongst the modes and identifying some of the transitions between states or modes for operation of an embodiment of the inventive system and method. Note that although the state engine may provide a path for directly or indirectly transitioning between any two modes or submodes, in the interest of keeping the state diagram intelligible, the state diagram of FIG. 15 does not show all of the possible state or mode transitions possible.

Having described several power or energy consuming states or modes (or their opposite, power or energy conserving states or modes) as well as a situation in which a hypothetical computer system may transition between these modes, it will be appreciated that some procedure, mechanism, or policy is provided for the processor to self- or locally-control its own operating mode and hence its power consumption.

It is further noted that these operation modes may be utilized in different combinations and that any single system need not implement all of the operational modes. Therefore it will be appreciated that in the appurtenant claims, references to various modes, such as first mode, second mode, third mode, fourth mode, or the like, may refer to operating modes or states in a general manner as otherwise defined in the claims rather than to operating modes described in such terms in the specification. For example, in the claims where two operating modes are recited, such as first and second modes, such two modes may be any of the modes or states described, references, or suggested herein.

effected as well as optional detection at a global level. It is noted that in at least some embodiments, local detection of activity within each processor or CPU provides sufficient

TABLE II

Selected Example CPU and Core Logic Clock and Voltage Ranges for Various Exemplary Computer System Operating Modes.

| Mode | CPU Clock | CPU Core voltage | Core Logic Clock | Core Logic Voltage |
|---|---|---|---|---|
| 1 | ≈max | ≈max | ≈max | ≈max |
| 2 | <max | ≦max | ≈max | ≈max |
| 2' | <max | <max | ≈max | ≈max |
| 2" | <max | <max | ≈max | ≈max |
| 2''' | <max and >0 | <max and sufficient to maintain switching rate (and CPU state) | ≈max | ≈max |
| 2'''' | ≈min and >0 | ≈min and sufficient to support switching rate (and CPU state) | ≈max | ≈max |
| 3 | <max and ≧0 (typically = 0) | ≦max and ≈min sufficient to maintain CPU state | ≦max but >0 | ≦max but >0 |
| 3' | ≈0 | ≦max and ≈min sufficient to maintain CPU state | ≈max | ≈max |
| 3" | ≈0 | <max and ≈min sufficient to maintain CPU state | ≈max | ≈max |
| 3''' | ≈0 | <max and ≈min sufficient to maintain CPU state | <max | ≈max, or sufficient to support core logic clock freq. |
| 3'''' | ≈0 | <max and ≈min sufficient to maintain CPU state | ≈0, except that generally RTC remains active | ≈max |
| 3''''' | ≈0 | <max and ≈min sufficient to maintain CPU state | ≈0, except that generally RTC remains active | <max and ≈min sufficient to maintain logic state |
| 4 | =0 | =0 | most core logic circuits receive no operating clock | most core logic circuits receive no operating voltage |
| 4' | =0 | =0 | core logic circuits receive no clock except for RTC and wake-up circuit | core logic circuits receive no voltage except for RTC and wake-up circuit |
| 4" | =0 | =0 | core logic circuits receive no clock except for RTC and wake-up circuit | core logic circuits receive no voltage except for RTC and wake-up circuit |

Heretofore, control of the operating mode of a plurality of processors or CPUs by a single supervisor or manager has not been known, particularly when the supervisor or manager is itself or includes a processor or CPU, and more particularly, it has not been known to provide this type of multi-processor power management in a multi-server system. This level of control is referred to herein as global control over a plurality of processors to distinguish from the afore described single processor or CPU power management.

It is noted that the inventive system and method also extend beyond any single-board computer systems having multiple processors configured therein. No such multi-CPU computers are known that provide power conservation features of the type described herein, and it is noted that in exemplary embodiments of the inventive system and method that each of the plurality of processors are located within separate PC-board mounted module. Embodiments of the inventive system and method are provided for which both local-control and global-control are provided. Such global control over a plurality of computers or appliances (each itself having either a single or multiple CPUs or processors) is not therefore limited to computers operating a servers.

Embodiments of the invention provide for detecting activity (or inactivity) in numerous ways, including but not limited to at least three different ways described herein. Detection may occur at the local level so that local control can be information to globally control the power consumption of a system having a plurality of processors or CPUs.

In one embodiment, an OSI model having a physical layer is used for activity or inactivity detection. In a second embodiment, a TCP/IP layer is used for this detection, and in a third embodiment the activity or inactivity detection occurs at the application layer. In a fourth embodiment, two or more of these activity detection and control techniques are combined.

One technique for detecting activity or inactivity in the physical layer uses idle thread detection. In certain operating systems prevalent in the late 1990's through 2001 provide a procedural "hook" through an operating system functional call or other programming construct that allows query of the operating system and generation of a response or report back to the requester indicating how much idleness is present in the system, or more particularly how much idleness is present in the processor or CPU on which the operating system is executing. This operating system query may for example be made using an API function call that returns a value. Some exemplary alternative techniques and procedures for determining idleness in a system utilizes somewhat heuristic idleness detection algorithms, such an approach is described in co-pending U.S. patent application Ser. No. 09/558,473 as well as in U.S. Pat. Nos. 5,396,635, 5,892,959 and 6,079,025 (each of which is herein incorporated by reference) by the inventor of the present application as well as in the other applications related thereto.

Figure 16:
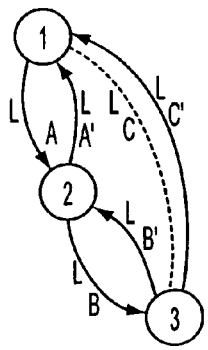
FIGS. 16-23 are diagrammatic illustrations showing exemplary state diagram for operating mode transitions.
Figure 17:
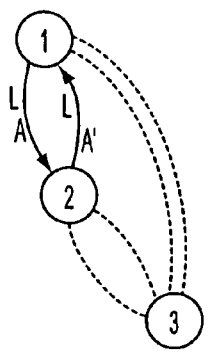
Figure 18:
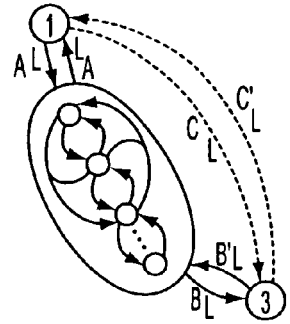

With reference to FIG. 16-23, several exemplary mode or state diagrams are illustrated. In these diagrams, a mode or state is represented by a circular node and a transition between two modes is represented by a directional line or arrow, the arrowhead indicating the direction of the mode transition. It is assumed for purpose of this discussion that the system may be in any one of three modes (Mode 1, Mode 2, or Mode 3) and a powered-off mode (Mode 4) (not shown). Some systems, such as certain Transmeta Crusoe™ CPUs operate so as to provide a maximum CPU core voltage and maximum CPU clock frequency in a Mode 1 type operation and a plurality of levels (15 levels) in a Mode 2 type operation, the Transmeta Mode 2 operation consuming less power in fifteen of its operating levels than in the sixteenth operating level. Each of these fifteen lower power consuming levels at which the CPU core voltage and CPU clock frequency are less than their nominal rated maximum are considered to be Mode 2 operating states as the processor operates in at most one of the states at any given time and each separately qualifies as a Mode 2 operation relative to the maximum performance Mode 1 state and CPU suspend Mode 3 state. A mode state diagram for the Transmeta Crusoe LongRun™ CPU operation is illustrated in FIG. 18.

It is also noted that the Intel SpeedStep™ technology involves the same or similar three modes of operation. The Intel SpeedStep provides for a fully on mode running at maximum clock frequency and maximum CPU core voltage, it also has a reduced state in which frequency and voltage are reduced relative to maximum, and a suspend state. During normal operation such as for an AC-line powered notebook computer, the CPU clock frequency and CPU core voltage are at their rated maximum values. However, in at least one notebook computer made by IBM (IBM ThinkPad T21) a user may enable an optional power saving policy for battery powered operation and for AC-line powered operation in which the CPU clock frequency and the CPU core voltage are reduced to save power and lengthen battery life. These power saving policies also control hard disk drive, display brightness, and the operating condition of other internal circuits and peripherals.

Each of FIG. 16-23 shows a first mode (Mode 1), a second mode (Mode 2), and a third mode (Mode 3). A fourth mode (Mode 4) represents a processor or CPU that is powered down or in an Off state and is not shown. Various mode transitions are supported by the inventive system and method. Conventionally, the transitions between and among the three modes were controlled locally (though such terminology was not used for such conventional systems because there was no global control to contrast with) because all or substantially all control was provided either within the CPU or by chips, logic, or other circuits associated with the single computer or PC-board on or in which the CPU was located. In aspects of the present invention, global control is exercised over the operating modes of a plurality of the processors or CPUs, and some degree of local control is or may optionally be provided. The manner in which the transitions are controlled locally and globally are described in greater detail elsewhere in this specification.

Recall that in single processor or single CPU systems, Mode 1 and Mode 2 represent active work producing operating states, a non-zero frequency processor clock signal causing the switching of transistor or other circuits that permit instruction execution. Therefore, in single processor systems, particularly in notebook computer systems operating from finite energy sources (e.g. battery), the systems occupy most of the time they are "on" in a Mode 1 condition (or Mode 1-like condition) or in a Mode 2 (or Mode 2-like condition).

Operation in a Mode 3 condition does not provide any productive work so that if the user were to perform any reasonable amount of work using the device containing the power managed processor or CPU, there is little power savings that would be achieved during useful work.

In FIG. 16-23 the following notation is adopted. Each transition indicating arrow is labeled with either an "L" to indicate local control, a "G" to indicate global control, or an "LG" meaning that the transition may be controlled by either or both local control or global control. In addition, transitions from Mode 1 to Mode 2 are labeled "A" and transitions from Mode 2 to mode 1 are labeled "A'★. In analogous manner, other transitions are labeled as B, B', C, and C'. This notation will be useful in describing the differences between conventional systems and method and the present invention.

With respect to FIG. 16, there are shown locally controlled transitions between Mode 1 and Mode 2 (A and A') and between Mode 2 and Mode 3 (B and B'). For recent power management schemes, the A and A' transitions would normally be expected to occur with reasonable frequency during use of the notebook computer, and the B and B' transitions with lower frequency, under the assumption that the user will typically either be using the computer (A and A' transitions) or power it off (Mode 4), so that B and B' transitions will be less frequent. It may also be expected that the B' transition may be less frequent than the B transition, as computer makers may typically transition directly to Mode 1 from a Mode 3 (C' transition) when there is suddenly a need to wake up the CPU from a suspend type state. It is noted that for embodiments of the present invention, the B and B' transitions may be frequent to very frequent, particularly when the 3rd mode is the Mode 3' state in which only the CPU clock is halted and all or most other system clocks remain operational. The Mode 3' to Mode 2 (or Mode 1) and the Mode 2 (or Mode 1) to Mode 3' transition can occur very rapidly and because of the high CPU clock frequency and the number of switching circuits present in modern CPUs can yield considerable power or energy savings. Embodiments of the invention may also provide that a system operating in Mode 3' (CPU clock stopped or slowed significantly) may also further transition to a Mode 3" (CPU and other clocks stopped or slowed significantly) under specified conditions.

FIG. 17, illustrates an operating scenario under which the processor or CPU is maintained in an active state and only the A⇆A' transitions occur under local control. The B⇆B' and C⇆C' transitions are illustrated in dashed lines.

FIG. 18, illustrates a similar operational scenario wherein the processor or CPU may transition to any one or sequentially through a plurality of Mode 2 states. This operational scenario is similar or the same as the scenario under which the Transmeta Crusoe processor may operate.

The inventive architecture, system, device, and method may be operated in a fundamentally different manner, using either only global control or using a combination of local and global control, to alter the operating mode of a plurality of processors or CPUs. Variations on this power management scheme are now described relative to FIG. 19-23.

Figure 19:
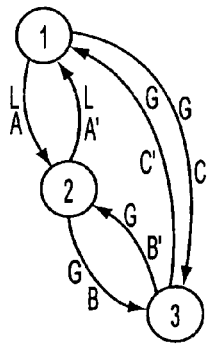

In FIG. 19, the Mode 1 to Mode 2 A⇌A' transitions are locally controlled. For example, in the Intel SpeedStep™ CPUs the A⇆A' transitions are controlled using control mechanisms provided by Intel on their CPU chips that permit a system designer to issue a command to the CPU to transition it from Mode 1 to Mode 2 under an identified condition and from Mode 2 to Mode 1 under a second identified condition. Similarly, the Transmeta Crusoe CPUs implementing their LongRun technology would transition from Mode 1 to a selected one of a plurality of Mode 2 states, and from that Mode 2 state (or a different Mode 2 state) to Mode 1, under identified conditions. These conditions are known in the art, available from Intel or Transmeta, or from Intel, AMD, or Transmeta computer manufacturer OEMs, and not described here in greater detail.

While the conventional systems and methods may permit the B⇌B' transitions and/or the C⇌C' transitions under local or self-control within a processor or CPU (or within circuitry associated with a CPU on a common mother board or other platform or enclosure), embodiments of the inventive system and method preclude such local or self-control. Rather, a manager or supervisor (see description of manager or supervisor capabilities and implementations elsewhere in this specification) only may globally manage the B⇌B' transitions and/or the C⇌C' transitions under a global control scheme. Global control in this manner is illustrated for example, in the state diagram of FIG. 20.

Figure 20:
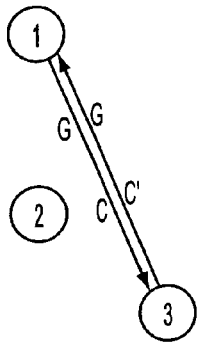

In yet another embodiment of the invention, depicted in the FIG. 20 state diagram, Mode 2 operation is not supported and there are no A⇌A' transitions or B⇌B' transitions. It is observed that operating only in Mode 1 or Mode 3 would not represent a generally useful power management scheme for a single processor or CPU system because Mode 1 operation is a full power active mode and Mode 3 is power conserving but inactive mode. Therefore, there is little power savings that would result where CPU or processor loading is sufficient to keep the processor or CPU out of Mode 3. Significantly, systems or power management policies providing only C⇌C' transitions for single CPU systems (or for any processor or CPU systems) do not seem to exist in the computer industry.

On the other hand, this operating scheme is viable and presents significant power conservation features for multi-processor or multi-CPU architectures, particularly in the server environment where some or significant over-provisioning of server capacity is the norm and where the server suite may typically operate at from twenty to fifty percent of maximum capacity. As described in greater detail elsewhere in this specification, in the inventive Integrated Server System Unit (ISSU) a plurality of server modules, each having a processor, are integrated into a single enclosure and coupled for communication by various in-band and out-of-band bus and interconnection links. A manager or supervisor is provided (for example, in the form of a Management Module or designated Server Module operating as the manager or supervisor) that collects and/or analyzes CPU "activity" (where activity is defined broadly as described elsewhere in this specification) and generates control signals that maintain or alter the operating mode of individual Server Modules or identified groups of such Server Modules. While the primary control is over the processor or CPU within these Server Modules, it is noted that other circuits or components, such as for example, display, hard disk drive, and other circuits and/or peripherals may be similarly controlled by the same or different control signals.

Servers, server systems, or so called server farms generally designed and implemented with significant capacity over-provisioning. Reasons and rationale for such over provisioning is known in the art and therefore described only briefly here. Providing a positive first visit Internet web experience and maintaining a quality of service (QoS) is important for developing and maintaining clients, customers, or other visitors to a web site. Content must be served within a reasonable period of time, on a first visit and on subsequent visit, or visitors will not return. While the quality of service may be permitted to vary somewhat by time of day and/or season, the reasonableness standard still applies, and normally it is best to maintain a very high quality of service all the time. Paramount in this goal would be to serve content such as web pages, streaming video, or cached content, without delay. Even during time periods (time of day, season, event driven) where web traffic and the amount of content that need be served by a server is likely to increase, sufficient server capacity must be in place. Over provisioning by at least 30% or so is typical, and frequently 100%-500% or more over-provision or over-capacity may be provided.

This moderate to significant over-provisioning is accepted by the server community as a necessary cost item, both in terms of the cost to purchase and maintain the equipment, the cost to power the equipment, the cost to cool or remove the heat generated by the equipment, and the negative impact on equipment longevity as a result of continuous operation.

Conventional server systems have not been power managed as there has been a philosophy that if the equipment is there it should be operated at maximum speed so as to serve content or respond to other requests as rapidly as possible. Conventional server units within a rack of server units have been to the inventor's best knowledge maintained in an always on always ready to serve mode. More recently, there has began to be some appreciation that power saving features provided in commercial personal computers might result in some power conservation benefits. At most these recent ideas have concentrated on the Mode 1 to/from Mode 2 (A⇌A' transitions) based on the Intel SpeedStep™, Transmeta Crusoe LongRun™, or other similar technologies. This local self-control by each processor provides some energy conservation but does not provide the conservation of the inventive system and method.

One of the Transmeta Crusoe Model chips operates at 533 MHz and 1.6 volts when in Mode 1 and at 300 MHz and 1.2 volts when at its slowest CPU clock frequency and lowest CPU core voltage in Mode 2. (Note that these operating parameters are nominal and subject to change by their manufacturer from time to time as products change, even within a particular product model or family.) Recall that to a general approximation $P \propto K_1\ Cfv^2 + K_2$, where P=power consumption, f is clock frequency, v=CPU core voltage, C=capacitance, $K_1$ is some multiplicative proportionality constant, and $K_2$ is some additive constant that represents the small power consumed by a circuit when operating voltage (e.g. Vcc) is applied but the CPU or processor clock is turned off (e.g. 0 MHz clock, or very slow clock). While these values may change for different CPU designs and chip sets it will be clear that the savings in transitioning from a 1.6 volt/533 MHz operation to a 1.2 volt/300 MHz operation is modest as compared to transitioning from a 1.6 volt/533 MHz operation to a 1.2 volt/0 MHz operation. Operation with a CPU core voltage that is equal to that of the CPU clock slowed Mode 2 or an even a lower CPU core voltage than that needed to maintain a 300 MHz clock switching may be used during Mode 3 operation when only CPU register and memory contents or status need be maintained.

It will therefore readily be appreciated in light of this description that operating a multi-server system where at least global control of the operating modes of a plurality of CPUs (and optionally other circuit elements of the servers) will yield significant power conservation benefits. Furthermore, in some operational situations combining Mode 1 to/from Mode 2 (A⇌A' transitions) either locally controlled or globally controlled may add even further power conservation features.

FIG. 19 illustrates the state transition for an inventive embodiment in which A⇌A' transitions are controlled locally, and B⇌B' and C⇌C' transitions are under the control of a global manager. FIG. 20 illustrates the state transition for an alternative inventive embodiment in which the processor or CPU only operates in either Mode 1 or Mode 3 and not in Mode 2 so that A⇆A' and B⇆B' transitions are prevented from occurring (such as by, disabling a feature provided with a chip, de-configuring power conservation features, or providing the manager with the ability to otherwise prevent such transitions), and C⇆C' transitions are under the control of the global manager.

Figure 21:
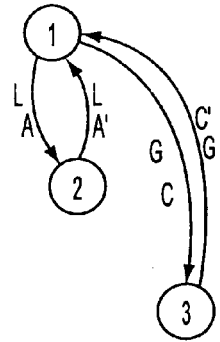
Figure 22:
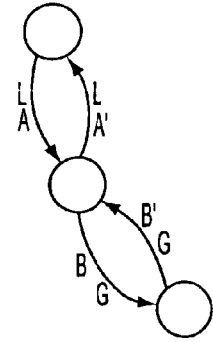
Figure 23:
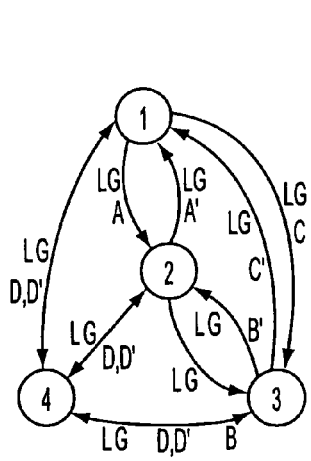

FIG. 21 illustrates the state transition for yet another alternative inventive embodiment in which the processor or CPU only operates in any of Mode 1, Mode 2, or Mode 3 and while the A⇆A' transitions occur under local control, the B⇆B' transitions are prevented from occurring, and C⇆C' transitions are under the control of the global manager. In this embodiment, therefore, the transition to Mode 3 therefore only occurs directly from Mode 1 and never from Mode 2. In yet a further embodiment, illustrated in FIG. 22, the A⇆A' transitions occur under local control and the B⇆B' transitions occur under global control, and where C⇆C' transitions do not occur. FIG. 23 illustrates the mode transitions in a further embodiment, where each of the A⇆A', B⇆B', and C⇆C' transitions may occur according to predetermined power management policies and where each separate possible transition may be under either local and/or global control according to the predetermined policy or power management procedure or algorithm. The policy, procedure, or algorithm may also disable certain states of transitions statically or dynamically, and may cause certain of the server modules or other CPU or processor based devices into a powered off (Mode 4) and back to any of the powered on modes.

Figure 24:
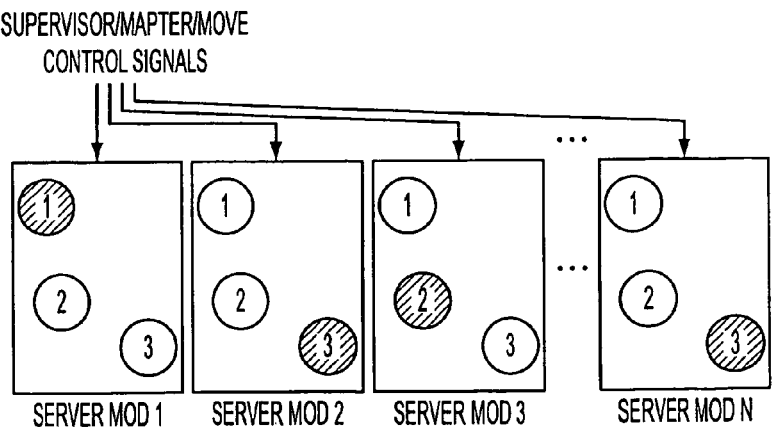
FIG. 24 is a diagrammatic illustration showing the manner in which a plurality of servers may operate in different modes based on local detection and control of selected mode transitions and local detection but global control of other selected mode transitions.

FIG. 24 illustrates that for a system having a plurality of processor or CPU based devices, the CPU or processor within any particular device (such as server modules) may be in different states at different times under the direction of an device-local control, a system supervisory global control, or a combination of the two. The shaded mode circles indicate the current mode and the mode transitions, though not shown, may be any of those already described relative to the other inventive embodiments.

In light of the above description, it will be appreciated that the inventive system and method extends earlier power management structures, architectures, and methods by the same inventor Henry T. Fung (such as are described in U.S. Pat. Nos. 6,115,823; 6,079,025; 5,987,614; 5,961,617; 5,892,959; 5,799,198; 5,758,175; 5,710,929; and 5,396,635, herein incorporated by reference) to multi-server or multi-node architectures.

These existing power management patents include innovative systems, architectures, and methods for saving or conserving energy or power within a single system by using one or more of several power management schemes, including, but not limited to the following schemes: (1) Detection of the idle activities by monitoring I/O activities or execution of a predefined code thread. (2) Reduction of power consumption by lowering (or stopping) various clock frequencies or removal of power (operating voltage) to different components within the system. (3) While in a power saving mode, continuing to monitor the occurrence or non-occurrence of a second predefined event or activity and entering a deeper power saving mode in response to the second predefined event or activity detection. Note that although certain events, activities, and/or indicators are referred to predetermined, such events, activities, or indicators may be dynamically determined during operation as well as determined in advance.

The present Multi-Server Power Management scheme extends these earlier techniques, augments them, and introduces entirely new features and capabilities. Five particular innovations are set forth below, however, it will be apparent that the invention described herein is not limited only to this set of features and capabilities.

First, power management of the network devices including the server modules can occur at different OSI levels and be extended beyond the physical layer. In particular, the detection of server activity whether measured by idle activities or other means may occur at the physical layer but is advantageously extended beyond the physical layer to the network layer (for example, to the TCP/IP layer) and to the application layer. For example, at the physical layer, the number of CPU idle threads within a fixed time period may be detected or measured, or, some type of statistical evaluation of CPU idleness may be determined. As one numerical example, if the CPU is idle 80% of the time while in a particular operating mode such as Mode 1, it is clear that this much processing performance is not required and the CPU performance may therefore be adjusted downward to save power. If we assume in a simple case that a Mode 2 operation reduces the CPU clock speed by a factor of ¼ over the Mode 1 clock speed, then the CPU will only be able to process ¼ of the instructions in the same period of time, however, this is sufficient given the 20% loading (80% idleness) the CPU is experiencing. Therefore, based on this idleness detection, significant power savings are realized. Alternatively or in addition, if for example, under the same scenario there is a group of ten network server devices that are being managed as a single logical group or image, eight of them may be put into an inactive but powered on Mode 3, and the other two network server devices placed in a Mode 1 operating state running at a 100% performance level.

Power management may also or alternatively occur based on detection at the TCP/IP layer (or equivalent layer where a protocol other than TCP/IP is implemented). Under this detection and control model, CPU performance is monitored relative to the handling of TCP/IP packets. CPU performance level is lowered, such as by reducing CPU clock frequency (desirably accompanied by a reduction of CPU core voltage) until packets start dropping, and then increasing performance so that packets are not dropped and to provide an operating margin. The initial reduction and subsequent increase in CPU or server performance may be accomplished by altering the operating mode of individual servers or by adjusting the aggregate characteristics of a group of servers to provide the aggregate performance required. It is noted that where communications channel bandwidth limits the performance of a server, there may be advantage to reducing the performance level of the server to just satisfy the bandwidth limitation and thereby conserve power in the server.

At the application layer, the activity monitoring or detection may for example involve measuring the number of times a specific port address is or has been requested within a fixed time period. This determination or measurement may be accomplished, for example, by using a SNMP agent. In response to this measurement, an appropriate number of servers each operating at an appropriate performance level (Mode 1 or Mode 2) are provided to meet the performance requirement for each application. The rest of the servers are placed in a highly power saving state (Mode 3 such as Mode 3' [e.g. CPU clock halted] or Mode 3" [e.g. CPU and other logic clock stopped], or Mode 4). The policies for selecting the number of active servers and their operating mode are described elsewhere in this specification. Recall that different application types may use different rules or policies to determine the server CPU performance and power conservation requirements.

Second, power management is extended beyond a single processor of CPU and in particular is extended beyond a single server (independent of the number of processors it may contain) to multiple servers across an entire network. It will be appreciated that this multi-server power management capability may be provided either with discrete servers or with the particular embodiment of the Integrated Server System Unit (ISSU) or Integrated System Server architecture generally.

Third, activity information created by any one server (or server module in the ISS scheme) is accessible to a designated supervisor via standard networking protocol. This supervisor is frequently referred to as the master, the capabilities of the master residing for example in an ISS Management Module or an ISS Server Module, though the particular location or processor responsible for accessing and utilizing the activity information for the servers is not critical to the power management. In preferred embodiments of the invention, the supervisor or master capabilities reside in one or more management modules, and in an alternative embodiment, the supervisor or master capabilities reside in a designated or selected one of the server modules.

Fourth, servers can be reconfigured to run a specific application (e.g. web, streaming media and email) based on a certain load distribution requirement or requirements existent at the time upon receiving commands from a designated supervisor or master. Advantageously, this feature will provide or support operation at three or more power consumption levels, including a first full power mode (full CPU core voltage and normal maximum CPU clock frequency), a second mode consuming less power than the first mode in which either the CPU core voltage or the CPU clock frequency or both are reduced from the first mode, and a third mode in which the CPU is substantially inactive and consumes less power or energy than the second mode. In one embodiment, this third mode provides a CPU core voltage to maintain state and either stops the clock or maintains the clock at a very low frequency (for example, 1 Hz to a few hundred Hz) so that the CPU is effectively inactive.

Fifth, allowing any number (including none, one, many, or all) of servers across the entire network to go in and out of a 3rd power consumption mode directly from a first mode (Mode 1) without going through another intermediate power saving mode upon receiving commands from a designated master. This third power consumption mode (Mode 3) may for example include a mode where the processor or CPU is powered at some level but substantially inactive from the standpoint of executing commands or serving content, and memory associated with the CPU is refreshed. This third mode may be further broken down into a mode in which only the CPU clock is stopped (Mode 3') such as may occur when a Halt instruction is executed, and into a deeper power savings mode in which the CPU clock is stopped and other clocks are also stopped (Mode 3"). It is noted that in a typical implementation, the real-time clock (RTC) will generally run al the time so that certain system timing events and alarms can be maintained. The third power saving mode may also or alternatively be a powered down mode (Mode 4), however, such operation is somewhat undesirable unless it is anticipated that the powered down (Mode 4) server module will not be needed for some appreciable period of time as a delay is associated with bringing the CPU and the server module within which the CPU is located back on line. The Mode 4 operationl may therefore only be used when the Mode 4 operation is expected to continue for several seconds, minutes, hours, or longer periods of time. It will be appreciated that in the third power saving mode, the CPU clock (and or other clocks in the system) may be either off entirely or running at a very low rate (such as for example 1 Hz, 10 Hz, 100 Hz, 1 KHz, or some other value that is small in comparison to the nominal frequency (for example, typically in the 100 MHz to 2 GHz range) of the processors used for such servers. It will be appreciated in light of the description provided here, that the invention provides for direct transition between a full or substantially full power mode and an inactive or substantially inactive mode. Although, this power mode transition would be much less useful for battery-powered portable applications for notebook computers or PDAs because of the desirability of maintaining some activity such as when typing into a word processor, this transition scheme extremely useful in a multi-server environment, where each of a plurality of servers can serve the same content and it is desired to reduce the number of active servers while maintaining sufficient ability to satisfy quality of service requirements or otherwise maintain operation with a subset of the total set of servers.

These five innovations (as well as others) may of course be combined in various ways to provide even greater synergism. For example, the first described innovation extending the detection of idle activities beyond the physical layer to the network layer and/or to the application layer, may readily be combined with the fourth described innovation wherein the servers can be reconfigured to run a specific application based on a certain load distribution requirement or requirements existent at the time upon receiving commands from a designated supervisor or master.

This combination may also be extended according to the second described innovation to include multiple servers across an entire network, independent of whether the servers are discrete or integrated ISSU-based server modules. This latter combination may be further enhanced by also implementing the third described innovation to provide that activity information created by any one server (or server module in the ISS scheme) is accessible to a designated supervisor or master via standard networking protocol.

In yet another embodiment, the fifth described innovation that provides for any number of servers is a system having a plurality of servers to transition directly from a full performance 1 st mode to an inactive 3rd mode. This scheme generally representing a non-useful power management scheme when applied to any single computer or server, but providing considerable benefit when the plurality of servers are managed in combination to provide a desired level of performance and power consumption savings.

Table III describes the behaviors of selected component inside an exemplary computer system, such as a computer system configured as a server module, at the different power management modes (Modes 1, 2, 3, and 4) according to one embodiment of the invention. This embodiment implements somewhat different power management policies than the embodiment described relative to Table II and also addresses the manner in which certain other peripheral devices or other components may be power managed. The mode descriptions are therefore generically similar but the detail or submode descriptions differ somewhat, but such differences are semantic and each of the modes and submodes described in any of the embodiments are within the scope of the inventive system, apparatus, computer program, and method.

In this embodiment's first mode (Mode 1) the processor or CPU functionally able to execute instructions for operating system and application programs; CPU activities are monitored, and the internal CPU clock frequency and CPU core voltage may be lowered if activity level of the CPU falls below some threshold (predefined or dynamically determined threshold). The voltage regulator is set to deliver the maximum (or specified nominal) CPU core voltage, the clock generator, RAM, hard disk drive, core logic, NIC, BIOS, and Real-Time Clock (RTC) are ON. The video may independently be controlled to be on or off and may even be absent from the system as video signals frequently are not needed for server systems, except in some cases of set-up or service. A microcontroller (µC) is operative and remains in continuous communications with the Management Module (or with an different Server Module designated or selected to operate as a manager or supervisor.

In Mode 2, the CPU still executes operating system and application program instructions, CPU activity is still monitored, and if the activity level rises above some predetermined or dynamically determined threshold (or according to some other rule or policy) the CPU enters Mode 1 operation, but the CPU enters Mode 3 in response to receipt of Mode 3 entry commands received from a manager of supervisor. These Mode 3 entry commands may generally be received from an external master via standard in-band network protocols. Recall that in Mode 2 the voltage regulator that supplies CPU core voltage is set to less than maximum core voltage. As in Mode 1, the clock generator is on but will (in preferred embodiments) deliver a lower frequency clock signal, and RAM, hard disk drive, core logic, NIC, BIOS, and Real-Time Clock (RTC) are ON. The Video may independently be controlled as in Mode 1. A microcontroller (µC) is operative in Mode 2 to activate a suspend signal of the core logic power management unit or PMU (Out of Band) after receiving commands from the management module (or server module acting as a designated master or manager) and causes the particular server and/or multiple servers within the system to enter the 3rd mode.

TABLE III

Exemplary behaviors of selected components inside a computer system (e.g. server module) at the different power management modes according to one particular embodiment of the invention. Other embodiments support alternative or additional modes and transitions between modes as described for example in Table II.

|  | $1^{st}$ Mode | $2^{nd}$ Mode | $3^{rd}$ Mode |
| --- | --- | --- | --- |
| CPU | 1) Execute applications 2) Monitor CPU activities 3) Lower internal CPU clock frequency and voltage if activity level falls below a pre-defined threshold (go to $2^{nd}$ mode) | 1) Execute applications 2) Monitor CPU activities 3) Go to the $1^{st}$ mode if activity level rises above a pre-defined threshold 4) Go to the $3^{rd}$ mode after receiving commands from an external master via standard network protocol (In Band communication) | 1) CPU is in very low power state 2) Return to $2^{nd}$ mode or 3) Return to $1^{st}$ mode |
| Voltage Regulator | CPU core voltage is set to maximum | CPU core voltage is set to less than maximum | CPU core voltage is set to be equal to or less than core voltage in 2nd mode setting. |
| Clock Generator | ON | ON | Stop most (or all) clocks. For example, may stop only CPU clock, or may stop CPU and other clocks. (Usually RTC is not stopped.) |
| RAM | ON | ON | Suspended (refresh only) |
| Hard Disk | ON | ON | Suspended after receiving commands from the CPU |
| Core Logic | ON | ON | Suspended after receiving commands from the CPU or signal from uC |
| NIC | ON | ON | Suspended after receiving commands from the CPU or turning off NIC Clk. Send resume signal to core logic after a predefined packet is received (e.g. Wake-On-LAN) |
| Video | ON/OFF | ON/OFF | Suspended after receiving commands from the CPU or turning off Video Clk |
| BIOS | ON | ON | Suspended |
| RTC | ON | ON | Send resume signal to the core logic after alarm expire |
| micro-controller (UC) | Continuous communications with the management module. | Activate the suspend signal of the core logic PMU (Out of Band) after receiving commands from the management module and causes the entire system to enter the $3^{rd}$ mode | Send resume signal to core logic after receiving commands from the management module |

In Mode 3, the CPU is placed in a very low power consumption state and can return to Mode 1 or to Mode 2 upon the occurrence of some predetermined condition such as are described elsewhere in this specification. The voltage regulator that provides CPU core voltage is set to a voltage equal to or less than the core voltage in Mode 2 to thereby save power over that consumed in either of Modes 1 or 2v. The clock generator is also stopped so that power consumed switching devices is substantially eliminated. (It is noted that in an alternative embodiment, the clocks in Mode 3 may be operated as a very slow rate, for example a few Hz to a few hundred Hz, or some other low clock frequency relative to the normal clock rate of the CPU.) RAM is suspended (that is the memory contents are refreshed only), the Hard Disk drive or drives are suspended after receiving commands from the CPU (or other commands to spin down and go into a suspend state). The core logic is also placed into a low power consuming suspend state after receiving a command from the CPU or signal from the micro-controller. Mode 3 operation also provides for suspension of the network interconnect card or circuit (NIC) after receiving commands from the CPU or turning off the NIC clock. (Note that a resume signal may be generated and sent to the core logic if a predefined packet is received, such as for example, a Wake-On-LAN signal.) The BIOS is suspended, and the RTC may send a resume signal to the core logic after a RTC alarm expires. The microcontroller continues to monitor communications with the management module or other designated master so that it may send a resume signal to the core logic after receiving commands directing this type of action from the management module or other designated management master. If the Video was on prior to entering Mode 3, the Video is suspended after receiving commands from the CPU or the Video Clock signal is stopped or turned off, and if it was off it remains off.

While much of the description herein has focused attention on performance and power management of the processor, CPU, core logic, and other logic circuits within a computing device or system, or other information instrument or appliance having such processor and/or logic, it should be understood that the dynamic power management and dynamic workload management is not only limited to such systems or components. More particularly, the inventive dynamic power management system, method, architecture, procedures, and computer programs may also be applied to a diverse set of electrical and electronic components including components commonly referred to as computer peripherals. Application of the principles described herein therefore have the potential of reducing power consumption and prolonging component life to such devices and systems as video monitors, hard disk drives or other storage systems or devices, printers, scanners, cameras, other network devices and circuits, industrial tools and systems, and a myriad of other systems and devices.

Hard disk drive storage systems benefit from the inventive system and method as well as other inventive features as described in co-pending U.S. Provisional Application Ser. No. 60/236,062 entitled System, Apparatus, and Method for Power Conserving and Disc-Drive Life Prolonging RAID Configuration filed 27 Sep. 2000; incorporated herein by reference, a system and method for operating and controlling a plurality of rotatable magnetic hard disc drives operating in a Redundant Array of Independent Discs (RAID) was described.

Heretofore, magnetic hard disc drives had remained the primary computer data storage and retrieval medium for may reasons, including: low cost per megabyte of storage; very fast read and write access; multiple operating system and disc drive device support; the ability to organize into arrays to provide either greater capacity, data redundancy, or both; as well as numerous other advantages as are known in the art. For these and other reasons, disc (or disk) drives, particularly rotatable magnetic hard disc drives have found application in a great variety of data and other information storage and retrieval applications.

Hard disc drive technology continues to evolve to provide higher recording densities, greater disc drive storage capacities, higher spindle speeds, reduced seek time, faster burst and/or sustained data transmission rates. Many disc drives are specialized for a particular application either in terms of storage capacity (typically 1 to 30 gigabyte or more, physical size (e.g. 1.8-inch, 2.5-inch, 3.5-inch, or 5.25-inch form factor), interface compatibility (e.g. ATA, IDE, SCS1, Fire Wire, to name a few), intended application (e.g. portable notebook computer, home or office desk top computer, commercial server environment, instrumentation, as well as many other standard and specialized applications).

Where the integrity of the data is of particular concern, such as in commercial server and/or database environments, some form of on-line data redundancy is typically provided. For example, one or more Redundant Array of Independent Disc (RAID) may be provided to provide desired storage capacity and data redundancy. The RAID was proposed in the paper "A Case for Redundant Arrays of Inexpensive Discs (RAID)" by D. A. Patterson, G. Gibson, and R. H. Katz, Report No. UCB/CSD 87/391, University of California, Berkeley, Calif. 1987, incorporated herein by reference. Their basic idea for RAID was to combine multiple small, inexpensive discs into an array that outperforms a Single Large Expensive Drive (SLED). This array of discs would be arranged in such a way so they would appear to a computer as a single logical drive even though comprised of a plurality of physical drives. They calculated that the Mean Time Between Failure of this array would be equal to that of a single drive divided by the number of drives in the array. Therefore, they defined 5 different array architectures, each providing disc fault tolerance and each having different characteristics in order to achieve maximum performance in different environments. An additional non-redundant architecture (RAID Level 0) was also defined. Various RAID configurations or levels are presently known in the art and variations of these standard RAID levels continue to evolve over time.

Of particular interest here is the so called RAID Level 1 (RAID-1) which is also referred to as "mirroring" for reasons that will shortly become clear. The so called RAID 10 or RAID 0+1 is also of some interest as it involves mirroring in addition to data striping. A RAID-1 disc configuration creates an exact duplicate to a second (or mirror) disc any time data is written to a first (or primary) disc. Conventionally, this duplicate is created automatically and transparently to the system, application, and user. The user may not even be aware that the duplicate mirrored disc exists. Ideally, the mirrored disc is an exact duplicate of the data disc, though it is possible and acceptable for there to be some variation in the location and distribution of data between the primary and mirrored discs. While mirroring desirably occurs on a second hard disc drive so that the failure of the primary drive leaves the mirrored drive in operation, in some instances, the mirror drive may be a second disc platter within a single hard disc drive housing. Such single disc RAID-1 configurations are more susceptible to failure, and provide the desired redundancy only when the medium for the primary disc platter fails but does not provide redundancy when for example, the disc drive spindle motor fails.

The interface to the primary and mirror RAID-1 drives can be through a single controller which produces the performance of a single drive for reads and writes. Alternatively, two controllers (e.g. duplexing) may be provided so as to reduce the single point of failure risk. Duplexing can improve I/O data rate by allowing a zig-zag read or by writing to both drives simultaneously. When mirroring with a single controller, data is written first to the primary data drive and then to the mirrored drive. This generally slows down write operations.

Mirrored disc configurations are frequently used where high fault tolerance is required, such as in most fault-tolerant transaction processing systems. They attempt to improve the reliability of the disc storage device rather than improve data transfer rates. The Mean-Time-Between-Failure (MTBF) of a mirrored disc storage subsystem greatly exceeds the expected life of a system with a single set of disc drives utilizing conventional non-mirrored configurations. For RAID-1 mirrored system configurations significantly increase the probability that data can be recovered in a drive fails. The biggest disadvantage is that only half of the total disc storage capacity is available for storage as each set of data is duplication. RAID-1 mirrored storage capacity can only be expanded in pairs of drives. Of the various RAID levels, RAID Level 1 provides the highest data availability since two complete copies of all information are maintained. In addition, for conventional implementations read performance may be enhanced if the array controller allows simultaneous reads from both members (primary and mirror) of a mirrored pair. During writes in conventional implementations, there will be a minor performance penalty when compared to writing to a single disc. Higher availability will typically be achieved if both discs in a mirror pair are on separate I/O busses, but this is not required.

Data striping is the foundation of certain RAID levels, including RAID 0+1. Disc drives in a RAID group are partitioned into stripes, which may be as small as one sector or as large as several megabytes. The stripes are interleaved so that disc space is composed of alternate stripes of each drive. Data is written across the stripes instead of onto a single drive. The sizes of the stripes vary depending upon the application. I/O intensive applications benefit from large stripe sizes and data intensive benefit from small stripe sizes. Data striping desirably serves to balance the I/O load across all the disc drives in an array. With multi-user operating systems like Windows NT, Unix, and Netware, that support overlapped disc I/O across multiple drives, data striping keeps all the drives in the array busy and provides for efficient use of storage resources. In non-striped arrays the I/O load may not be balanced. Some of the drives may contain a lot of frequently used files while other drives may lay idle. Striping, when implemented, may typically provide higher performance because all drives are involved as much as possible.

As described above, RAID Level 1 provides disc mirroring where data is written to a primary disc and a secondary (mirror) disc, and identical data is stored on both discs. RAID level 1 does not provide for data striping. RAID Level 0+1 (RAID 10) is a combination of RAID level 0 (data striping without mirroring) and RAID level 1 (mirroring without striping) and provides for striping data across two pairs of mirrored disc drives. This configuration may provide for high performance write operations as there is no parity overhead. Again, there is a somewhat higher cost per megabyte of storage because four physical disc drives are required to achieve the capacity of two drives.

RAID Level 1 and RAID Level 0+1 are generally recognized as good choices in data storage environments where performance and data protection are more important than cost. The cost penalty arising from the need to have a duplicate set of disc drives.

Unfortunately, the requirement to provide twice the number of physical disc drives as warranted by the actual storage requirement comes at an even greater penalty than the cost of the disc drives themselves and the additional penalty of having to perform two write operations, one to the primary drive and the same data to the mirror drive. These penalties include the two-times increase in power consumption associated with operating a duplicate (or set of duplicated) mirrored disc drives, the heat dissipated by the added drives within the enclosure which will tend to age other electronics components at a faster rate, the added noise associated with the additional disc drives, and the shortened effective life span of the drives. These penalties are experienced in spite of the fact that the primary disc drive may not fail so as to require or otherwise benefit from the mirrored disc drive, and further in spite of the probability that the mirrored disc drive may fail before the primary disc drive. For identical discs, having the identical operating history, it is clear that each has substantially the same probability of failure and that either the primary or secondary drive may fail first. Therefore, there has remained a need for a system and method that reduce power consumption in a primary-mirror multi-disc drive system, as well as a need for a system and method that extend the life of either or both of the primary and mirror disc drives. There remains a further need for a system and method that reduces heat and noise in the computing environment.

Figure 25:
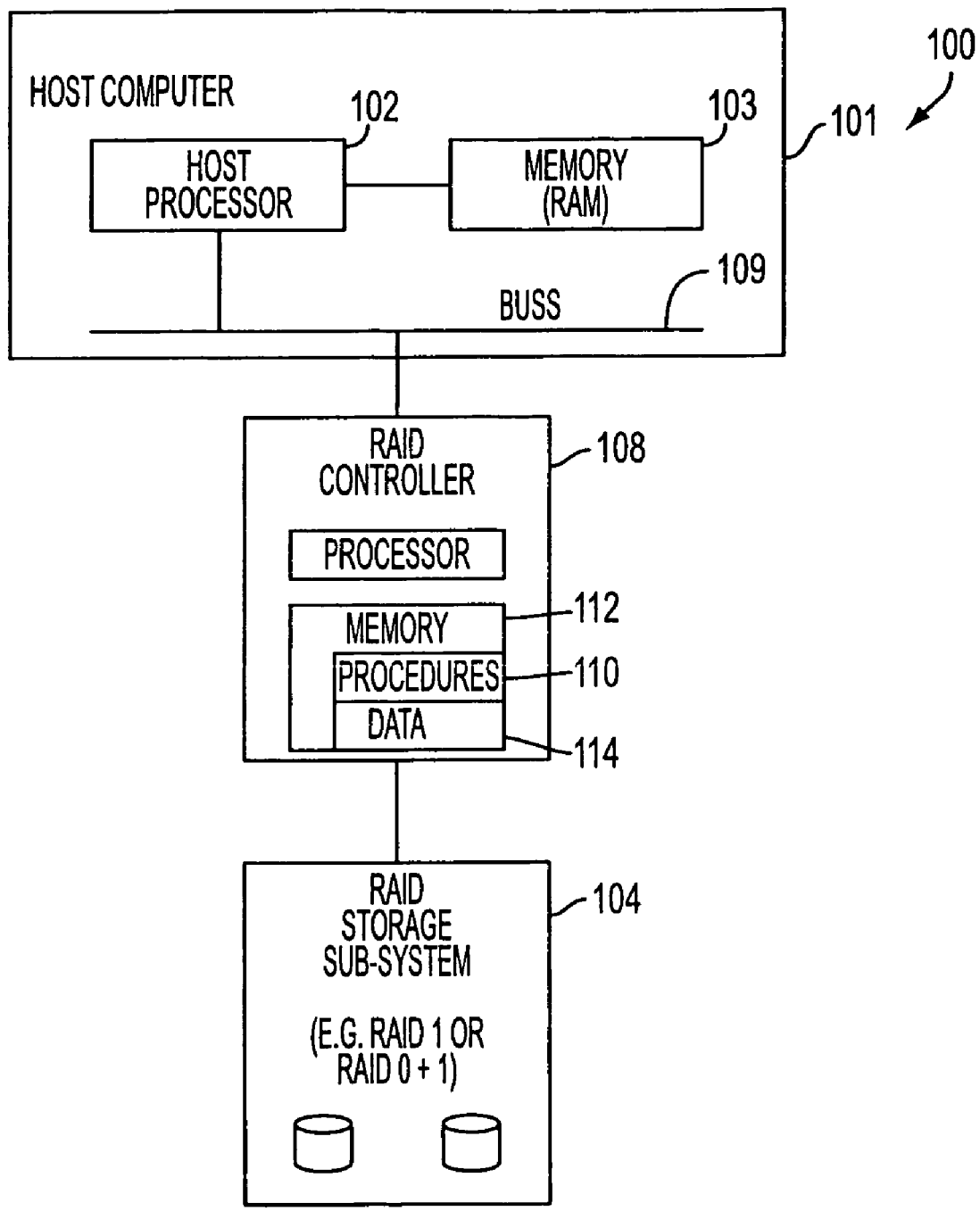
FIG. 25 is a diagrammatic illustration showing an embodiment of a computer system having a plurality of hard disc drives configured in a RAID configuration and using a separate RAID hardware controller.
Figure 26:
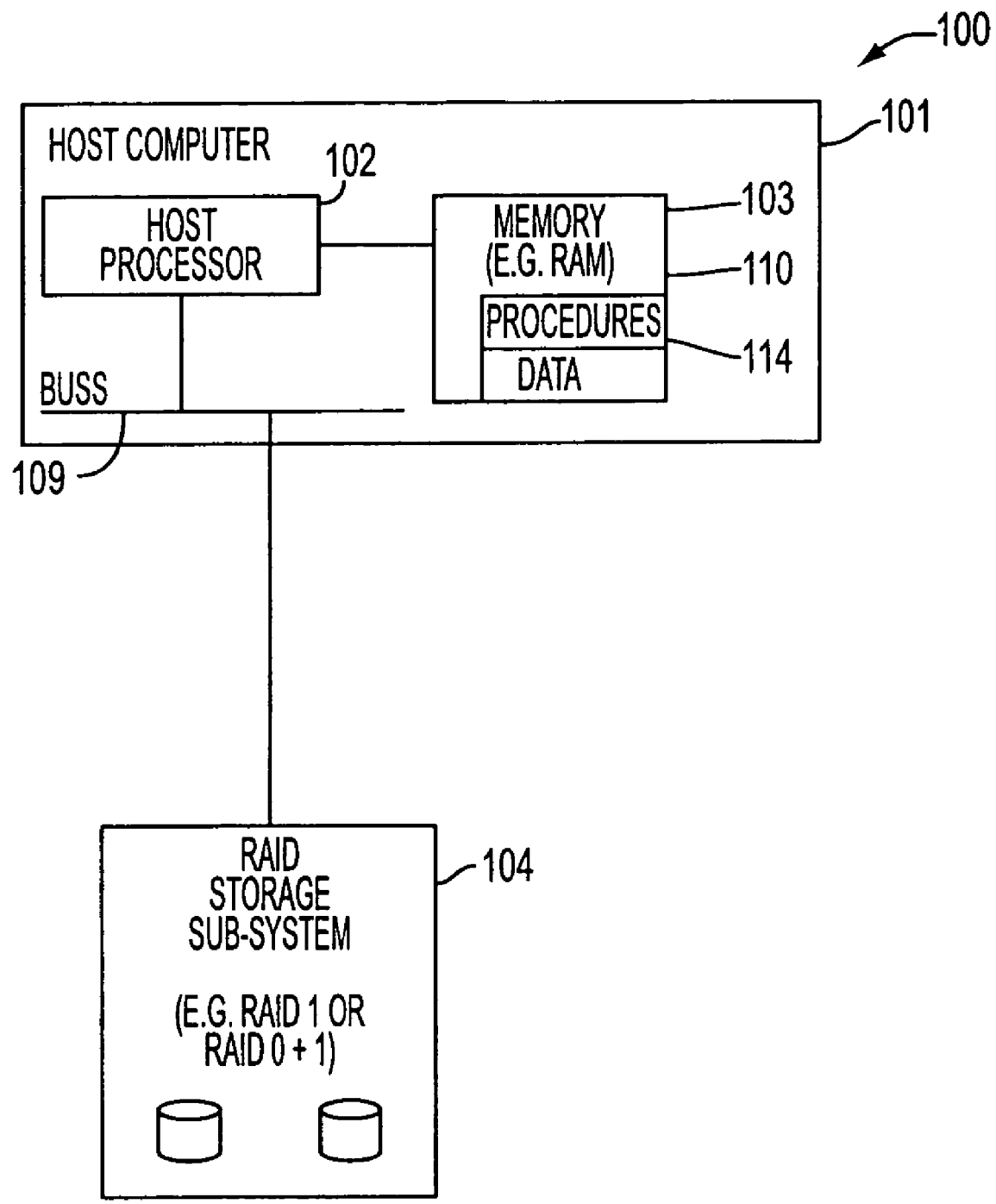
FIG. 26 is a diagrammatic illustration showing an alternative embodiment of a computer system having a plurality of hard disc drives configured in a RAID configuration and using software RAID control in the host processor.

FIG. 25 is a diagrammatic illustration of an exemplary computer system with which the inventive structure and method may used. This configuration represents what is commonly referred to as hardware RAID control and utilizes a separate hardware RAID controller with it's own processor. A software RAID control configuration is also supported and illustrated in FIG. 26. A host computer 101 having a processor (such as a CPU) 102 coupled to a memory 103 generates I/O requests to a mass storage system such as a RAID storage subsystem 104. The I/O requests may be communicated over one or more buss 109. In the present invention, the RAID storage subsystem may be configured to include mirroring of data between two sets of storage devices. The storage devices may typically include hard disc drives, but is not limited to such hard disc drive devices. The I/O requests or other commands are passed to the storage subsystem 104, frequently through a RAID controller 108, but such storage subsystem control may alternatively be controlled by the host computer. Usually, the presence of a separate storage subsystem controller (e.g. RAID controller) will depend on the I/O requirements of the system and the tolerable level of host loading. In server type computer systems one or more separate storage controllers are generally used. In demanding server applications, multiple RAID controllers are the standard. Host computers, storage device controllers including RAID controllers, and storage subsystems including RAID 1 and RAID 0+1 subsystems are known, and except for the inventive modifications and improvements are not described in detail.

Whether provided by the host computer (software RAID) or by a separate hardware storage subsystem controller (hardware RAID), or some hybrid of the two, the inventive structure and method provide procedures 110 for operating the storage devices, such as the RAID hard disc drives so as to reduce power or energy consumption and to increase effective disc drive life. These procedures may usually be stored in memory 112 (either host memory or controller memory depending upon the implementation) during execution by the processor (either the host processor or the controller processor). Data 114 may also be stored in memory 112. Desirably, the storage device control procedures are stored as software and/or firmware in a non-volatile memory. The storage controller and host computer may be any of the types available that support RAID devices and that may be customized or programmed to support the inventive procedures for activating and deactivating the disc drives as described hereinafter.

In the software RAID implementation, the inventive procedures are stored in memory 103 of the host and executed by the host processor 102. While performance may not be as high in extreme I/O environments, it may be more than adequate to meet demand in any particular environment, and is much more cost effective as the additional expense of a separate RAID controller is eliminated.

In many server environments, particularly in Internet server environments where extremely large volumes of identical data may be sent to thousands or millions of browsers, most accesses to the disc storage system are read operations. For example, in a server serving current information concerning athletes and competition in the Year 2000 Summer Olympics being held in Australia, the ratio of data write operations to read data operations on any particular server must be many thousands to many millions to one. Even for an event where new results may appear hourly, write cycles occur relatively infrequently as compared to read cycles. For old information, the ratio of read operations to write operations may be much higher.

In the RAID 1 (and RAID 10) configurations, only one drive (primary or mirror) or one set of drives (primary set or mirror set) need to be available or powered ON at a time to support such read operations. The identical nature of the data stored on the primary and mirror drives only changes in response to a write operation and is unchanged by the more frequent read operations. One of the drives can be either in a standby mode (such as a mode where power is provided by the spindle motor is not operating) or with operating power (e.g. operating voltage and/or current) completely removed. Various shades of power conservation may be applied between completely on and completely off, particularly if the internal circuitry of the disc drive and control electronics and any on-board buffer memory or the like are designed with staged power conservation features. It is noted that since the primary and secondary disc drives store identical data and are completely interchangeable from a functional (and likely from a physical standpoint) there is little need to identify that it is the primary or the secondary drive that is powered off or placed into a standby mode, reduced power consumption mode, power conservation mode, or simply powered off. More accurately, we may refer to the drives as the active drive (or active drive set) and the inactive drive (or inactive drive set).

Figure 27:
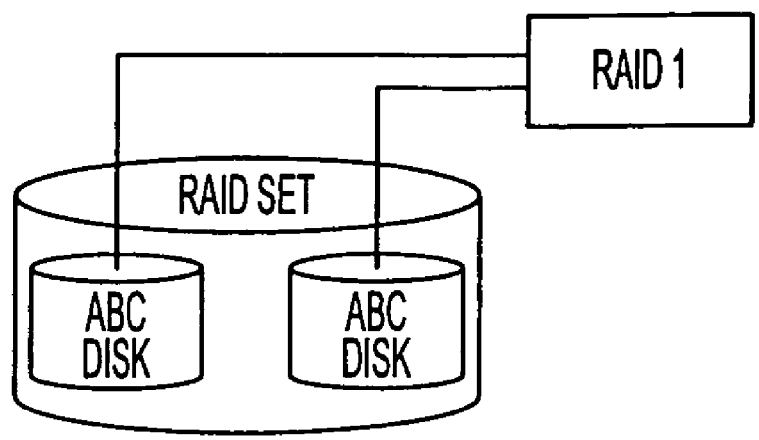
FIG. 27 is a diagrammatic illustration showing an exemplary RAID 1 configuration.
Figure 28:
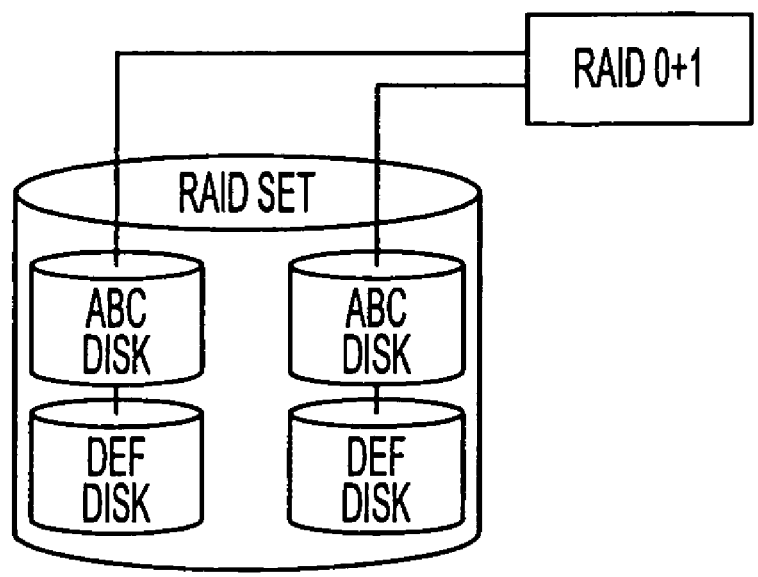
FIG. 28 is a diagrammatic illustration showing an exemplary RAID 0+1 (RAID 10) configuration.

FIG. 27 and FIG. 28 illustrate the manner in which data is distributed among disk drives (or disk drive sets) in RAID Level 1 and RAID Level 0+1 respectively. In general the number of disks and the capacity of discs may be selected to match the storage requirements.

Where one of the primary or secondary disc drives or disc drive sets are powered off, the power consumption of the mass storage sub-system can be reduced by 50 percent, and where some power is provided to the disc drive or to the control electronics responsible for waking up the disc drive when needed, a proportionate decrease in power consumption will be realized. Frequently, merely removing operating power from the spindle motor will have a significant effect on reducing power consumption, heat generation, and wear.

During a write cycle, which occurs very infrequently relative to read cycles, the CPU, operating system or other control means or process will restore power to the inactive drive first before it starts writing to the active one. Alternatively, some small delay may be tolerable between a write to the active drive (or active drive set) and a write to the formerly inactive drive (or inactive drive set), but this is not preferred as it leaves the system somewhat vulnerable to non-recoverable failure and raises issues of data coherency and synchronization between the active (e.g. primary) and inactive (e.g. mirror) data sets. Restoring the power to the inactive drive first will allow the inactive drive enough time to come up to speed so there will be no dead time or delay between writing of the two drives. Where feasible, write operations to the active drive may desirably be grouped so as to minimize to the extent possible the number of power-up and power-down operations as these operations may accentuate drive wear in some disc drive systems.

While some disc drive structures may suffer somewhat greater wear when they are repeatedly power on and powered off, there are also disc drives that have their useful life drastically reduced if they have to stay active continuously. More rapid wear from being powered ON and powered OFF may in some instance result from wear that the disc surface experiences from disc-to-transducer head contact during landing, and/or from spindle motor wear experienced as the spindle speed decreases and lubrication of the bearing contact surfaces diminishes. Rapid wear on other hard drive structures as a result of prolonged or continuous ON time. Whatever the reason for this more rapid wear or increase in disc drive failure, the reduction in disc drive lifetime (decrease in MTBF) has been particularly pronounced in the 2.5-inch form factor hard disc drives typically found in notebook computers and other portable computing devices. It is also likely to be a problem in 1.8-inch form factor drives however these size drives are not widely used.

Without benefit of theory, it would appear that some of the lifetime reduction of the 2.5-inch form factor drives is related to the lighter weight structures associated with high-density large disc storage capacity in a small physical package. Design tolerances are tighter, components, including components that generate heat are closer together, and the likelihood of a failure is increased. While such 2.5-inch form factor drives have heretofore been infrequently used in database and server applications, the inherently lower poser consumption of such hard disc drives designed for potable computing makes them ideal candidates for smaller, higher capacity, lower power consuming server applications.

As an added benefit, the distinction between the primary drive (or drive set) and the secondary drive (or drive set) need not be fixed. Since the RAID 1 configuration requires only one drive (or one set of drives) to be active for any given read operation, the other drive (alternate drive) can essentially be shut off completely or put into power saving mode. At a predetermined time interval or according to some other predetermined rules (such as the number of write operations), the active and inactive drive can exchange role, that is, the formerly active drive becomes the current mirrored drive and the formerly mirrored drive becomes the currently active drive. This technique will allow any one drive to be active for a maximum 50 percent of the time. Consequently, the expected life time for both drives (or drive sets) will be extended.

While the description provided heretofore has focused primarily on RAID 1 configurations, the principles also apply to RAID 10 (also referred to as RAID 0+1) as this RAID configuration provides data striping as well as mirroring of the striped data onto the mirrored drive. For a RAID 10 configuration, the data would be written in stripped fashion to the primary and mirrored drives or drive sets in normal manner, but read operations would only require participation of the currently active RAID 10 drive or drive sets.

Furthermore, where even greater redundancy is desired, any plurality of mirrored or mirrored and striped disc drives may be utilized. For example, if additional data redundancy in a mirroring type configuration was desired, then mirror copies may be provided on two (or more) mirror drives in addition to the data stored on the primary drive. Rules and procedures for powering down or placing into an energy or power conserving mode may be implemented so that one or both mirror drives are brought back to an active state to accept a write operation update. Each of the three (or more) drives may then be selected as the current active drive according to some predetermined rules or procedures. In the three disc drive example, each disc drive would at most be active for about 33 percent of the time, significantly increasing the lifetime of all the disc drives.

Finally, although the description has focused on RAID configurations, it will be understood by workers in the art that the same principle may be applied to other than RAID storage configurations where data redundancy is maintained on separate physical storage media. Furthermore, while the description has also focused on magnetic hard disc drives, the invention is not so limited, but may be applied to any storage system where redundant data is maintained on multiple storage devices. For example, the inventive system, apparatus, and method are applicable to rotatable magnetic hard disc drives, optical disc drives, CDRAM. DVDRAM drives, solid state memory devices, or any other storage device or media where there is a desire to maintain some redundancy while reducing power consumption, heat generation, component aging or wear, noise, or other negative effects.

One particular embodiment of the inventive method is now described. During an initiation procedure (such as may occur when the computer system is booted or reset), and after the two (or more) alternative disc drive sets are synchronized such that they store the identical data (in conventional RAID 1 or RAID 10 manner), one of the drives (now the active drive) is maintained in operating mode so as to service any read I/O requests, while the other drive (now the inactive drive) is placed in a power conserving mode. Power conserving mode as used here refers to any mode or state between a completely active powered on state where the drive is ready to respond to a read or write I/O request and a powered off state or more. For example a power conserving mode includes various standby modes where the spindle motor has stopped but the dive is still responsive to control signals. Various industry power management standards are applicable to controlling hard disk drives and may be adapted to control the energy consumption state of such disc drives or other mass storage devices.

The active drive responds to any read I/O request. In the event that a write I/O operation or some other operation necessitating a change in the data or control information written to the active drive occurs, the system hardware and/or software/firmware activates the formerly inactive drive or drive set to perform the write operation and maintain the two drives or drive sets as identical copies. Once the write operation is completed, one of the drives is deactivated or otherwise placed into an energy conserving mode or state. In one embodiment, the recently activated drive is deactivated after the write operation and again the active drive services read I/O requests. In an alternate embodiment, the recently activated drives stay active and the drive which prior to the write operation had been active is deactivated.

In yet another alternative embodiment, the switch from active-to-inactive or inactive-to-active is controlled by some predetermined set of procedures. For example, the rules or procedures may switch drives in accordance with the number of write operations, in accordance with the total active time to date, in accordance with a maximum continuous active time, or according to any other predetermined or adaptive rules. In a preferred embodiment, the rules are selected to approximately equalize the active or ON time of each drive or drive set while restricting the maximum continuous ON time. In this scheme, an inequality of cumulative active time is equalized over a long time. Adjustments to the maximum active time of each different drive or drive set may even be effectuated so as to more rapidly equalized the drives but without unduly burdening any drive or drive set. For example, the maximum continuous active time for a disk drive that has a greater cumulative active time may be shortened relative to the maximum active time permitted for the drive having a lower cumulative active time. These rules and times or other parameters may also be adjusted over the life of the disk drives to account for aging, remaining capacity, or other operational or physical characteristics.

Thus it will be appreciated that the embodiments of the inventive disk drive structure and method reduce the power consumption of two or more sets of disc drives or other storage devices, and extend the life cycle of such disc drive or storage devices. The invention also provides a computer system and method incorporating the power-conserving and device life-prolonging system and method described; disc drives susceptible to control in this manner; a disc drive controller for controlling the disc drives or other storage devices in the manner described; computer software and/or firmware used in conjunction with the disc drive controller and/or computer for controlling the disc drives in the manner described; as well as a server including such disc drives, controller, software and/or firmware to operate the server in response to read and write I/O requests. The invention also provides an operating system and/or applications program code to implement the inventive disc drive control features described herein.

Additional Embodiments

Having described numerous embodiments of the invention, it will be apparent to those workers having ordinary skill in the applicable arts that the invention provides a great variety of innovations. Attention is now directed to highlights of the manner in which selected aspects of the invention and innovations may be used either separately or in combination to provide particularly desirable and advantageous utility. Although these highlighted groups of innovations and particular embodiments with each group are particularly useful, the inventions and innovations described in this specification and the drawings are not limited only to the embodiments highlighted or otherwise described or identified below. Within each group of innovations, the selected embodiments are, for convenience of notation, referred to by embodiment numbers surrounded by parentheses. These numbers refer to embodiments within a particular group of innovations and are reused for the different groups of innovations.

In a first group of innovations, the invention provides various embodiments associated with System, Method, and Architecture for Dynamic Server Power Management and Dynamic Workload Management for Multi-server Environment.

(1) A computer system comprising: a plurality of server computers each having at least one processor and an activity monitor identifying a level of activity indicator for the at least one processor; each of the server computers being operable in: (i) a first mode having a first maximum performance level and a first power consumption rate. (ii) a second mode having a second maximum performance level lower than the first maximum performance level and a second power consumption rate lower than the first power consumption rate, and (iii) a third mode having a third maximum performance level lower than the second maximum performance level and a third power consumption rate lower than the second power consumption rate; and a power manager: (i) coupled to each of the server computers and receiving the level of activity information from each of the plurality of computers; (ii) analyzing the plurality of received level of activity information; (iii) determining an operating mode for each of the server computers selected from the first mode, second mode, and third mode based on the analyzed activity information and predetermined policies; and (iv) generating commands to each of the plurality of server computers directing each of the plurality of server computers to operate in the determined operating mode.

(2) A computer system comprising: a plurality of computers each having at least one processor and an activity monitor identifying a level of activity indicator for the at least one processor; each of the computers being operable in: (i) a first mode having a first maximum performance level and a first power consumption rate, and (ii) a third mode having a third maximum performance level lower than the first maximum performance level and a third power consumption rate lower than the first power consumption rate; and a power manager: (i) coupled to each of the computers and receiving the level of activity information from each of the plurality of computers; (ii) analyzing the plurality of received level of activity information; (iii) determining an operating mode for each of the computers selected from the first mode and third mode based on the analyzed activity information and predetermined policies; and (iv) generating commands to each of the plurality of computers directing each of the plurality of computers to operate in the determined operating mode.

(3) The computer system in embodiment (2), wherein: each of the computers further being operable in (iii) a second mode having a second maximum performance level intermediate between the first maximum performance level and the third maximum performance level and a second power consumption rate intermediate between the first power consumption rate and the third power consumption rate; and the power manager further determining an operating mode for each of the computers selected from the first mode, the second mode, and the third mode based on the analyzed activity information and the predetermined policies. (4) The computer system in any of embodiments (2 or 3), wherein: the computers comprise servers. (5) The computer system in any of embodiments (2, 3, or 4), further comprising a power manager computer providing the power manager. (6) The computer system in any of embodiments (2, 3, or 4) wherein a selected one of the plurality of computers designated as a master providing the power manager. (7) The computer system in any of embodiments (2 or 3), wherein the activity monitor comprises an activity monitor that monitors an activity selected from the set of activities consisting of: a program application layer activity, a network layer activity, a physical layer activity, and combinations thereof. (8) A system as in embodiment (7), wherein at the physical level the number of processor idle threads executed within a predetermined period of time are measured to determine processor loading and the processor performance is adjusted to by altering the operating mode to substantially match the level of processor loading. (9) The computer system in embodiment (2), wherein the activity monitor comprises a network layer activity monitoring TCP/IP protocol data packets; and processor performance is incrementally lowered by the power manager using the mode control until data packets start dropping indicating that the processor performance is at the limit of adequacy and then increasing the processor performance by a specified increment to act as a safety margin to provide reliable communication of the packets. (10) The computer system in embodiment (7), wherein the application layer activity monitor comprises monitoring use of a port address within the computers, the monitoring including counting or measuring a number of times a specific port address is being requested within a predetermined period of time, and in response to that counting or measurement, placing a sufficient amount of computer performance to meet the performance requirement for each application requesting the port address. (11) The computer system in embodiment (7), wherein the application layer activity monitor comprises monitoring use of a port address within the computers. (12) The computer system in embodiment (7), wherein the network layer activity monitor comprises monitoring use of a TCP/IP protocol within the computers. (13) The computer system in embodiment (7), wherein the physical layer activity monitor comprises monitoring the execution of idle threads within the computers. (14) The computer system in embodiment (7), wherein the physical layer activity monitor comprises monitoring counting activities having particular activity values within the computers. (15) The computer system in embodiment (3), wherein: the first mode operation is characterized by operating the processor at a first processor clock frequency and a first processor core voltage, the second mode operation is characterized by operating the processor at a second processor clock frequency and a second processor core voltage, and the third mode operation is characterized by operating the processor at a third processor clock frequency and a third processor core voltage; the second mode of operation being further characterized in that the second processor clock frequency and the second processor core voltage in combination consuming less power than the first processor clock frequency and the first processor core voltage in combination, and the third processor clock frequency and the third processor core voltage in combination consuming less power than the second processor clock frequency and the second processor core voltage in combination. (16) A system as in embodiment (15), wherein performance of a group of the computers configured as physical network devices forming a single logical device are power managed by reducing the performance and power consumption of each constituent physical device in predetermined equal increments or predetermined unequal increments. (17) A system as in embodiment (15), wherein network device loading and quality of service (QoS) are measured for a plurality of physical network devices organized as a single logical network device. (18) The computer system in embodiment (15), wherein the third processor clock frequency is less than the second processor clock frequency which is less than the first processor clock frequency. (19) The computer system in embodiment (18), wherein the second processor core voltage is less than the first processor core voltage. (20) The computer system in embodiment (19), wherein the third processor core voltage is less than the second processor core voltage. (21) The computer system in embodiment (15), wherein the third processor clock frequency is less than the second processor clock frequency which is less than the first processor clock frequency; and the second processor core voltage is less than the first processor core voltage. (22) The computer system in embodiment (2), wherein: each of the computers further being operable in (iii) a second mode having a second maximum performance level intermediate between the first maximum performance level and the third maximum performance level and a second power consumption rate intermediate between the first power consumption rate and the third power consumption rate; and each the computer including a local power manager determining an operating mode for itself selected from the first mode and the second mode based on processor internal activity information. (23) The computer system in embodiment (22), wherein the processor internal activity information comprising idle thread execution information. (24) The computer system in embodiment (22), wherein a transition from the first mode to the second mode is controlled locally within each the computer; and a transition from either the first mode or the second mode to the third mode are controlled globally by the power manager. (25) The computer system in embodiment (24), wherein a transition from the second mode to the first mode is controlled locally within each the computer; and a transition from the third mode to either the first mode or the second mode is controlled globally by the power manager. (26) The computer system in embodiment (15), wherein the third processor clock frequency is substantially zero or the third processor clock is turned off. (27) The computer system in embodiment (15), wherein the commands are generated and directed to the computers only when required to change an operating mode of the computers. (28) The computer system in any of embodiments (2 or 3), wherein the third mode is characterized by maintaining a processor core voltage to maintain processor state.

(29) A computer system comprising: a plurality of computers each having at least one processor and an activity monitor identifying a level of activity indicator for the at least one processor; each of the computers being operable in: (i) a first mode having a first maximum performance level and a first power consumption rate, and (ii) a third mode having a third maximum performance level lower than the first maximum performance level and a third power consumption rate lower than the first power consumption rate; and a power manager: (i) coupled to each of the computers and receiving the level of activity information from each of the plurality of computers; (ii) analyzing the plurality of received level of activity information; (iii) determining an operating mode for each of the computers selected from the first mode and third mode based on the analyzed activity information and predetermined policies; and (iv) generating commands to each of the plurality of computers directing each of the plurality of computers to operate in the determined operating mode; each of the computers further being operable in (iii) a second mode having a second maximum performance level intermediate between the first maximum performance level and the third maximum performance level and a second power consumption rate intermediate between the first power consumption rate and the third power consumption rate; each the computer including a local power manager determining an operating mode for itself selected from the first mode and the second mode based on processor internal activity information; a transition from the first mode to the second mode is controlled locally within each the computer, and a transition from either the first mode or the second mode to the third mode are controlled globally by the power manager; and a transition from the second mode to the first mode is controlled locally within each the computer, and a transition from the third mode to either the first mode or the second mode is controlled globally by the power manager.

(30) A computer system comprising: a plurality of server computers each having at least one processor and an activity monitor identifying a level of activity for the at least one processor, the activity monitor comprising an activity monitor that monitors an activity selected from the set of activities consisting of: a program application layer activity, a network layer activity, a physical layer activity, and combinations thereof; each of the server computers being operable in: (i) a first mode having a first maximum performance level and a first power consumption rate, (ii) a second mode having a second maximum performance level lower than the first maximum performance level and a second power consumption rate lower than the first power consumption rate, and (iii) a third mode having a third maximum performance level lower than the second maximum performance level and a third power consumption rate lower than the second power consumption rate; and a power manager operative in a separate power manager computer: (i) coupled to each of the server computers and receiving the level of activity information from each of the plurality of computers; (ii) analyzing the plurality of received level of activity information; (iii) determining an operating mode for each of the server computers selected from the first mode, second mode, and third mode based on the analyzed activity information; and (iv) generating commands to each of the plurality of server computers directing each of the plurality of server computers to operate in the determined operating mode; the first mode operation is characterized by operating the processor at a first processor clock frequency and a first processor core voltage, the second mode operation is characterized by operating the processor at a second processor clock frequency and a second processor core voltage, and the third mode operation is characterized by operating the processor at a third processor clock frequency and a third processor core voltage; the second mode of operation being further characterized in that the second processor clock frequency is lower than the first processor clock frequency and the second processor core voltage is equal to or less than the first processor core voltage so that in combination consuming less power than in the first mode, and the third processor clock frequency is lower than the second processor clock frequency and the third processor core voltage is no greater than the second processor core voltage so that in combination consuming less power than in the second mode; and a transition from the first mode to the second mode is controlled locally within each the computer; and a transition from either the first mode or the second mode to the third mode are controlled globally by the power manager.

(31) A method of operating computer system having a plurality of server computers, each server computer including at least one processor, and each computer being operable in a first mode having a first maximum performance level and a first power consumption rate, and a third mode having a third maximum performance level lower than the first maximum performance level and a third power consumption rate lower than the first power consumption rate; the method comprising: monitoring activity within the computers and identifying a level of activity for the at least one processor within the computers; analyzing the plurality of level of activity information; determining an operating mode for each of the computers selected from the first mode and third mode based on the analyzed activity information; and generating commands to each of the plurality of computers directing each of the plurality of computers to operate in the determined operating mode.

(32) The method in embodiment (31), wherein each of the computers further being operable in a second mode having a second maximum performance level intermediate between the first maximum performance level and the third maximum performance level and a second power consumption rate intermediate between the first power consumption rate and the third power consumption rate; and the determining an operating mode further comprising determining an operating mode for each of the computers selected from the first mode, the second mode, and the third mode based on the analyzed activity information. (33) The method of embodiment (32), wherein a transition from the first mode to the second mode is controlled locally within each the computer; and a transition from either the first mode or the second mode to the third mode are controlled globally by the power manager. (34) The method of embodiment (33), wherein a transition from the second mode to the first mode is controlled locally within each the computer; and a transition from the third mode to either the first mode or the second mode is controlled globally by the power manager. (35) A system as in embodiment (15), wherein at least one of a processor clock frequency and a processor operating voltage is reduced in response to the indicator to thereby reduce power consumed by the processor and by the server computer. (36) A system as in embodiment (15), wherein the processor clock frequency is reduced in response to the indicator to thereby reduce power consumed by the processor and by the server. (37) A system as in embodiment (15), wherein the indicator comprises a measured decrease in server load. (38) A system as in embodiment (15), wherein the indicator comprises a predicted decrease in server load. (39) A system as in embodiment (15), wherein the indicator comprises a measured decrease in processor tasking. (40) A system as in embodiment (15), wherein the indicator comprises a predicted decrease in processor tasking. (41) A system as in embodiment (15), wherein the indicator comprises a measured decrease in communication channel bandwidth. (42) A system as in embodiment (15), wherein the indicator comprises predicted decrease in communication channel bandwidth. (43) A system as in embodiment (32), wherein the predicted decrease in server load is a prediction based at least in part on time of day. (44) A system as in embodiment (32), wherein the predicted decrease in server load is a prediction based at least in part on a quality of service requirement. (45) A system as in embodiment (32), wherein the predicted decrease in processor tasking is a prediction based at least in part on time of day. (46) A system as in embodiment (32), wherein the predicted decrease in processor tasking is a prediction based at least in part type of content to be processed. (47) A system as in embodiment (32), wherein the predicted decrease in server loading is a prediction based at least in part type of content to be served. (48) A system as in embodiment (32), wherein the manner of the prediction is further based on the content served by the server. (49) A system as in embodiment (15), wherein the majority of content served by the server computer comprises web pages. (50) A system as in embodiment (15), wherein the majority of content served by the server computer comprises streaming video. (51) A system as in embodiment (15), wherein the majority of content served by the server computer comprises multi-media content. (52) A system as in embodiment (15), wherein the majority of content served by the server comprises cached data. (53) A system as in embodiment (15), wherein a processor operating voltage is reduced in response to the indicator to thereby reduce power consumed by the processor and by the server. (54) A system as in embodiment (15), wherein a predetermined combination of processor core voltage and processor frequency are selected based on predetermined rules to satisfy a processor load requirement. (55) A system as in embodiment (46), wherein the predetermined rules for selecting the predetermined combination of processor core voltage and processor frequency comprise a look-up-table (LUT) identifying processor frequency and processor core voltage with processor load handling capability. (56) A system as in embodiment (15), wherein each processor has a processor load handling capability measured in instructions per second. (57) A system as in embodiment (15), wherein each processor has a processor load handling capability is measured in bits served per second. (58) A system as in embodiment (15), wherein each processor has a processor load handling capability is measured in transactions per unit time. (59) A system as in embodiment (15), wherein each processor has a processor load handling capability is measured in transactions per second. (60) A system as in embodiment (15), wherein the predetermined rules are different for different network device types. (61) A system as in embodiment (3), wherein the predetermined policies include policies for identifying a non-linear relationship between processor performance and power consumption. (62) A system as in embodiment (3), wherein power (P) consumed by a circuit in the processor is proportional to a capacitance (C) times the product of the switching frequency of the circuit (f) and the square of the circuit operating voltage ($v^2$) or $P=Cfv^2$. (63) A system as in embodiment (52), wherein switching frequency is substantially linear relative to power consumption, the load is non-linear relative to circuit performance, and the load is non-linear relative to power consumed by the circuit. (64) A system as in embodiment (53), wherein the circuit comprises a processor and random access memory. (65) A system as in embodiment (3), wherein the predetermined policy includes a policy for identifying a substantially linear relationship between processor performance and power consumption. (66) A system as in embodiment (3), wherein the processor provides processing for a web server and the web server has a substantially linear relationship between web page server loading an power consumed in serving the web pages. (67) A system as in embodiment (3), wherein a quality-of-service (QoS) is first established, and a processor performance is established based on predetermined policies that select a processor clock frequency, and a minimum processor core voltage is selected to match the selected processor clock frequency; and wherein the established processor performance is used to control an operating mode. (68) A system as in embodiment (15), further including a processor core voltage control circuit receiving voltage control signals and increasing or decreasing the processor core voltage in response to the receipt. (69) A system as in embodiment (58), wherein the processor core voltage control circuit provides a direct-current voltage to a Vcc supply terminal of the processor. (70) A system as in embodiment (15), wherein the activity level indicator includes an indicator of the number of idle threads executed in the processor, and reduction of processor power consumption is initiated based on detection of the execution of an idle thread by the processor. (71) A system as in embodiment (60), wherein upon detection of execution of the idle thread, the processor frequency is reduced as compared to a maximum processor clock frequency. (72) A system as in embodiment (61), wherein the processor frequency reduction is a reduction by a factor of a power of two. (73) A system as in embodiment (61), wherein the processor clock frequency is reduced to zero. (74) A system as in embodiment (61), wherein the processor frequency is reduced to an integral multiple of a maximum processor clock frequency. (75) A system as in embodiment (60), wherein upon detection of execution of the idle thread, the processor frequency is reduced as compared to a maximum processor clock frequency and the processor core voltage is reduced as compared to a maximum processor core voltage. (76) A system as in embodiment (60), wherein the detection of execution of an idle thread initiated power reduction provides a real time adjustment to power consumption based on measured processor load requirements. (77) A system as in embodiment (57), wherein the QoS initiated power reduction provides a preset adjustment to power consumption based on predicted processor load requirements. (78) A system as in embodiment (57), wherein the QoS requirement is adjusted on at least one of a time-of-day criteria, a day-of-week criteria, a seasonal criteria, and combinations thereof. (79) A system as in embodiment (57), wherein the QoS requirement is adjusted based on criteria selected from the set consisting of: time-of-day, dayof-month, day-of week, month-of year, geographic location of requester, requester identity, requester account number, and combinations thereof. (80) The computer system in embodiment (3), wherein the activity indicator comprises a network quality of service indicator. (81) A system as in embodiment (3), wherein power is conserved by controlling each computer node to enter one of the second mode or the third mode using one or more of a quality of service based predictive processor performance reduction and a activity based measured performance requirement. (82) A system as in embodiment (3), wherein when there is a requirement that one computer be placed in a lower power consumption mode, the computer selected for such lower power consumption is selected according to predetermined rules such that different computers are placed in lower power consumption mode each time such selection is required. (83) A system as in embodiment (3), wherein a computer placed in mode 3 is in a suspend state and may be woken up and placed in the first mode or the second mode by any one of a plurality of events including by a wake on LAN signal event. (84) A system as in embodiment (3), wherein the transition from one power consumption mode to another power consumption mode is based on a procedure implemented in software. (85) A system as in embodiment (3), wherein the transition from one power consumption mode to another power consumption mode is based on a procedure implemented in hardware and software. (86) A system as in embodiment (3), wherein when there is need to operate fewer than all the computer, the particular computer or logical group of computers that is (are) turned off or placed in a reduced power consumption mode is cycled so that over time all of the network devices experience similar operating time histories. (87) A system as in embodiment (3), wherein at least some of the computers include a mass storage device including a rotatable storage device. (88) A system as in embodiment (3), wherein the computers are configured as network server devices and a network load versus allocated network device performance profile is provided for each different type of network server device, and the performance level set for operation of the network device is established by reference to the profile. (89) A system as in embodiment (3), wherein at least one of the computers comprises a network server device and the activity monitoring for the network server device comprises a monitoring or either the network device load or the network device quality of service (QoS); and wherein the monitoring is performed by the activity monitor or by a separate management computer, or both. (90) A system as in embodiment (3), wherein the system includes at least one temperature sensor within an enclosure holding the computers for monitoring and reporting the temperature proximate the sensor to a computers configured to monitor the temperature. (91) A system as in embodiment (3), wherein the system includes a plurality of temperature sensors within the enclosure reporting to one or more network devices. (92) A system as in embodiment (3), wherein a plurality of cooling fans are provided and operate under control of the power manager that controls each fan to provide cooling at the rate and location desired to maintain the computers within a predetermined temperature range. (93) A system as in embodiment (3), wherein the plurality of computers are disposed within a common enclosure and the system further comprising a plurality of temperature sensors and a plurality of cooling devices are also disposed within the enclosure, the plurality of temperature sensors communicating a temperature signal to a temperature control means and the control means adjusting the on/off status and operational parameters of the cooling units to extract heat according to predetermined rules. (94) A system as in embodiment (2), wherein the system further includes a plurality of power supplies and the power supplies are controlled to maintain a required power output level and operate the power supplies at a preferred efficiency.

(95) A system as in embodiment (3), wherein the temperature of the system is moderated by motor driven cooling fans and wherein a rotational speed of the motor drive cooling is adjusted to maintain a predetermined temperature range proximate a temperature sensor. (96) A system as in embodiment (3), wherein the rotational speed of a motor drive cooling is adjusted to maintain a predetermined temperature range within an enclosure. (97) A system as in embodiment (15), wherein the activity level indicator includes an indicator of the number of idle threads executed in the processor. (98) A system as in embodiment (60), wherein upon detection of execution of the idle thread, the processor clock frequency is adjusted in real time so that the capability of the processor is substantially matched to the required processing capability. (99) A system as in embodiment (101), wherein the processor clock frequency is adjusted so that no idle threads, a predetermined number of idle threads, or a predetermined occurrence frequency of idle threads result.

(100) A system as in embodiment (57), wherein the QoS requirement is adjusted based on criteria selected from the set consisting of: time-of-day, day-of-month, day-of week, month-of year, geographic location of requester, requester identity, requester account number, and combinations thereof. (101) A system as in embodiment (3), wherein when the system includes a plurality of network devices and there is a requirement that one network device be placed in a lower power consumption mode, the network device selected for such lower power consumption is selected according to predetermined policies such that different network devices are placed in lower power consumption mode each time such selection is required. (102) A system as in embodiment (101), wherein the predetermined policies provide for random selection of one of the network devices. (103) A system as in embodiment (101), wherein the predetermined policies provide for cycling through the network devices according to some predetermined ordering. (104) A system as in embodiment (101), wherein the predetermined policies provide for cycling through the network devices according to some predetermined ordering in which network devices having the lowest time in service are preferentially selected for continued operation and network devices having the longest time in service are selected for reduced power operation. (105) A system as in embodiment (101), wherein the reduced power operation includes being powered off. (106) A system as in embodiment (101), wherein the reduced power operation includes being placed in a suspend mode. (107) A system as in embodiment (101), wherein the reduced power operation is determined according to a procedure for controlling power consumption by the system, the system having a plurality of computers operating as the network devices, each computer including at least one processor, and each computer being operable in a first mode having a first maximum performance level and a first power consumption rate, and a third mode having a third maximum performance level lower than the first maximum performance level and a third power consumption rate lower than the first power consumption rate; the procedure comprising: monitoring activity within the computers and identifying a level of activity for the at least one processor within the computers; analyzing the plurality of level of activity information; determining an operating mode for each of the computers selected from the first mode and third mode based on the analyzed activity information; and generating commands to each of the plurality of computers directing each of the plurality of computers to operate in the determined operating mode. (108) The system in embodiment (107), wherein each of the computers further being operable in a second mode having a second maximum performance level intermediate between the first maximum performance level and the third maximum performance level and a second power consumption rate intermediate between the first power consumption rate and the third power consumption rate; and the determining an operating mode further comprising determining an operating mode for each of the computers selected from the first mode, the second mode, and the third mode based on the analyzed activity information. (109) The system of embodiment (108), wherein a transition from the first mode to the second mode is controlled locally within each the computer; and a transition from either the first mode or the second mode to the third mode are controlled globally by the power manager. (110) The system of embodiment (109), wherein a transition from the second mode to the first mode is controlled locally within each the computer; and a transition from the third mode to either the first mode or the second mode is controlled globally by the power manager.

(111) In a server farm comprising a multiplicity of computer systems operating as content servers, a method of operating the servers, each server computer including at least one processor, and each computer being operable in a first mode having a first maximum performance level and a first power consumption rate, and a third mode having a third maximum performance level lower than the first maximum performance level and a third power consumption rate lower than the first power consumption rate; the method comprising: monitoring activity within each the computer server and identifying a level of activity for the at least one processor within the server computer; analyzing the plurality of level of activity information; determining an operating mode for each of the computers selected from the first mode and third mode based on the analyzed activity information; and generating commands to each of the multiplicity of server computers directing each of the plurality of computers to operate in the determined operating mode.

In a second group of innovations, the invention provides various embodiments associated with System and Method for Activity or Event Based Dynamic Energy Conserving Server Reconfiguration.

(1) An information processing system comprising: a frame or enclosure for mounting a plurality of devices; a backplane having a plurality of backplane electrical connectors disposed within the frame or enclosure; and a plurality of devices, each including a device electrical connector, matingly coupled to the backplane electrical connectors, the plurality of devices including at least one network device for coupling the system with an external network.

(2) A system as in embodiment (1), wherein the at least one network device comprises a device selected from the set of network devices consisting of a server device, a computer node device, a monitor node device, a management module, a server module, and combinations thereof. (3) A system as in embodiment (2), wherein the at least one network device includes a processor and a memory integral with or coupled to the processor. (4) A system as in embodiment (3), further comprising a network switch or network switching device. (5) A system as in embodiment (4), wherein the plurality of devices further comprises a device selected from the set of devices consisting of a power supply, a fan or fan module, and combinations thereof. (6) A system as in embodiment (1), wherein the at least one network device comprises at least one server computer having at least one processor and a power manager. (7) A system as in embodiment (6), wherein the power manager is integral with the server computer. (8) A system as in embodiment (6), wherein the power manager is separate from the server computer. (9) A system as in embodiment (6), wherein the or each server computer further comprises an activity monitor identifying a level of activity indicator for the at least one processor; and the or each server computer being operable in: (i) a first mode having a first maximum performance level and a first power consumption rate, and (ii) a third mode having a third maximum performance level lower than the first maximum performance level and a third power consumption rate lower than the first power consumption rate; and the system further comprising: a power manager: (i) coupled to each of the computers and receiving the level of activity information from each of the plurality of computers; (ii) analyzing the plurality of received level of activity information; (iii) determining an operating mode for each of the computers selected from the first mode and third mode based on the analyzed activity information and predetermined policies; and (iv) generating commands to each of the plurality of computers directing each of the plurality of computers to operate in the determined operating mode. (10) A system as in embodiment (9), wherein: the or each server computer further being operable in: (iii) a second mode having a second maximum performance level intermediate between the first maximum performance level and the third maximum performance level and a second power consumption rate intermediate between the first power consumption rate and the third power consumption rate; and the power manager further determining an operating mode for each of the computers selected from the first mode, the second mode, and the third mode based on the analyzed activity information and the predetermined policies. (11) A system as in embodiment (1), wherein the system further comprises a power manager. (12) A system as in embodiment (10), wherein the system further comprises a switching module, and the power manager receives activity indicators for the switching module and controls an operating mode of the switching module in response thereto. (13) A system as in embodiment (10), wherein the computer comprises a server module that is power managed by adjusting processor performance to one or more of a predicted processor processing requirement and a measured processor processing requirement. (14) A system as in embodiment (13), wherein the predicted processor processing requirement is a Quality of Service (QoS) based requirement, and the measured processor processing requirement comprises a substantially real-time measured processor processing requirement. (15) A system as in embodiment (14), wherein the substantially real-time processor processing requirement comprises an idle thread execution detection and response thereto. (16) A system as in embodiment (10), wherein power (or energy) is conserved by controlling the computer based on a control procedure algorithm to enter a first level of power (energy) saving by adjusting the performance of the processor within the computer to substantially match the computer processor loading demand. (17) A system as in embodiment (10), wherein power (or energy) is conserved by controlling the plurality of computers in aggregate based on a control procedure algorithm and the policy to enter selected levels of power (energy) saving by adjusting the performance of the processors within the computers to one of the first mode, second mode, and third mode to substantially match the aggregate computer processor loading demands. (18) A system as in embodiment (10), wherein the power manager includes a control procedure algorithm implemented as software to implement a power on demand control procedure. (19) A system as in embodiment (10), wherein each computer is configurable as a particular type of network device. (20) A system as in embodiment (10), wherein the computer is configured as a network device selected from the set consisting of a web server, a streaming media server, a cache server, a file server, an application server, and a router. (21) A system as in embodiment (10), wherein at least selected ones of the computers are configurable as a combination type of network device, and wherein the network device configured in the computer node is a network device selected from the set consisting of a web server, a streaming media server, a cache server, a file server, an application server, a router, and combinations thereof. (22) A system as in embodiment (21), wherein the network device is reconfigurable at any time based on types of activities detected within the network to which the network device is or may be connected. (23) A system as in embodiment (10), wherein at least one of the computers comprises a network device and the activity monitor for the network device comprises a network activity monitor that detects the types of activities present on a network to which the activity monitor is coupled. (24) A system as in embodiment (23), wherein the types of activities present on a network to which the activity monitor is coupled that are monitored by the activity monitor include volume of web pages served, volume of streaming media served, volume of files served, volume of applications served, volume of cached data served, amount of network traffic routed, and combinations thereof. (25) A system as in embodiment (22), wherein the reconfiguration of network device is initiated by any network device including the same network as is being reconfigured. (26) A system in embodiment (4) wherein a selected one of the plurality of computers designated as a master providing the power manager. (27) A system as in embodiment (10), wherein a selected one of the plurality of computers is designated as a master providing the power manager, and reconfiguration of a network device from one form of network device to another form of network device is initiated by any computer that has been designated as a master computer. (28) A system as in embodiment (27), wherein any computer may be designated as the master node. (29) A system as in embodiment (28), wherein a particular computer is designated as a master on the basis of its position within a chassis. (30) A system as in embodiment (28), wherein a particular computer node is designated as a master node on the basis of the order of power-up or boot completion. (31) A system as in embodiment (28), wherein reconfiguration of the computer comprises altering the software and/or firmware instructing the computer. (32) A system as in embodiment (28), wherein reconfiguration of the computer comprises altering the data organization of a data storage device integral with or coupled to the computer. (33) A system as in embodiment (28), wherein the data storage device comprises a hard disc drive based RAID storage array and altering the data organization comprises altering rad configuration of the data to provide better performance for the type of data being served. (34) A system as in embodiment (22), wherein the reconfiguration of a computer is initiated by a management module network device. (35) A system as in embodiment (10), wherein a plurality of computers of the same type are grouped together and treated as a single network device. (36) A system as in embodiment (35), wherein the group of network devices treated as a single network device is managed and controlled as a single network device. (37) A system as in embodiment (35), wherein the group of network devices treated as a single network device is power managed as a single network device. (38) A system as in embodiment (35), wherein the group of network devices treated as a single network device is monitored as a single network device. (39) A system as in embodiment (35), wherein the plurality of grouped network devices are electrically coupled via a backplane bus and the logical grouping of the plurality of network devices into a single logical network device is performed under control of software. (40) A system as in embodiment (39), wherein the software executes within a processor and memory associated within each network device. (41) A system as in embodiment (35), wherein the plurality of network devices each comprise a server group. (42) A system as in embodiment (35), wherein the plurality of network devices each comprise a computer server module. (43) A system as in embodiment (42), wherein each computer server module is configured as a computer server module selected from the group consisting of a web server, a streaming media server, a cache server, a file server, an application server, a router, and combinations thereof. (44) A system as in embodiment (39), wherein the activity associated with each computer within a grouped logical network device may be monitored individually. (45) A system as in embodiment (39), wherein the network activity associated with all or any subset of physical network device within a grouped logical network device may be monitored as a composite or in aggregate: (46) A system as in embodiment (35), wherein grouping is accomplished by aggregating all of the activity in each computer and directing each computer in the logical group to operate at the same operating mode. (47) A system as in embodiment (10), wherein over a period of time the system will have sufficient over capacity that some of the computers will be directed to operate in the third mode, the policy taking into account the amount each of the computers have historically spent operating in at least one of the first, second, or third mode and selecting a computer to operate in the third mode based on historical data. (48) A system as in embodiment (47), wherein the computer selected to operate in the third mode is a computer that has the smallest cumulative duration operating in the third mode amongst the plurality of computers. (49) A system as in embodiment (47), wherein the computer selected to operate in the third mode is randomly selected from amongst the plurality of computers. (50) A system as in embodiment (47), wherein the computer selected to operate in the third mode is rotated sequentially amongst the plurality of computers. (51) A system as in embodiment (10), wherein the activity monitor comprises an activity monitor that monitors an activity selected from the set of activities consisting of: a program application layer activity, a network layer activity, a physical layer activity, and combinations thereof. (52) A system as in embodiment (51), wherein at the physical level the number of processor idle threads executed within a predetermined period of time are measured to determine processor loading and the processor performance is adjusted to by altering the operating mode to substantially match the level of processor loading. (53) A system as in embodiment (52), wherein the substantial matching of processor performance to processor loading is performed with a predetermined amount of additional processor performance beyond that needed to match the processor loading. (54) A system as in embodiment (53), wherein the predetermined amount of additional processor performance is between about one-percent and about five-percent additional performance. (55) The computer system in embodiment (10), wherein: the first mode operation is characterized by operating the processor at a first processor clock frequency and a first processor core voltage, the second mode operation is characterized by operating the processor at a second processor clock frequency and a second processor core voltage, and the third mode operation is characterized by operating the processor at a third processor clock frequency and a third processor core voltage; the second mode of operation being further characterized in that the second processor clock frequency and the second processor core voltage in combination consuming less power than the first processor clock frequency and the first processor core voltage in combination, and the third processor clock frequency and the third processor core voltage in combination consuming less power than the second processor clock frequency and the second processor core voltage in combination. (56) A system as in embodiment (55), wherein performance of a group of the computers configured as physical network devices forming a single logical device are power managed by reducing the performance and power consumption of each constituent physical device in predetermined equal increments or predetermined unequal increments. (57) A system as in embodiment (56), wherein the unequal increments include placing one or more of the plurality of physical devices in the third mode operating mode. (58) A system as in embodiment (56), wherein the unequal increments include placing one or more of the plurality of physical devices in the second mode operating mode. (59) A system as in embodiment (56), wherein the unequal increments include placing one or more of the plurality of physical devices in a powered-off fourth mode. (60) A system as in embodiment (56), wherein a composite performance of a logical network device is achieved by placing some physical network devices in the second mode and by placing others in a different mode. (61) The computer system in embodiment (8), wherein the activity monitor comprises a network layer activity monitoring TCP/IP protocol data packets; and processor performance is incrementally lowered by the power manager using the mode control until data packets start dropping indicating that the processor performance is at the limit of adequacy and then increasing the processor performance by a specified increment to act as a safety margin to provide reliable communication of the packets. (62) A system as in embodiment (61), wherein the specified increment is a one-percent to five percent increment. (63) A system as in embodiment (61), wherein the specified increment is a 0.1 percent to 10 percent increment. (64) The computer system in embodiment (9), wherein the activity monitor comprises an activity monitor that monitors an activity selected from the set of activities consisting of: a program application layer activity, a network layer activity, a physical layer activity, and combinations thereof. (65) The computer system in embodiment (64), wherein the application layer activity monitor comprises monitoring use of a port address within the computers, the monitoring including counting or measuring a number of times a specific port address is being requested within a predetermined period of time, and in response to that counting or measurement, placing a sufficient amount of computer performance to meet the performance requirement for each application requesting the port address. (66) A system as in embodiment (65), wherein the sufficient amount of network performance is provided by operating selected computer in a first predetermined performance having a predetermined power consumption and a second group of other selected physical network devices at a reduced second performance level having a power consumption lower than that of the first selected group. (67) A system as in embodiment (66), wherein the first predetermined performance is a maximum performance and the second predetermined performance is a second level power saving mode. (68) A system as in embodiment (66), wherein the first predetermined performance is a maximum performance and the second predetermined performance is a third level power saving mode. (69) A system as in embodiment (65), wherein the measurement is determined via a SNMP agent. (70) A system as in embodiment (9), wherein the power manager applies different policies for different application types including using different rules to determine and predict system performance requirements. (71) A system as in embodiment (70), wherein the different application types comprise different server types. (72) A system as in embodiment (70), wherein the different rules comprise different measurement procedures. (73) A system as in embodiment (70), wherein the system performance requirements comprise processor performance requirements. (74) A system as in embodiment (70), wherein the system performance requirements comprise server loading performance requirements. (75) A system as in embodiment (70), wherein the application type comprises a network application. (76) A system as in embodiment (75), wherein the network application comprises a network file server (NFS) application. (77) The system in embodiment (76), wherein the computer comprises a network server, and a processor within the computer operates at a processor clock frequency just sufficient to maintain maximum rated communication over a predetermined network connection. (78) The system in embodiment (77), wherein the a predetermined network connection comprises a 100 Mbps ethernet connection. (79) A system as in embodiment (77), wherein the processor clock frequency is less than about 300 MHz. (80) A system as in embodiment (75), wherein the processor clock frequency is less than about 300 MHz. (81) The computer system in embodiment (10), wherein the activity indicator comprises a network quality of service indicator. (82) A system as in embodiment (10), wherein power is conserved by controlling each computer node to enter one of the second mode or the third mode using one or more of a quality of service based predictive processor performance reduction and a activity based measured performance requirement. (83) A system as in embodiment (82), wherein the activity based measured performance comprises an idle thread execution based activity measure. (84) A system as in embodiment (81), wherein a plurality of the computers are organized as a single logical network device, and network device loading and QoS are measured for logical network device. (85) A system as in embodiment (81), wherein within the single logical network device, at least some computers making up the logical network device enter the third mode while other of the physical network devices operate in one or more of the first and second modes. (86) A system as in embodiment (81), wherein the computers can enter a third mode directly or indirectly from either the first mode or the second mode. (87) A system as in embodiment (10), wherein when there is a requirement that one computer be placed in a lower power consumption mode, the computer selected for such lower power consumption is selected according to predetermined rules such that different computers are placed in lower power consumption mode each time such selection is required. (88) A system as in embodiment (87), wherein the predetermined rules provide for random selection of one of the computers. (89) A system as in embodiment (87), wherein the predetermined rules provide for cycling through the computers according to some predetermined ordering. (90) A system as in embodiment (89), wherein the predetermined rules provide for cycling through the computers according to some predetermined ordering in which computers having the lowest time in service are preferentially selected for continued operation and network devices having the longest time in service are selected for reduced power operation. (91) A system as in embodiment (90), wherein the reduced power operation includes being powered off. (92) A system as in embodiment (90), wherein the reduced power operation includes being placed in a suspend mode. (93) A system as in embodiment (10), wherein a computer placed in mode 3 is in a suspend state and may be woken up and placed in the first mode or the second mode by any one of a plurality of events including by a wake on LAN signal event. (94) A system as in embodiment (10), wherein the transition from one power consumption mode to another power consumption mode is based on a procedure implemented in software. (95) A system as in embodiment (10), wherein the transition from one power consumption mode to another power consumption mode is based on a procedure implemented in hardware and software. (96) A system as in embodiment (10), wherein when there is need to operate fewer than all the computer, the particular computer or logical group of computers that is (are) turned off or placed in a reduced power consumption mode is cycled so that over time all of the network devices experience similar operating time histories. (97) A system as in embodiment (96), wherein the computers include a non-volatile memory for storing operational history. (98) A system as in embodiment (97), wherein the operational history includes a total operating time indicator. (99) A system as in embodiment (97), wherein the operational history includes a time in service indicator. (100) A system as in embodiment (97), wherein the operational history includes indicators for operational time at each operational mode. (101) A system as in embodiment (10), wherein at least some of the computers include a mass storage device including a rotatable storage device. (102) A system as in embodiment (101), wherein the rotatable mass storage device comprises a rotatable magnetic hard disk drive. (103) A system as in embodiment (101), wherein the rotatable mass storage device comprises a rotatable optical disk drive. (104) A system as in embodiment (101), wherein the rotatable mass storage device comprises a rotatable magneto-optical disk drive. (105) A system as in embodiment (101), wherein the rotatable mass storage device is power managed by controlling the rotation of a motor rotating the rotatable device, wherein the disc drive is not rotated when a computer associated with the drive is in a mode 3 operating condition. (106) A system as in embodiment (10), wherein the computers are configured as network server devices and a network load versus allocated network device performance profile is provided for each different type of network server device, and the performance level set for operation of the network device is established by reference to the profile. (107) A system as in embodiment (106), wherein the profile is implemented as an analytical expression executed in software or firmware. (108) A system as in embodiment (106), wherein the profile is implemented as a piecewise linear expression executed in software or firmware. (109) A system as in embodiment (106), wherein the profile is implemented as a look-up-table stored in a memory. (110) A system as in embodiment (10), wherein at least one of the computers comprises a network server device and the activity monitoring for the network server device comprises a monitoring or either the network device load or the network device quality of service (QoS); and wherein the monitoring is performed by the activity monitor or by a separate management computer, or both. (111) A system as in embodiment (10), wherein the system includes at least one temperature sensor within an enclosure holding the computers for monitoring and reporting the temperature proximate the sensor to a computers configured to monitor the temperature. (112) A system as in embodiment (10), wherein the system includes a plurality of temperature sensors within the enclosure reporting to one or more network devices. (113) A system as in embodiment (112), wherein the plurality of temperature sensors are spatially distributed to provide temperature monitoring of different network devices within the enclosure. (114) A system as in embodiment (112), wherein the plurality of temperature sensors are spatially distributed to provide temperature monitoring of different network devices and power supplies within the enclosure.

(115) A system as in embodiment (111), wherein when the temperature sensed by a temperature sensor is within a predetermined magnitude relationship of a first predetermined value at least one computer is transitioned to a lower power consumption state. (116) A system as in embodiment (115), wherein when the temperature sensed by a temperature sensor is within a predetermined magnitude relationship of a second predetermined value at least one computer is transitioned to a powered off state. (117) A system as in embodiment (111), wherein the operational mode of at least one computer is reduced to a lower power consuming and heat dissipating state in response to a temperature sensor reporting a temperature greater than or equal to a predetermined value. (118) A system as in embodiment (111), wherein after the power consumption operating mode has been lowered permitting the computer to be operated at a higher power consuming state when the temperature sensed is below a predetermined temperature value, the lower temperature value being selected to provide hysteresis and prevent oscillation between higher power state and lower powered state. (119) A system as in embodiment (115), wherein the lower power consumption state is achieved by lowering the clock frequency of the processor, the clock frequency of a bus coupling a processor to other components, or the operating voltage of the processor or other components. (120) A system as in embodiment (115), wherein the particular network device that is transitioned to a lower power consumption state is selected based on predetermined rules. (121) A system as in embodiment (120), wherein the predetermined rules include a quality of service indicator. (122) A system as in embodiment (121), wherein additional computer devices are sent to lower energy consuming modes if the temperature remains above a predetermined temperature value. (123) A system as in embodiment (10), wherein power consumption within the system is reduced by adjusting the number and motor speed of cooling fans responsible for cooling the computer. (124) A system as in embodiment (10), wherein a plurality of cooling fans are provided and operate under control of the power manager that controls each fan to provide cooling at the rate and location desired to maintain the computers within a predetermined temperature range. (125) A system as in embodiment (10), wherein the plurality of computers are disposed within a common enclosure and the system further comprising a plurality of temperature sensors and a plurality of cooling devices are also disposed within the enclosure, the plurality of temperature sensors communicating a temperature signal to a temperature control means and the control means adjusting the on/off status and operational parameters of the cooling units to extract heat according to predetermined rules. (126) A system as in embodiment (125), wherein the power manager comprises the temperature control means. (127) A system as in embodiment (125), wherein one of the computers within the enclosure comprises the temperature control means. (128) A system as in embodiment (9), wherein the system further includes a plurality of power supplies and the power supplies are controlled to maintain a required power output level and operate the power supplies at a preferred efficiency. (129) A system as in embodiment (128), wherein only selected ones of the plurality of power supplies are operated. (130) A system as in embodiment (128), wherein multiple ones of the power supplies are operated but each is operated at less than rated power output capacity. (131) A system as in embodiment (10), wherein the temperature of the system is moderated by motor driven cooling fans and wherein a rotational speed of the motor drive cooling is adjusted to maintain a predetermined temperature range proximate a temperature sensor. (132) A system as in embodiment (10), wherein the rotational speed of a motor drive cooling is adjusted to maintain a predetermined temperature range within an enclosure.

(133) A power-conservative multi-node network device, comprising: an enclosure having a power supply and a back-plane bus; a plurality of hot-pluggable node devices in the form of printed circuit (PC) cards adapted for connection with the back-plane buss; and each the node device being reconfigurable in substantially real-time to adapt to changing conditions on the network.

(134) The network device in embodiment (133), wherein the plurality of hot-pluggable node devices comprise up to sixteen node devices. (135) The network device in embodiment (133), wherein each of the node devices includes power saving control features.

(136) A computer program product for use in conjunction with a computer system having a plurality of server computers, each server computer including at least one processor, and each computer being operable in a first mode having a first maximum performance level and a first power consumption rate, and a third mode having a third maximum performance level lower than the first maximum performance level and a third power consumption rate lower than the first power consumption rate, the computer program product comprising a computer readable storage medium and a computer program mechanism embedded therein, the computer program mechanism, comprising: a program module that directs at least one computer, to function in a specified manner, the program module including instructions for: monitoring activity within the computers and identifying a level of activity for the at least one processor within the computers; analyzing the plurality of level of activity information; determining an operating mode for each of the computers selected from the first mode and third mode based on the analyzed activity information; and generating commands to each of the plurality of computers directing each of the plurality of computers to operate in the determined operating mode.

(137) The computer program product of embodiment (136), wherein each of the computers further being operable in a second mode having a second maximum performance level intermediate between the first maximum performance level and the third maximum performance level and a second power consumption rate intermediate between the first power consumption rate and the third power consumption rate; and the determining an operating mode further comprising determining an operating mode for each of the computers selected from the first mode, the second mode, and the third mode based on the analyzed activity information. (138) The computer program product of embodiment (137), wherein a transition from the first mode to the second mode is controlled locally within each the computer; and a transition from either the first mode or the second mode to the third mode are controlled globally by the power manager. (139) The computer program product of embodiment (138), wherein a transition from the second mode to the first mode is controlled locally within each the computer; and a transition from the third mode to either the first mode or the second mode is controlled globally by the power manager.

In a third group of innovations, the invention provides various embodiments associated with System, Method, Architecture, and Computer Program Product for Dynamic Power Management in a Computer System.

(1) In a computer system including at least one processing unit, a memory coupled to the at least one processing unit, and logic circuits coupled to the processing unit contributing to operation of the computer system, a method for controlling the operating mode and as a result the power consumption of the computer system between a plurality of operating modes each having a different electrical power consumption levels or ranges; the method comprising: while operating in a first selected operating mode exhibiting that first selected mode's characteristic power consumption range, (i) monitoring the computer system to detect the occurrence or non-occurrence of a first event; and (ii) transitioning the computer system from the first selected operating mode to a second selected operating mode exhibiting that second selected operating mode's power consumption range.

(2) The method in embodiment (1), wherein the first selected mode is a higher power consuming mode than the second selected mode. (3) The method in embodiment (1), wherein the first selected mode is a lower power consuming mode than the second selected mode. (4) The method in embodiment (1), wherein the computer system further comprises peripheral devices coupled to the at least one processing unit and the peripheral devices are power managed to reduce power consumption. (5) The method in embodiment (4), wherein the peripheral devices include a mass storage device storing data for retrieval of the data, and an output port for outputting selected portions of the stored data upon request. (6) The method in embodiment (1), wherein the first event comprises execution of a predetermined number of idle threads. (7) The method in embodiment (1), wherein the first event comprises execution of a single idle thread. (8) The method in embodiment (1), wherein the first event comprises execution of a predetermined plurality of idle threads. (9) The method in embodiment (1), wherein the first event comprises a wake on LAN signal event. (10) The method in embodiment (1), wherein the first event comprises the occurrence of some specified level of CPU processing capability availability that is derived from either an enumeration or a statistical evaluation of the idle thread or idle threads that are being or have been executed during some time period. (11) The method in embodiment (1), wherein one of the first and second events comprises a measured decrease in server load. (12) The method in embodiment (1), wherein one of the first and second events comprises a predicted decrease in server load. (13) The method in embodiment (1), wherein one of the first and second events comprises a measured decrease in processor tasking. (14) The method in embodiment (1), wherein one of the first and second events comprises a predicted decrease in processor tasking. (15) The method in embodiment (1), wherein one of the first and second events comprises a measured decrease in communication channel bandwidth. (16) The method in embodiment (1), wherein one of the first and second events comprises predicted decrease in communication channel bandwidth. (17) The method in embodiment (12), wherein the predicted decrease in server load is a prediction based at least in part on time of day. (18) The method in embodiment (12), wherein the predicted decrease in server load is a prediction based at least in part on a quality of service requirement. (19) The method in embodiment (12), wherein the predicted decrease in processor tasking is a prediction based at least in part on time of day. (20) The method in embodiment (12), wherein the predicted decrease in processor tasking is a prediction based at least in part type of content to be processed by the computer system. (21) The method in embodiment (12), wherein the predicted decrease in server loading is a prediction based at least in part type of content to be served by the computer system. (22) The method in embodiment (12), wherein the manner of the prediction is further based on the content served by the server computer system. (23) The method in embodiment (1), wherein one of the first selected operating mode and the second selected operating mode comprises a mode (Mode 1) in which the processing unit is operated at substantially maximum rated processing unit clock frequency and at substantially maximum rated processing unit core voltage, and the logic circuit is operated at substantially maximum rated logic circuit clock frequency and at a substantially maximum rated logic circuit operating voltage. (24) The method in embodiment (1), wherein one of the first selected operating mode and the second selected operating mode comprises a mode (Mode 2) in which the processing unit is operated at less than maximum rated processing unit clock frequency and at less than or equal to a maximum rated processing unit core voltage, and the logic circuit is operated at substantially maximum rated logic circuit clock frequency and at a substantially maximum rated logic circuit operating voltage. (25) The method in embodiment (1), wherein one of the first selected operating mode and the second selected operating mode comprises a mode (Mode 2') in which the processing unit is operated at less than maximum rated processing unit clock frequency and at less than a maximum rated processing unit core voltage, and the logic circuit is operated at substantially maximum rated logic circuit clock frequency and at a substantially maximum rated logic circuit operating voltage. (26) The method in embodiment (1), wherein one of the first selected operating mode and the second selected operating mode comprises a mode (Mode 2") in which the processing unit is operated at less than maximum rated processing unit clock frequency and at less than a maximum rated processing unit core voltage, and the logic circuit is operated at substantially maximum rated logic circuit clock frequency and at a substantially maximum rated logic circuit operating voltage. (27) The method in embodiment (1), wherein one of the first selected operating mode and the second selected operating mode comprises a mode (Mode 2''') in which the processing unit is operated at less than maximum rated processing unit clock frequency and at less than a maximum rated processing unit core voltage just sufficient to maintain switching circuits in the processor unit at the processing unit clock frequency, and the logic circuit is operated at substantially maximum rated logic circuit clock frequency and at a substantially maximum rated logic circuit operating voltage. (28) The method in embodiment (1), wherein one of the first selected operating mode and the second selected operating mode comprises a mode (Mode 3) in which the processing unit is operated at a slow but non-zero frequency processing unit clock frequency and at less than or equal to a maximum rated processing unit core voltage sufficient to maintain processor unit state, and the logic circuit is operated at substantially maximum rated logic circuit clock frequency and at a substantially maximum rated logic circuit operating voltage. (29) The method in embodiment (1), wherein one of the first selected operating mode and the second selected operating mode comprises a mode (Mode 3') in which the processing unit is operated at a substantially zero frequency processing unit clock frequency (clock stopped) and at less than or equal to a maximum rated processing unit core voltage, and the logic circuit is operated at substantially maximum rated logic circuit clock frequency and at a substantially maximum rated logic circuit operating voltage. (30) The method in embodiment (1), wherein one of the first selected operating mode and the second selected operating mode comprises a mode (Mode 3") in which the processing unit is operated at a substantially zero frequency processing unit clock frequency (processing unit clock stopped) and at a processing unit core voltage just sufficient to maintain processor unit state, and the logic circuit is operated at substantially maximum rated logic circuit clock frequency and at a substantially maximum rated logic circuit operating voltage. (31) The method in embodiment (1), wherein one of the first selected operating mode and the second selected operating mode comprises a mode (Mode 3''') in which the processing unit is operated at a substantially zero frequency processing unit clock frequency (processing unit clock stopped) and at a processing unit core voltage just sufficient to maintain processor unit state, and the logic circuit is operated at a logic circuit clock frequency less than a maximum rated logic circuit clock frequency and at a logic circuit operating voltage that is less than or equal to a maximum rated logic circuit operating voltage. (32) The method in embodiment (1), wherein one of the first selected operating mode and the second selected operating mode comprises a mode (Mode 3'''') in which the processing unit is operated at a substantially zero frequency processing unit clock frequency (processing unit clock stopped) and at a processing unit core voltage just sufficient to maintain processor unit state, and the logic circuit is operated at a logic circuit clock frequency less than a maximum rated logic circuit clock frequency and at a logic circuit operating voltage that is less than a maximum rated logic circuit operating voltage. (33) The method in embodiment (1), wherein one of the first selected operating mode and the second selected operating mode comprises a mode (Mode 3''''') in which the processing unit is operated at a substantially zero frequency processing unit clock frequency (processing unit clock stopped) and at a processing unit core voltage just sufficient to maintain processor unit state, and the logic circuit is operated at a substantially zero logic circuit clock frequency and at a logic circuit operating voltage that is just sufficient to maintain logic circuit operating state. (34) The method in embodiment (1), wherein one of the first selected operating mode and the second selected operating mode comprises a mode (Mode 4) in which the processing unit is powered off by removing a processing unit clock frequency (processing unit clock stopped) and a processing unit core voltage. (35) The method in embodiment (1), wherein one of the first selected operating mode and the second selected operating mode comprises a mode (Mode 4') in which the processing unit is powered off by removing a processing unit clock frequency (processing unit clock stopped) and a processing unit core voltage; and the logic circuit is powered off by removing the logic circuit clock and by removing the logic circuit operating voltage or by setting the logic circuit operating voltage below a level that will maintain state, except that a real-time clock and circuit for waking the logic circuit and the processing unit are maintained in operation. (36) The method in embodiment (1), wherein one of the first selected operating mode and the second selected operating mode comprises a mode (Mode 4") in which the processing unit is powered off by removing a processing unit clock frequency (processing unit clock stopped) and a processing unit core voltage; and the logic circuit is powered off by removing the logic circuit clock and by removing the logic circuit operating voltage or by setting the logic circuit operating voltage below a level that will maintain state, except that a circuit for waking the logic circuit and the processing unit are maintained in operation.

(37) The method in embodiment (1), further comprising: while operating in the second selected operating mode exhibiting that second selected mode's characteristic power consumption range, (i) monitoring the computer system to detect the occurrence or non-occurrence of a second event; and (ii) transitioning the computer system from the second selected operating mode to a third selected operating mode exhibiting that third selected operating mode's power consumption range.

(38) The method in embodiment (1), wherein the first selected operating mode and the second selected operating mode comprises different operating modes selected from the set of operating modes consisting of: (i) a mode in which the processing unit is operated at substantially maximum rated processing unit clock frequency and at substantially maximum rated processing unit core voltage, and the logic circuit is operated at substantially maximum rated logic circuit clock frequency; (ii) a mode in which the processing unit is operated at less than maximum rated processing unit clock frequency and at less than or equal to a maximum rated processing unit core voltage, and the logic circuit is operated at substantially maximum rated logic circuit clock frequency; and (iii) a mode in which the processing unit is operated at a substantially zero frequency processing unit clock frequency (clock stopped) and at less than or equal to a maximum rated processing unit core voltage sufficient to maintain processor unit state, and the logic circuit is operated at substantially maximum rated logic circuit clock frequency.

(39) The method in embodiment (38), wherein the set further consists of a mode in which the processing unit is powered off by removing a processing unit clock frequency (processing unit clock stopped) and a processing unit core voltage.

(40) The method in embodiment (1), further comprising: while operating in the second selected operating mode exhibiting that second selected mode's characteristic power consumption range, (i) monitoring the computer system to detect the occurrence or non-occurrence of a second event; and (ii) transitioning the computer system from the second selected operating mode to a third selected operating mode exhibiting that third selected operating mode's power consumption range.

(41) The method in embodiment (40), wherein the first selected operating mode and the second selected operating mode comprises different operating modes, and the second selected operating mode and the third selected operating mode comprise different operating modes, each of the first, second, and third operating modes being selected from the set of modes consisting of: (i) a mode in which the processing unit is operated at substantially maximum rated processing unit clock frequency and at substantially maximum rated processing unit core voltage, and the logic circuit is operated at substantially maximum rated logic circuit clock frequency; (ii) a mode in which the processing unit is operated at less than maximum rated processing unit clock frequency and at less than or equal to a maximum rated processing unit core voltage, and the logic circuit is operated at substantially maximum rated logic circuit clock frequency; and (iii) a mode in which the processing unit is operated at a substantially zero frequency processing unit clock frequency (clock stopped) and at less than or equal to a maximum rated processing unit core voltage sufficient to maintain processor unit state, and the logic circuit is operated at substantially maximum rated logic circuit clock frequency.

(42) The method in embodiment (41), wherein the set further consists of a mode in which the processing unit is powered off by removing a processing unit clock frequency (processing unit clock stopped) and a processing unit core voltage. (43) A computer program product for use in conjunction with a computer system including at least one processing unit, a memory coupled to the at least one processing unit, and logic circuits coupled to the processing unit contributing to operation of the computer system, a method for controlling the operating mode and as a result the power consumption of the computer system between a plurality of operating modes each having a different electrical power consumption levels or ranges; the computer program product comprising a computer readable storage medium and a computer program mechanism embedded therein, the computer program mechanism, comprising: a program module that directs the computer system to function in a specified manner, the program module including instructions for: (i) monitoring the computer system to detect the occurrence or non-occurrence of a first event while operating in a first selected operating mode exhibiting that first selected mode's characteristic power consumption range; and (ii) transitioning the computer system from the first selected operating mode to a second selected operating mode exhibiting that second selected operating mode's power consumption range. (44) The computer program product in embodiment (43), wherein the program module further including instructions for: while operating in the second selected operating mode exhibiting that second selected mode's characteristic power consumption range, (i) monitoring the computer system to detect the occurrence or non-occurrence of a second event; and (ii) transitioning the computer system from the second selected operating mode to a third selected operating mode exhibiting that third selected operating mode's power consumption range. (45) The computer program product in embodiment (44), wherein the first selected operating mode and the second selected operating mode comprises different operating modes, and the second selected operating mode and the third selected operating mode comprise different operating modes, each of the first, second, and third operating modes being selected from the set of modes consisting of: (i) a mode in which the processing unit is operated at substantially maximum rated processing unit clock frequency and at substantially maximum rated processing unit core voltage, and the logic circuit is operated at substantially maximum rated logic circuit clock frequency; (ii) a mode in which the processing unit is operated at less than maximum rated processing unit clock frequency and at less than or equal to a maximum rated processing unit core voltage, and the logic circuit is operated at substantially maximum rated logic circuit clock frequency; and (iii) a mode in which the processing unit is operated at a substantially zero frequency processing unit clock frequency and at less than or equal to a maximum rated processing unit core voltage sufficient to maintain processor unit state, and the logic circuit is operated at substantially maximum rated logic circuit clock frequency. (46) The computer program product in embodiment (45), wherein the set further consists of a mode in which the processing unit is powered off by removing a processing unit clock frequency and a processing unit core voltage.

(47) A computer system comprising: at least one processing unit and a memory coupled to the at least one processing unit; and logic circuits coupled to the processing unit contributing to operation of the computer system; a controller for controlling the operating mode and as a result, the power consumption of the computer system between a plurality of operating modes each having a different electrical power consumption levels or ranges; the controller being operable while operating in a first selected operating mode exhibiting that first selected mode's characteristic power consumption range, (i) to monitor the computer system to detect the occurrence or non-occurrence of a first event; and (ii) to transition the computer system from the first selected operating mode to a second selected operating mode exhibiting that second selected operating mode's power consumption range.

In a fourth group of innovations, the invention provides various embodiments associated with Apparatus, Architecture, and Method for Integrated Modular Server System Providing Dynamically Power-managed and Work-load Managed Network Devices.

(1) An integrated server system unit comprising: a frame, housing, or enclosure; a plurality of network devices disposed within the frame, housing, or enclosure; the network devices including at least one network device operating as a computer node, at least one network device operating as a monitor node, and at least one network device operating as a switching node; and each the computer node, the monitor node, and the switching node being coupled for communication.

(2) A system as in embodiment (1), wherein at least two of the computer node, the monitor node, and the switching node are provided by a common physical device. (3) A system as in embodiment (1), wherein the integrated server system includes a plurality of computer nodes. (4) A system as in embodiment (1), wherein the computer node comprises a server module. (5) A system as in embodiment (1), wherein the monitor node comprises a management module. (6) A system as in embodiment (1), wherein the switching node comprises a switch module. (7) A system as in embodiment (1), wherein: the computer node comprises a server module; the monitor node comprises a management module; and switching node comprises a switch module. (8) A system as in embodiment (7), wherein the computer node is power managed to adjust performance to required level and to consume only so much electrical power or energy as to satisfy the required performance level. (9) A system as in embodiment (7), wherein each of the computer node, the management node, and the switch node are power managed. (10) A system as in embodiment (8), wherein the computer node is power managed by adjusting processor performance to at least one of (i) a predicted processor processing requirement and (ii) a measured processor processing requirement. (11) A system as in embodiment (10), wherein the predicted processor processing requirement when used is a Quality of Service (QoS) based requirement, and the measured processor processing requirement when used comprises a substantially real-time measured processor processing requirement. (12) A system as in embodiment (11), wherein the substantially real-time processor processing requirement comprises an idle thread execution detection and response thereto. (13) A system as in embodiment (9), wherein the management node is power managed by adjusting a processor operation within the management node to provide execution of instructions that permit the management node to sample system loading and adjust other nodes within the system frequently enough to provide a desired power management adjustment update frequency for each node being power managed. (14) A system as in embodiment (13), wherein the processor operation is adjusted by adjusting a management node processor clock frequency and/or a management node processor core voltage. (15) A system as in embodiment (13), wherein the computer node network devices may be configured or reconfigured as any or all of a web server, a streaming media server, a cache server, an application server, a file server, a router, and combinations thereof. (16) A system as in embodiment (15), wherein the configuration may be performed dynamically during operation of the computer node network device during operation of the system so that the system has a number of computer node network devices sufficient to satisfy a current demand on the network for network devices of that type. (17) A system as in embodiment (16), wherein the configuration or reconfiguration may controlled by a monitor node or a management module, or by a self-reconfiguration procedure within the computer node network device.

(18) An dynamically adaptable integrated server system unit comprising: a frame, housing, or enclosure; a plurality of configurable and dynamically reconfigurable network devices disposed within the frame, housing, or enclosure; and the dynamically reconfigurable network devices including at least one network device operating as a computer node.

(19) A system as in embodiment (18), wherein the computer node comprises a server module. (20) A system as in embodiment (19), wherein the server module is initially configurable and subsequently reconfigurable during operation as any one or more or all of a web server, a streaming media server, a cache server, a file server, an application server, a router, and combinations thereof. (21) A system as in embodiment (18), wherein each computer node is configurable and reconfigurable as a combination type of network device, and wherein the network device configured in the computer node is a network device selected from the set consisting of a web server, a streaming media server, a cache server, a file server, an application server, a router, and combinations thereof. (22) A system as in embodiment (18), wherein the network device is dynamically and adaptably reconfigurable at any time based on types of activities detected within a network to which the network device is then presently or will be connected. (23) A system as in embodiment (22), wherein when the network device is configured prospectively for a network that the network device is to be connected, the activities are detected by either the network device in a different configuration or by a different network device coupled to the network. (24) A system as in embodiment (22), wherein the system includes a network activity monitor that detects the types of activities present on a network to which the activity monitor is coupled. (25) A system as in embodiment (24), wherein the types of activities present on a network to which the activity monitor is coupled monitored by the activity monitor include at least one of a number or volume of web pages served, a number or volume of streaming media served, a number or volume of files served, a number or volume of applications served, a number or volume of cached data served, an amount of network traffic routed, and combinations thereof. (26) A system as in embodiment (25), wherein the activity monitor is based in part on detection of the execution of idle threads by a processor within the network device during periods of time when the network device is not performing the activity for which the network device is configured. (27) A system as in embodiment (18), wherein the server module may be reconfigured at any time based on any one or more of server processor loading, quality of service indicator, or combinations thereof. (28) A system as in embodiment (19), wherein the server module may be reconfigured at any time based on any one or more of server processor loading, quality of service indicator, or combinations thereof. (29) A system as in embodiment (18), wherein the reconfiguration of a computer node is initiated by any computer node type network device including the same computer node as is being reconfigured. (30) A system as in embodiment (18), wherein the reconfiguration of a computer node is initiated by any computer node that has been designated as a master computer node. (31) A system as in embodiment (30), wherein any computer node may be designated as the master node. (32) A system as in embodiment (31), wherein a particular computer node is designated as a master node on the basis of its position within a chassis. (33) A system as in embodiment (31), wherein a particular computer node is designated as a master node on the basis of the order of power-up or boot completion. (34) A system as in embodiment (18), wherein reconfiguration of the computer node comprises altering the software and/or firmware instructing the computer node. (35) A system as in embodiment (22), wherein reconfiguration of the computer node comprises altering the software and/or firmware instructing the computer node. (36) A system as in embodiment (18), wherein reconfiguration of the computer node comprises altering the data organization of a data storage device integral with or coupled to the computer node. (37) A system as in embodiment (22), wherein reconfiguration of the computer node comprises altering the data organization of a data storage device integral with or coupled to the computer node. (38) A system as in embodiment (37), wherein the data storage device comprises a hard disc drive based RAID storage array and altering the data organization comprises altering a RAID configuration of the data to provide better performance for the type of data being served. (39) A system as in embodiment (18), wherein the reconfiguration of a computer node is initiated by a management node type network device. (40) A system as in embodiment (18), wherein the dynamically reconfigurable network devices include a plurality of network devices configured as the same type. (41) A system as in embodiment (40), wherein a plurality of network devices of the same type are grouped together into a group that are treated as a single network device. (42) A system as in embodiment (41), wherein the group of network devices treated as a single network device is managed and controlled as a single network device. (43) A system as in embodiment (42), wherein the group of network devices treated as a single network device is power managed as a single network device. (44) A system as in embodiment (42), wherein the group of network devices treated as a single network device is monitored as a single network device. (45) A system as in embodiment (41), wherein the plurality of grouped network devices are coupled for communication and the logical grouping of the plurality of network devices into a single logical network device is performed under control of software or firmware. (46) A system as in embodiment (41), wherein the plurality of grouped network devices are electrically coupled via a backplane bus and the logical grouping of the plurality of network devices into a single logical network device is performed under control of software. (47) A system as in embodiment (46), wherein the software executes within a processor and memory associated with each network device. (48) A system as in embodiment (44), wherein the plurality of network devices each comprise a server group. (49) A system as in embodiment (44), wherein the plurality of network devices each comprise a computer node. (50) A system as in embodiment (49), wherein each computer node is configured as a computer node selected from the group consisting of a web server, a streaming media server, a cache server, a file server, an application server, and a router.

In a fifth group of innovations, the invention provides various embodiments associated with System, Architecture, and Method for Logical Server and Other Network Devices in a Dynamically Configurable Multi-server Network Environment.

(1) In a system having a plurality of physical network devices, a method for grouping the plurality of physical network devices into a logical network device for operation and control, the method comprising: coupling the physical network devices that are to be grouped together as a logical device for communication; identifying a manager to supervise operation of the logical device; receiving a request for performance of a task; and executing a procedure within the manager to coordinate and control operation of the logical device to perform the task, the coordination and control including: (i) determining a capability of each the physical network device, and (ii) distributing network tasks between and among the network devices based on the determined capabilities and requests submitted to the network. (2) The method in embodiment (1), wherein the manager supervising operation is performed at least in part by a component of one of the plurality of network devices. (3) The method in embodiment (1), wherein the manager supervising operation is performed at least in part by a component of one of the plurality of network devices comprising the logical network device. (4) The method in embodiment (1), wherein the manager supervising operation is performed at least in part by an external manager separate from the plurality of network devices comprising the logical network device. (5) The method in embodiment (1), wherein the manager supervising operation is performed by a management module and the plurality of physical network devices comprise server modules. (6) The method in embodiment (1), wherein the manager supervising operation is performed by a server module designated as a master. (7) The method in embodiment (6), wherein the plurality of network devices comprise server modules, and the manager supervising operation is performed by one of the server modules designated as a master. (8) The method in embodiment (6), wherein the plurality of network devices comprise server modules, and the manager supervising operation is performed by a server module different from the plurality of server modules grouped as a logical network device and designated as a master. (9) The method in embodiment (1), wherein the plurality of logical devices comprise switch modules. (10) The method in embodiment (1), wherein the plurality of logical devices comprise management modules. (11) The method in embodiment (1), wherein the plurality of logical devices comprise network devices selected from the set consisting of management modules, server modules, and switching modules. (12) The method in embodiment (1), wherein the plurality of logical devices are configured as a logical manager. (13) The method in embodiment (1), wherein the plurality of logical devices are configured as a logical switcher. (14) The method in embodiment (1), wherein the plurality of logical devices are configured as a logical router. (15) The method in embodiment (1), wherein the plurality of logical devices are configured as a logical server. (16) The method in embodiment (1), wherein the plurality of logical devices comprise server modules. (17) The method in embodiment (1), wherein the plurality of logical devices comprise server modules and the logical network device comprises a logical server module configured as one of a web server, a streaming media server, a cache server, a file server, an application server, and combinations thereof. (18) The method in embodiment (1), wherein the plurality of physical devices include a plurality of data storage devices, and the coordination and control of the physical devices into the logical device comprise managing the storage devices as a redundant array of independent disks (RAID). (19) The method in embodiment (18), wherein the plurality of data storage devices comprise a plurality of disk drives managed as a mirroring data storage subsystem. (20) The method in embodiment (18), wherein the RAID is managed as either a RAID Level 1 or RAID Level 0+1. (21) The method in embodiment (18), wherein the plurality of storage devices comprise hard disk drives and operation of the hard disk drives is managed to reduce power consumption and prolong disk drive life. (22) The method in embodiment (19), wherein the managing includes: selecting a first set of disc drives from among a plurality of sets of disc drives as a currently active set; selecting a second set of disc drives as a currently inactive set and placing the selected inactive set in a power conserving mode; using the first set of disc drives to retrieve data in response to read data requests; activating the second set of disc drives in response to a write data request prior to performing the requested write operation; performing the write operation to both the first and second set of disc drives; and selecting one of the first set and second set as the inactive set and deactivating the selected inactive set after performing the write operation. (23) The method in embodiment (22), wherein the disc drives are configured as a RAID Level 1. (24) The method in embodiment (22), wherein the disc drives are configured as a RAID Level 0+1. (25) The method in embodiment (22), wherein the disc drives are configured as mirrored storage each set duplicating the data of the other set. (26) The method in embodiment (1), wherein the plurality of grouped network devices are electrically coupled via a backplane bus and the logical grouping of the plurality of network devices into a single logical network device is performed under control of software. (27) The method in embodiment (1), wherein the software executes within a processor and memory associated within each network device. (28) The method in embodiment (1), wherein a plurality of network devices of the same type are grouped together and treated as a single network device. (29) The method in embodiment (1), wherein the group of network devices treated as a single network device is managed and controlled as a single network device. (30) The method in embodiment (1), wherein the group of network devices treated as a single network device is power managed as a single network device. (31) The method in embodiment (1), wherein the group of network devices treated as a single network device is monitored as a single network device. (32) The method in embodiment (1), wherein the plurality of grouped network devices are electrically coupled via a backplane bus and the logical grouping of the plurality of network devices into a single logical network device is performed under control of software. (33) The method in embodiment (1), wherein the software executes within a processor and memory associated within each network device. (34) The method in embodiment (1), wherein the plurality of network devices each comprise a server group. (35) The method in embodiment (34), wherein each the server group comprises a plurality of server modules. (36) The method in embodiment (1), wherein the plurality of network devices each comprise a computer node. (37) The method in embodiment (36), wherein each computer node is configured as a computer node selected from the group consisting of a web server, a streaming media server, a cache server, a file server, an application server, and a router. (38) The method in embodiment (1), wherein the logical device is managed as a single image. (39) The method in embodiment (1), wherein the method includes a first plurality of physical devices grouped as a first logical device, and a second plurality of physical devices grouped as a second logical device. (40) The method in embodiment (39), wherein the first and second logical devices are power managed as logical devices. (41) The method in embodiment (1), wherein tasks performed by each of the logical devices are monitored for each logical device, for each physical device within the logical device, or both. (42) The method in embodiment (1), wherein tasks performed by each of the logical devices are monitored for each logical device, for each physical device within the logical device, or both; and the task monitoring information is used to power manage the logical device and the physical devices. (43) The method in embodiment (42), wherein the power management includes reconfiguring the logical unit to provide a required performance level with a desired power consumption. (44) The method in embodiment (42), wherein the power management includes reconfiguring the logical unit to minimize power consumption while maintaining a required task performance level. (45) The method in embodiment (44), wherein the reconfiguring the logical unit to minimize power consumption while maintaining a required task performance level is performed in accordance with power management policies. (46) The method in embodiment (44), wherein the reconfiguring the logical unit to extend the life of a component constituting the physical device. (47) The method in embodiment (45), wherein the power management policies include a policy that attempts to satisfy performance requirements by operating each of first selected physical devices at first performance levels, and a each of second selected physical devices at second performance levels. (48) The method in embodiment (47), wherein the second performance levels are a performance level at which substantially no tasks are performed and power consumption is reduced relative to the first performance levels. (49) The method in embodiment (48), wherein the first performance levels are between about 40 percent and about 100 percent of maximum performance level. (50) The method in embodiment (45), wherein the power management policies include a policy that attempts to satisfy performance requirements by operating a minimum number of physical devices to satisfy task performance requirements. (51) The method in embodiment (40), wherein performance of a logical group of physical network devices forming a single logical device are power managed by reducing the performance and power consumption of each constituent physical device in predetermined equal increments, predetermined unequal increments, in a substantially continuous manner, or dynamically in a continuous or incremental manner. (52) The method in embodiment (51), wherein the unequal increments include placing one or more of the plurality of physical devices in an operating mode wherein the physical device includes a processor operating to perform tasks only when a processor clock signal is provided, and the processor clock signal is stopped or substantially stopped. (53) The method in embodiment (52), wherein the processor is placed in a suspend mode. (54) The method in embodiment (51), wherein the unequal increments include placing one or more of the plurality of physical devices in a sleep mode. (55) The method in embodiment (51), wherein the unequal increments include placing one or more of the plurality of physical devices in a powered-off mode. (55) The method in embodiment (45), wherein a composite performance of a logical network device is achieved by placing some physical network devices in a first power saving mode and by placing others in a different mode.

(51) A method of reducing power consumption in a computer system having a mirroring data storage subsystem, the method comprising steps of: selecting a first set of disc drives from among a plurality of sets of disc drives as a currently active set; selecting a second set of disc drives as a currently inactive set and placing the selected inactive set in a power conserving mode; using the first set of disc drives to retrieve data in response to read data requests; activating the second set of disc drives in response to a write data request prior to performing the requested write operation; performing the write operation to both the first and second set of disc drives; and selecting one of the first set and second set as the inactive set and deactivating the selected inactive set after performing the write operation.

(52) The method in embodiment (51), wherein the disc drives are configured as a RAID Level 1. (53) The method in embodiment (51), wherein the disc drives are configured as a RAID Level 0+1. (54) The method in embodiment (51), wherein the disc drives are configured as mirrored storage each set duplicating the data of the other set. (55) The method in embodiment (51), wherein: the disc drives are disposed on separate server modules that have been grouped as a single logical device; and the disk drives are configured as either a RAID Level 1 or a RAID Level 0+1 and include data mirroring.

In a sixth group of innovations, the invention provides various embodiments associated with Apparatus and Method for Modular Dynamically Power-Managed Power Supply and Cooling System for Computer Systems, Server Applications, and Other Electronic Devices.

(1) An electrical apparatus comprising: a frame or enclosure; at least one electrical circuit drawing electrical power in the form of an alternating or direct electrical voltage, current, or a combination of an electrical voltage and an electrical current disposed within the frame or enclosure, the electrical circuit utilizing the electrical power and generating heat as a result of the utilization; at least one temperature sensor within the enclosure for monitoring and reporting the temperature proximate the sensor to a temperature monitor; and a power manager receiving the reported temperature and controlling the temperature at the temperature sensor by controlling electrical power drawn by the electrical circuit and thereby the heat generated by operation of the circuit.

(2) The apparatus in embodiment (1), wherein the at least one electrical circuit comprises a computer having a processor receiving an operating voltage and a processor clock signal. (3) The apparatus in embodiment (2), wherein the computer is configured as a server. (4) The apparatus in embodiment (3), wherein the power manager comprises a power management circuit. (5) The apparatus in embodiment (3), wherein the server comprises a server module and the power manager comprises a management module. (6) The apparatus in embodiment (1), wherein the apparatus comprises a plurality of the electrical circuits each including a computer having a processor receiving an operating voltage and a processor clock signal. (7) The apparatus in embodiment (6), wherein the power manager controls the electrical power drawn and the heat generated by the electrical circuits by controlling either the frequency of the processor clock signal, or the operating voltage, or a combination of the processor clock frequency and the processor operating voltage. (8) The apparatus in embodiment (7), wherein the power manager reduces the electrical power drawn by the electrical circuits by monitoring the temperature sensor and controlling an output signal generated at least in part by the temperature sensor to be within a predetermined range. (9) The apparatus in embodiment (8), wherein the predetermined range includes a predetermined maximum. (10) The apparatus in embodiment (6), wherein at least some of the plurality of electrical circuits are configured as network devices including the processor receiving the operating voltage and the processor clock signal; and the power manager controls the electrical power drawn and the heat generated by the network devices by controlling either the frequency of the processor clock signal, or the operating voltage, or a combination of the processor clock frequency and the processor operating voltage. (11) The apparatus in embodiment (10), wherein at least some of the network devices comprise circuits configured as a network device selected from the set consisting of a web server, a streaming media server, a cache server, a file server, an application server, and a router. (12) The apparatus in embodiment (10), wherein at least some of the network devices comprise server computers that further include at least one hard disk drive for storing data or other content to be served and a network communication circuit for communicating with an external client over a communication link. (13) The apparatus in embodiment (10), wherein the server computers comprises server modules and the power manager comprises at least one management module. (14) The apparatus in embodiment (10), wherein the configured network device comprises a management node type network device. (15) The apparatus in embodiment (10), wherein the system includes a plurality of temperature sensors within the enclosure reporting to one or more network devices. (16) The apparatus in embodiment (15), wherein the plurality of temperature sensors are spatially distributed to provide temperature monitoring of different network devices within the enclosure. (17) The apparatus in embodiment (15), wherein the plurality of temperature sensors are spatially distributed to provide temperature monitoring of different network devices and power supplies within the enclosure. (18) The apparatus in embodiment (12), wherein when the temperature sensed by a temperature sensor is within a predetermined magnitude relationship of a first predetermined value at least one network device is transitioned to a lower power consumption state thereby generating less heat. (19) The apparatus in embodiment (18), wherein when the temperature sensed by a temperature sensor is within a predetermined magnitude relationship of a second predetermined value at least one network device is transitioned to a powered off state. (20) The apparatus in embodiment (1), wherein the operational state of at least one network device is reduced to a lower power consuming and heat dissipating state in response to a temperature sensor reporting a temperature greater than or equal to a predetermined value. (21) The apparatus in embodiment (20), wherein after the power consumption state has been lowered permitting the network device to be operated at a higher power consuming state when the temperature sensed is below a predetermined temperature value, the lower temperature value being selected to provide hysteresis and prevent oscillation between higher power state and lower powered state. (22) The apparatus in embodiment (1), when the temperature sensed by a temperature sensor is within a predetermined magnitude relationship of a first predetermined value at least one network device is transitioned to a lower power consumption state. (23) The apparatus in embodiment (22), wherein the lower power consumption state is achieved by lowering the clock frequency of the processor, the clock frequency of a bus coupling a processor to other components, or the operating voltage of the processor or other components. (24) The apparatus in embodiment (22), wherein additional networked devices are sent to lower energy consuming modes if the temperature remains above a predetermined temperature value. (25) The apparatus in embodiment (7), wherein the controlling of either the frequency of the processor clock signal, or the operating voltage, or a combination of the processor clock frequency and the processor operating voltage, is controlled by a computer program executing instructions to implement a control procedure at least in part in at least one of the processors of the computers that transition one or more of the processors between different operating modes having different electrical power consumptions and different heat generation; the procedure including: while operating in a first selected operating mode exhibiting that first selected mode's characteristic power consumption range, (i) monitoring the computer system to detect the occurrence or non-occurrence of a first event; and (ii) transitioning the computer system from the first selected operating mode to a second selected operating mode exhibiting that second selected operating mode's power consumption range.

(26) The apparatus in embodiment (25), wherein the procedure further including: while operating in the second selected operating mode exhibiting that second selected mode's characteristic power consumption range, (i) monitoring the computer system to detect the occurrence or non-occurrence of a second event; and (ii) transitioning the computer system from the second selected operating mode to a third selected operating mode exhibiting that third selected operating mode's power consumption range.

(27) The apparatus in embodiment (26), wherein the first selected operating mode and the second selected operating mode comprises different operating modes, and the second selected operating mode and the third selected operating mode comprise different operating modes, each of the first, second, and third operating modes being selected from the set of modes consisting of: (i) a mode in which the processing unit is operated at substantially maximum rated processing unit clock frequency and at substantially maximum rated processing unit core voltage, and the logic circuit is operated at substantially maximum rated logic circuit clock frequency; (ii) a mode in which the processing unit is operated at less than maximum rated processing unit clock frequency and at less than or equal to a maximum rated processing unit core voltage, and the logic circuit is operated at substantially maximum rated logic circuit clock frequency; and (iii) a mode in which the processing unit is operated at a substantially zero frequency processing unit clock frequency (clock stopped) and at less than or equal to a maximum rated processing unit core voltage sufficient to maintain processor unit state, and the logic circuit is operated at substantially maximum rated logic circuit clock frequency. (28) The apparatus in embodiment (27), wherein the set further consists of a mode in which the processing unit is powered off by removing a processing unit clock frequency (processing unit clock stopped) and a processing unit core voltage. (29) The apparatus in embodiment (1), further comprising at least one cooling fan and the apparatus controlling a speed of the fan, including an on/off condition of the fan, to achieve a desired temperature at the sensor. (30) The apparatus in embodiment (29), wherein the fan is not rotated and passive cooling is used when electrical power drawn and heat generated are sufficiently small to permit such passive cooling while maintaining a predetermined temperature range. (31) The apparatus in embodiment (29), wherein the apparatus includes a plurality of cooling fans and the plurality of cooling fans are controlled to achieve a desired temperature. (32) The apparatus in embodiment (31), wherein the apparatus further includes a plurality of temperature sensors and the plurality of cooling fans are operated in a coordinated manner to achieve a desired temperature range proximate at least some of the temperature sensors. (33) The apparatus in embodiment (31), wherein the cooling fans are modular cooling fan units that provide mechanical connectors and electrical circuits to provide powered-on hot-swappability. (34) The apparatus in embodiment (33), wherein the modular cooling fan units are organized into cooling fan banks that provide mechanical connectors and electrical circuits to provide powered-on hot-swappability. (35) The apparatus in embodiment (34), wherein the at least two banks of three cooling fan units are provided at different locations within the frame or enclosure. (36) The apparatus in embodiment (33), wherein the cooling fan units include failover protection circuits. (37) The apparatus in embodiment (31), wherein different ones of the plurality of cooling fan units are operated or not operated in a coordinated manner to provide desired cooling of the apparatus and to achieve a desired life cycle and/or reliability for the cooling fans. (38) The apparatus in embodiment (31), wherein different ones of the plurality of cooling fan units are operated or not operated or operated at different speeds in a coordinated manner to provide desired cooling of the apparatus and to provide such cooling at a minimum aggregate cooling fan power consumption. (39) The apparatus in embodiment (1), wherein power consumption within the apparatus is further reduced by adjusting the number and motor speed of cooling fans responsible for cooling the apparatus. (40) The apparatus in embodiment (11), wherein the apparatus further includes a plurality of temperature sensors and a plurality of cooling devices, the cooling devices operating under control of a control device that controls each cooling device to provide cooling at the rate and location desired to maintain the network devices within a predetermined operating temperature range. (41) The apparatus in embodiment (40), wherein a plurality of temperature sensors are disposed in the frame of enclosure and a plurality of cooling devices are disposed within the enclosure, the plurality of temperature sensors communicating a temperature signal to a control means and the control means adjusting the on/off status and operational parameters of the cooling units to extract heat according to predetermined rules. (42) The apparatus in embodiment (41), wherein the cooling devices comprise motor driven fans. (43) The apparatus in embodiment (41), wherein the cooling devices comprise valves controlling the circulation of a cooling fluid. (44) The apparatus in embodiment (41), wherein the cooling devices comprise conductive heat exchangers. (45) The apparatus in embodiment (41), wherein the cooling devices comprise convective heat exchangers. (46) The apparatus in embodiment (10), wherein: the server computers comprises server modules and the power manager comprises at least one management module; power consumption within the apparatus is controlled reduced by adjusting the number and motor speed of cooling fans responsible for cooling the apparatus. (47) The apparatus in embodiment (11), wherein the apparatus further includes a plurality of temperature sensors and a plurality of cooling devices, the cooling devices operating under control of a control device that controls each cooling device to provide cooling at the rate and location desired to maintain the network devices within a predetermined operating temperature range. (48) The apparatus in embodiment (47), wherein a plurality of temperature sensors are disposed in the frame of enclosure and a plurality of cooling devices are disposed within the enclosure, the plurality of temperature sensors communicating a temperature signal to a control means and the control means adjusting the on/off status and operational parameters of the cooling units to extract heat according to predetermined rules. (49) A system as in embodiment (48), wherein the rotational speed of a motor drive cooling is adjusted to maintain a predetermined temperature range proximate a temperature sensor. (50) A system as in embodiment (48), wherein the rotational speed of a motor drive cooling is adjusted to maintain a predetermined temperature range within an enclosure. (51) A system as in embodiment (48), wherein the amount of heat extracted from an enclosure is adjusted to maintain a predetermined temperature and reduce power consumed by the cooling device. (52) A system as in embodiment (48), wherein the heat extractor comprises a motor driven cooling device. (53) The apparatus in embodiment (1), further including a plurality of power supplies wherein the plurality of power supplies are controlled to maintain a required power output level drawn by the at least one electrical circuit and to operate the power supplies according to predetermined power supply management policy. (54) The apparatus in embodiment (53), wherein operating the plurality of power supplies at a preferred efficiency includes operating at least some of the power supplies a preferred output and/or efficiency at a partial electrical output loading less than a maximum loading to extend a lifetime of the power supplies. (55) The apparatus in embodiment (53), wherein operating the plurality of power supplies according to the policy includes operating at least some of the power supplies at up to a maximum rating and not operating other of the plurality of power supplies so that the aggregate power consumed by the apparatus including power lost in operation of the power supplies is reduced. (56) The apparatus in embodiment (55), wherein the power supplies comprise battery power supplies. (57) The apparatus in embodiment (55), wherein the power supplies comprise power supplies receiving an alternating current utility line voltage and current and generating at least one direct current voltage and current. (58) The apparatus in embodiment (57), wherein the alternating current utility line (ac) voltage is a voltage substantially in the range of between about 90 volts and substantially 300 volts, and the direct current (dc) voltage is in the range of between about ±0.5 volt and about ±20 volts. (59) The apparatus in embodiment (57), wherein the alternating current utility line (ac) voltage is a voltage substantially in the range of between substantially 100 volts and 130 volts, and the direct current (dc) voltage is in the range of between about 1 volt and about 5 volts. (60) The apparatus in embodiment (57), wherein the power supply management policy further includes automatically alternating a plurality of power supplies so that the aggregate plurality of power supplies are operated efficiently and have an extended lifetime. (61) The apparatus in embodiment (60), wherein the automatically alternating the plurality of power supplies includes changing the electrical power that may be drawn from each of the plurality of power supplies under computer control so that the aggregate plurality of power supplies are operated efficiently and have an extended lifetime. (62) The apparatus in embodiment (53), wherein only selected ones of the plurality of power supplies are operated. (63) The apparatus in embodiment (53), wherein multiple ones of the power supplies are operated concurrently but each is operated at less than rated power output capacity. (64) The apparatus in embodiment (53), wherein the plurality of power supply units include fail-over protection circuits. (65) The apparatus in embodiment (53), wherein the elapsed time and/or power supply loading history are monitored and stored in a non-volatile memory store and used with the power supply management policy. (66) The apparatus in embodiment (65), wherein the stored history are utilized to predict failure and/or equalize lifetime of the power supplies according to a power supply lifetime prediction routine. (67) The apparatus in embodiment (66), wherein the power supply lifetime prediction routine is statistically based prediction routine utilizing a lifetime and failure model adapted to each particular type of power supply. (68) The apparatus in embodiment (53), wherein the plurality of power supplies comprise power supplies having different output characteristics types and the combination of power supplies providing electrical operating power to satisfy electrical loading at any particular time and having a desired aggregate operating characteristic are dynamically selected. (69) The apparatus in embodiment (68), wherein the desired aggregate operating characteristic is a substantially minimized power consumption at the required power output.

(70) A power-conservative multi-node network device, comprising: an enclosure having a power supply and a back-plane bus; a plurality of hot-pluggable node devices in the form of printed circuit (PC) cards adapted for connection with the back-plane buss; and each the node device being reconfigurable in substantially real-time to adapt to changing conditions on the network.

(71) The power-conservative multi-node network device in embodiment (70), wherein the plurality of hot-pluggable node devices comprise sixteen node devices. (72) The power-conservative multi-node network device in embodiment (70), wherein each of the node devices includes power saving control features.

Numerous other embodiments and features of the invention are described in the specification and drawings even though not specifically highlighted here.

Aspects of the invention though often described in the context of processors, CPUs, network devices, servers, and the like; have particular benefits relative to power and energy conservation when applied to server farms where large quantities of energy are conserved directly as a result of lower power operation without performance sacrifice as well as energy conserved as a result of higher density and lower facilities space and cooling requirements.

Those workers having ordinary skill in the art in light of the description provided will no doubt appreciate other aspects, features, and advantages of the inventive system, method, and software control. It will be appreciated that the afore described procedures implemented in a computer environment may be implemented using hardware, software, and/or firmware, and combinations of these. The detection, analysis, monitoring, decision making, and control functions are particularly amenable to computer program software and firmware implementations and may readily be implemented in a central processing unit (CPU), processor, controller, microcontroller, or other logic unit within or associated with the computers. Therefore the invention includes hardware and software implementations, and descriptions of procedures and methods anticipate that such procedures and methods may be implemented as a computer program and computer program product.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

All publications, product or other data sheets, web-site content, and patent applications cited or referenced in this specification are herein incorporated by reference as if each individual publication or patent application were specifically and individually indicated to be incorporated by reference.

I claim:

1. An information processing system comprising:
 a frame or enclosure for mounting a plurality of devices;
 a backplane having a plurality of connectors disposed within said frame or enclosure; and
 a plurality of devices, each including a device electrical connector, matingly coupled to said backplane electrical connectors, said plurality of devices including a plurality of network devices wherein each network device includes at least one processor and an activity monitor identifying a level of activity indicator for said at least one processor, each of said plurality of network devices being operable in a plurality of modes wherein each mode has a respective maximum level of performance and a respective maximum power consumption rate; and
 a power manager: (i) coupled to each of said plurality of network devices and receiving said level of activity information from each of said plurality of network devices; (ii) analyzing said plurality of received level of activity information; (iii) determining an operating mode for each of said network devices selected from said plurality of modes based on said analyzed activity information and predetermined policies; and (iv) generating commands to each of said plurality of network devices directing each of said network devices to operate in said determined operating mode.

2. A system as in claim 1, wherein said plurality of network devices comprises a device selected from the set of network devices consisting of a server device, a computer node device, a monitor node device, a management module, a server module, and combinations thereof.

3. A system as in claim 2, wherein each of said plurality of network devices includes a processor and a memory integral with or coupled to said processor.

4. A system as in claim 3, further comprising a network switch or network switching device.

5. A system as in claim 4, wherein said plurality of devices further comprises a device selected from the set of devices consisting of a power supply, a fan or fan module, and combinations thereof.

6. A system as in claim 1, wherein said plurality of network devices comprises at least one server computer having at least one processor and a local power manager.

7. A system as in claim 6, wherein said local power manager is integral with said server computer.

8. A system as in claim 6, wherein said local power manager is separate from said server computer.

9. A system as in claim 1, wherein said plurality of modes includes a first mode having a first maximum performance level and a first power consumption rate, and (ii) a third mode having a third maximum performance level lower than said first maximum performance level and a third power consumption rate lower than said first power consumption rate; and said
power manager is configured to determine an operating mode for each of said plurality of network devices selected from said first mode and third mode based on said analyzed activity information and predetermined policies.

10. A system as in claim 9, wherein:
said plurality of modes further includes a second mode having a second maximum performance level intermediate between said first maximum performance level and said third maximum performance level and a second power consumption rate intermediate between said first power consumption rate and said third power consumption rate; and
said power manager is further configured to determine an operating mode for each of said plurality of network devices selected from said first mode, said second mode, and said third mode based on said analyzed activity information and said predetermined policies.

11. A system as in claim 1, wherein said system further comprises a switching module, and said power manager receives activity indicators for said switching module and controls an operating mode of said switching module in response thereto.

12. A system as in claim 1, wherein at least one of said plurality of network devices comprises a server module that is power managed by adjusting processor performance to one or more of a predicted processor processing requirement and a measured processor processing requirement.

13. A system as in claim 12, wherein said predicted processor processing requirement is a Quality of Service (QoS) based requirement, and said measured processor processing requirement comprises a substantially real-time measured processor processing requirement.

14. A system as in claim 13, wherein said substantially real-time processor processing requirement comprises an idle thread execution detection and response thereto.

15. A system as in claim 1, wherein power (or energy) is conserved by controlling at least one of said plurality of network devices based on a control procedure algorithm to enter a first level of power (energy) saving by adjusting the performance of the processor within said at least one of said plurality of network devices to substantially match the computer processor loading demand.

16. A system as in claim 1, wherein power (or energy) is conserved by controlling said plurality of network devices in aggregate based on a control procedure algorithm and said policy to enter selected levels of power (energy) saving by adjusting the performance of the processors within said plurality of network devices to substantially match the aggregate computer processor loading demands.

17. A system as in claim 1, wherein said power manager includes a control procedure algorithm implemented as software to implement a power on demand control procedure.

18. A system as in claim 1, wherein each of said plurality of network devices is configurable as a particular type of network device.

19. A system as in claim 1, wherein at least one of said plurality of network devices is configured as a network device selected from the set consisting of a web server, a streaming media server, a cache server, a file server, an application server, and a router.

20. A system as in claim 1, wherein at least selected ones of said plurality of network devices are configurable as a combination type of network device, and wherein one of said plurality of network devices is configured as a computer node selected from the set consisting of a web server, a streaming media server, a cache server, a file server, an application server, a router, and combinations thereof.

21. A system as in claim 20, wherein said network device configured as a computer node is reconfigurable at any time based on types of activities detected within the network to which the network device is or may be connected.

22. A system as in claim 1, wherein the activity monitor for at least one of said network devices comprises a network activity monitor that detects the types of activities present on a network to which said activity monitor is coupled.

23. A system as in claim 22, wherein said types of activities present on a network to which said activity monitor is coupled that are monitored by said activity monitor include volume of web pages served, volume of streaming media served, volume of files served, volume of applications served, volume of cached data served, amount of network traffic routed, and combinations thereof.

24. A system as in claim 21, wherein said reconfiguration of said network device is initiated by any of said plurality of network devices including the network device being reconfigured.

25. A system in claim 1, wherein a selected one of said plurality of network devices is designated as a master comprises said power manager.

26. A system as in claim 25, wherein any of said plurality of network devices may be designated as the master.

27. A system as in claim 26, wherein a particular one of said plurality of network devices is designated as a master on the basis of its position within a chassis.

28. A system as in claim 26, wherein a particular one of said plurality of network devices is designated as a master on the basis of the order of power-up or boot completion.

29. A system as in claim 21, wherein reconfiguration of said network device configured as a computer node comprises altering the software and/or firmware instructing said computer.

30. A system as in claim 21, wherein reconfiguration of said network device configured as a computer node comprises altering the data organization of a data storage device integral with or coupled to said computer.

31. A system as in claim 30, wherein said data storage device comprises a hard disc drive based RAID storage away and altering said data organization comprises altering rad configuration of said data to provide better performance for the type of data being served.

32. A system as in claim 21, wherein said reconfiguration of network device configured as a computer node is initiated by a management module network device.

33. A system as in claim 1, wherein a number of said plurality of network devices of the same type are grouped together and treated as a single network device.

34. A system as in claim 33, wherein said group of network devices treated as a single network device is managed and controlled as a single network device.

35. A system as in claim 33, wherein said group of network devices treated as a single network device is power managed as a single network device.

36. A system as in claim 33, wherein said group of network devices treated as a single network device is monitored as a single network device.

37. A system as in claim 33, wherein said plurality of network devices are electrically coupled via a backplane bus and the logical grouping of the plurality of network devices into a single logical network device is performed under control of software.

38. A system as in claim 37, wherein said software executes within a processor and memory associated within each of said plurality of network devices.

39. A system as in claim 33, wherein said group of network devices comprises a server group.

40. A system as in claim 33, wherein said plurality of network devices each comprise a computer server module.

41. A system as in claim 40, wherein each computer server module is configured as a computer server module selected from the group consisting of a web server, a streaming media server, a cache server, a file server, an application server, a router, and combinations thereof.

42. A system as in claim 37, wherein the activity associated with each computer within a grouped logical network device may be monitored individually.

43. A system as in claim 37, wherein the network activity associated with all or any subset of physical network device within a grouped logical network device may be monitored as a composite or in aggregate.

44. A system as in claim 33, wherein grouping is accomplished by aggregating all of the activity in each of said plurality of network devices and directing each of said plurality of network devices in said logical group to operate at the same operating mode.

45. A system as in claim 10, wherein over a period of time said system will have sufficient over capacity that some of said network devices will be directed to operate in said third mode, said policy taking into account the amount each of said network devices have historically spent operating in at least one of said first, second, or third mode and selecting a network device to operate in said third mode based on historical data.

46. A system as in claim 45, wherein said network device selected to operate in said third mode is a network device that has the smallest cumulative duration operating in said third mode amongst the plurality of network devices.

47. A system as in claim 45, wherein said network device selected to operate in said third mode is randomly selected from amongst the plurality of network devices.

48. A system as in claim 45, wherein said network device selected to operate in said third mode is rotated sequentially amongst the plurality of network devices.

49. A system as in claim 10, wherein said activity monitor comprises an activity monitor that monitors an activity selected from the set of activities consisting of: a program application layer activity, a network layer activity, a physical layer activity, and combinations thereof.

50. A system as in claim 49, wherein at the physical level the number of processor idle threads executed within a predetermined period of time are measured to determine processor loading and the processor performance is adjusted to by altering the operating mode to substantially match the level of processor loading.

51. A system as in claim 50, wherein the substantial matching of processor performance to processor loading is performed with a predetermined amount of additional processor performance beyond that needed to match the processor loading.

52. A system as in claim 51, wherein said predetermined amount of additional processor performance is between about one-percent and about five-percent additional performance.

53. A system as in claim 10, wherein:
said first mode operation is characterized by operating said processor at a first processor clock frequency and a first processor core voltage, said second mode operation is characterized by operating said processor at a second processor clock frequency and a second processor core voltage, and said third mode operation is characterized by operating said processor at a third processor clock frequency and a third processor core voltage;
said second mode of operation being further characterized in that said second processor clock frequency and said second processor core voltage in combination consuming less power than said first processor clock frequency and said first processor core voltage in combination, and said third processor clock frequency and said third processor core voltage in combination consuming less power than said second processor clock frequency and said second processor core voltage in combination.

54. A system as in claim 53, wherein performance of a group of said network devices forming a single logical device are power managed by reducing the performance and power consumption of each constituent network device in predetermined equal increments or predetermined unequal increments.

55. A system as in claim 54, wherein said unequal increments include placing one or more of said plurality of network devices in said third mode operating mode.

56. A system as in claim 54, wherein said unequal increments include placing one or more of said plurality of network devices in said second mode operating mode.

57. A system as in claim 54, wherein said unequal increments include placing one or more of said plurality of network devices in a powered-off fourth mode.

58. A system as in claim 54, wherein a composite performance of a logical network device is achieved by placing some physical network devices in said second mode and by placing others in a different mode.

59. A system as in claim 49, wherein said activity monitor comprises a network layer activity monitor monitoring TCP/IP protocol data packets; and processor performance is incrementally lowered by said power manager until data packets start dropping indicating that the processor performance is at the limit of adequacy and then increasing the processor performance by a specified increment to act as a safety margin to provide reliable communication of the packets.

60. A system as in claim 59, wherein the specified increment is a one-percent to five percent increment.

61. A system as in claim 59, wherein the specified increment is a 0.1 percent to 10 percent increment.

62. A system as in claim 1, wherein said activity monitor comprises an activity monitor that monitors an activity selected from the set of activities consisting of: a program application layer activity, a network layer activity, a physical layer activity, and combinations thereof.

63. A system as in claim 62, wherein said application layer activity monitor comprises monitoring use of a port address within said plurality of network devices, said monitoring including counting or measuring a number of times a specific port address is being requested within a predetermined period of time, and in response to that counting or measurement, placing a sufficient amount of device performance to meet the performance requirement for each application requesting the port address.

64. A system as in claim 63, wherein said sufficient amount of network performance is provided by operating selected network device in a first predetermined performance having a predetermined power consumption and a second group of other selected physical network devices at a reduced second performance level having a power consumption lower than that of said first selected group.

65. A system as in claim 64, wherein said first predetermined performance is a maximum performance and said second predetermined performance is a second level power saving mode.

66. A system as in claim 64, wherein said first predetermined performance is a maximum performance and said second predetermined performance is a third level power saving mode.

67. A system as in claim 63, wherein said measurement is determined via a SNMP agent.

68. A system as in claim 1, wherein said power manager applies different policies for different application types including using different rules to determine and predict system performance requirements.

69. A system as in claim 68 wherein said different application types comprise different server types.

70. A system as in claim 68, wherein said different rules comprise different measurement procedures.

71. A system as in claim 68, wherein said system performance requirements comprise processor performance requirements.

72. A system as in claim 68, wherein said system performance requirements comprise server loading performance requirements.

73. A system as in claim 68, wherein said application type comprises a network application.

74. A system as in claim 73, wherein said network application comprises a network file server (NFS) application.

75. The system in claim 74, wherein at least one of said plurality of network devices comprises a network server, and a processor within said at least one of said plurality of network devices operates at a processor clock frequency just sufficient to maintain maximum rated communication over a predetermined network connection.

76. The system in claim 75, wherein said a predetermined network connection comprises a 100 Mbps ethernet connection.

77. A system as in claim 75, wherein said processor clock frequency is less than about 300 MHz.

78. A system as in claim 73, wherein said processor clock frequency is less than about 300 MHz.

79. A system as in claim 1, wherein said activity indicator comprises a network quality of service (QoS) indicator.

80. A system as in claim 10, wherein power is conserved by controlling each of said plurality of network devices to enter one of said second mode or said third mode using one or more of a quality of service based predictive processor performance reduction and an activity based measured performance requirement.

81. A system as in claim 80, wherein said activity based measured performance comprises an idle thread execution based activity measure.

82. A system as in claim 79, wherein a number of said plurality of network devices are organized as a single logical network device, and network device loading and QoS are measured for logical network device.

83. A system as in claim 82, wherein within said single logical network device, at least some network devices making up the logical network device enter the third mode while other of said physical network devices operate in one or more of said first and second modes.

84. A system as in claim 79, wherein at least one of said network devices can enter a third mode directly or indirectly from either said first mode or the second mode.

85. A system as in claim 10, wherein when there is a requirement that one network device be placed in a lower power consumption mode, the network device selected for such lower power consumption is selected according to predetermined rules such that different network devices are placed in lower power consumption mode each time such selection is required.

86. A system as in claim 85, wherein said predetermined rules provide for random selection of one of the network devices.

87. A system as in claim 85, wherein said predetermined rules provide for cycling through the network devices according to some predetermined ordering.

88. A system as in claim 87, wherein said predetermined rules provide for cycling through the network devices according to some predetermined ordering in which network devices having the lowest time in service are preferentially selected for continued operation and network devices having the longest time in service are selected for reduced power operation.

89. A system as in claim 88, wherein said reduced power operation includes being powered off.

90. A system as in claim 88, wherein said reduced power operation includes being placed in a suspend mode.

91. A system as in claim 10, wherein a network device placed in mode 3 is in a suspend state and may be woken up and placed in the first mode or the second mode by any one of a plurality of events including by a wake on LAN signal event.

92. A system as in claim 10, wherein the transition from one power consumption mode to another power consumption mode is based on a procedure implemented in software.

93. A system as in claim 10, wherein the transition from one power consumption mode to another power consumption mode is based on a procedure implemented in hardware and software.

94. A system as in claim 10, wherein when there is need to operate fewer than all the network devices, the particular network device or logical group of network devices that is (are) turned off or placed in a reduced power consumption mode is cycled so that over time all of the network devices experience similar operating time histories.

95. A system as in claim 94, wherein the network devices include a non-volatile memory for storing operational history.

96. A system as in claim 95, wherein said operational history includes a total operating time indicator.

97. A system as in claim 95, wherein said operational history includes a time in service indicator.

98. A system as in claim 95, wherein said operational history includes indicators for operational time at each operational mode.

99. A system as in claim 10, wherein at least some of said network devices include a mass storage device including a rotatable storage device.

100. A system as in claim 99, wherein said rotatable mass storage device comprises a rotatable magnetic hard disk drive.

101. A system as in claim 99, wherein said rotatable mass storage device comprises a rotatable optical disk drive.

102. A system as in claim 99, wherein said rotatable mass storage device comprises a rotatable magneto-optical disk drive.

103. A system as in claim 99, wherein said rotatable mass storage device is power managed by controlling the rotation of a motor rotating said rotatable device, wherein said disc drive is not rotated when a computer associated with said drive is in a mode 3 operating condition.

104. A system as in claim 10, wherein said network devices are configured as network server devices and a network load versus allocated network device performance profile is provided for each different type of network server device, and the performance level set for operation of said network device is established by reference to the profile.

105. A system as in claim 104, wherein the profile is implemented as an analytical expression executed in software or firmware.

106. A system as in claim 104, wherein the profile is implemented as a piecewise linear expression executed in software or firmware.

107. A system as in claim 104, wherein the profile is implemented as a look-up-table stored in a memory.

108. A system as in claim 10, wherein at least one of said network devices comprises a network server device and said activity monitoring for said network server device comprises a monitoring of either said network device load or the network device quality of service (QoS); and wherein said monitoring is performed by said activity monitor or by a separate management computer, or both.

109. A system as in claim 1, wherein said system includes at least one temperature sensor within an enclosure holding said plurality of network devices for monitoring and reporting the temperature proximate the sensor to a computer configured to monitor said temperature.

110. A system as in claim 1, wherein said system includes a plurality of temperature sensors within said enclosure reporting to one or more network devices.

111. A system as in claim 110, wherein said plurality of temperature sensors are spatially distributed to provide temperature monitoring of different network devices within said enclosure.

112. A system as in claim 110, wherein said plurality of temperature sensors are spatially distributed to provide temperature monitoring of different network devices and power supplies within said enclosure.

113. A system as in claim 109, wherein when the temperature sensed by a temperature sensor is within a predetermined magnitude relationship of a first predetermined value at least one network device is transitioned to a lower power consumption state.

114. A system as in claim 113, wherein when the temperature sensed by a temperature sensor is within a predetermined magnitude relationship of a second predetermined value at least one network is transitioned to a powered off state.

115. A system as in claim 109, wherein the operational mode of at least one network device is reduced to a lower power consuming and heat dissipating state in response to a temperature sensor reporting a temperature greater than or equal to a predetermined value.

116. A system as in claim 113, wherein after said power consumption operating mode has been lowered permitting said at least one network device to be operated at a higher power consuming state when the temperature sensed is below a predetermined temperature value, said lower temperature value being selected to provide hysteresis and prevent oscillation between higher power state and lower powered state.

117. A system as in claim 113 wherein the lower power consumption state is achieved by lowering the clock frequency of the processor, the clock frequency of a bus coupling a processor to other components, or the operating voltage of the processor or other components.

118. A system as in claim 113, wherein the particular network device that is transitioned to a lower power consumption state is selected based on predetermined rules.

119. A system as in claim 118, wherein said predetermined rules include a quality of service (QoS) indicator.

120. A system as in claim 119, wherein additional network devices are sent to lower energy consuming modes if the temperature remains above a predetermined temperature value.

121. A system as in claim 1, wherein power consumption within said system is reduced by adjusting the number and motor speed of cooling fans responsible for cooling at least one of said network devices.

122. A system as in claim 1, wherein a plurality of cooling fans are provided and operate under control of said power manager that controls each fan to provide cooling at the rate and location desired to maintain said network devices within a predetermined temperature range.

123. A system as in claim 1, wherein said plurality of network devices are disposed within a common enclosure and said system further comprising a plurality of temperature sensors and a plurality of cooling devices are also disposed within said enclosure, said plurality of temperature sensors communicating a temperature signal to a temperature control means and said control means adjusting the on/off status and operational parameters of the cooling units to extract heat according to predetermined rules.

124. A system as in claim 123, wherein said power manager comprises said temperature control means.

125. A system as in claim 123, wherein one of said network devices within said enclosure comprises said temperature control means.

126. A system as in claim 1, wherein said system further includes a plurality of power supplies and said power supplies are controlled to maintain a required power output level and operate said power supplies at a preferred efficiency.

127. A system as in claim 126, wherein only selected ones of said plurality of power supplies are operated.

128. A system as in claim 126, wherein multiple ones of said power supplies are operated but each is operated at less than rated power output capacity.

129. A system as in claim 1, wherein the temperature of said system is moderated by motor driven cooling fans and wherein a rotational speed of said motor drive cooling is adjusted to maintain a predetermined temperature range proximate a temperature sensor.

130. A system as in claim 1, wherein the rotational speed of a motor drive cooling is adjusted to maintain a predetermined temperature range within an enclosure.

131. A system as in claim 1, wherein:
said power manager is a global power manager and each of said plurality of network devices includes a local power manager configured for determining an operating mode for said respective network device selected from a subplurality of said plurality of modes based on processor internal activity information;

each said local power manager configured to transition said respective network device between said modes in said subplurality of modes, and said global power manager configured to transition each of said network devices between said modes in said plurality of modes.

132. A system as in claim 1, wherein said power manager is a global power manager and each network device includes a local power manager configured to determine an operating mode for itself selected from said plurality of modes based on processor internal activity information, said local power manager and said global power manager each configured to transition each respective network device between modes in said plurality of modes.

133. A power-conservative multi-node network device, comprising:

an enclosure having a power supply and a back-plane buss;

a plurality of hot-pluggable node devices in the form of printed circuit (PC) cards adapted for connection with said back-plane buss, each said node device being configured to perform a first task; and each said node device being reconfigurable in substantially real-time to perform a second task different than said first task to adapt to changing conditions on the network.

134. The network device in claim 133, wherein said plurality of hot-pluggable node devices comprise up to sixteen node devices.

135. The network device in claim 133, wherein each of said node devices includes power saving control features.

\* \* \* \* \*

UNITED STATES PATENT AND TRADEMARK OFFICE
CERTIFICATE OF CORRECTION

PATENT NO. : 7,512,822 B2
APPLICATION NO. : 11/364870
DATED : March 31, 2009
INVENTOR(S) : Henry T. Fung Page 1 of 1

It is certified that error appears in the above-identified patent and that said Letters Patent is hereby corrected as shown below:

Column 96, line 49, please delete the comma between "claim 1" and "wherein."

Column 97, line 2, delete "away" and insert --array--.

Column 102, line 5, insert a comma between "lowered" and "permitting."

Column 102, line 11, insert a comma between "claim 113" and "wherein."

Signed and Sealed this

Twelfth Day of May, 2009

JOHN DOLL
*Acting Director of the United States Patent and Trademark Office*